(12) United States Patent
Glew et al.

(10) Patent No.: US 8,943,313 B2
(45) Date of Patent: Jan. 27, 2015

(54) FINE-GRAINED SECURITY IN FEDERATED DATA SETS

(75) Inventors: Andrew F. Glew, Hillsboro, OR (US); Daniel A. Gerrity, Seattle, WA (US); Clarence T. Tegreene, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/136,401

(22) Filed: Jul. 29, 2011
(Under 37 CFR 1.47)

(65) Prior Publication Data

US 2013/0031364 A1    Jan. 31, 2013

Related U.S. Application Data

(63) Continuation-in-part of application No. 13/136,024, filed on Jul. 19, 2011, and a continuation-in-part of application No. 13/136,400, filed on Jul. 29, 2011.

(51) Int. Cl.
| | | |
|---|---|---|
| *G06F 21/00* | (2013.01) | |
| *H04L 29/06* | (2006.01) | |
| *G06F 21/52* | (2013.01) | |
| *G06F 21/60* | (2013.01) | |
| *G06F 21/62* | (2013.01) | |

(52) U.S. Cl.
CPC ............ *G06F 21/52* (2013.01); *G06F 21/606* (2013.01); *G06F 21/62* (2013.01)
USPC .............................................. 713/162; 726/1

(58) Field of Classification Search
CPC ........ G06F 21/62; G06F 21/606; G06F 21/52
USPC .............................................. 713/162; 726/1
See application file for complete search history.

(56) References Cited

U.S. PATENT DOCUMENTS

| | | | |
|---|---|---|---|
| 4,525,599 A | 6/1985 | Curran et al. | |
| 5,437,032 A | 7/1995 | Wolf et al. | |
| 5,623,637 A | 4/1997 | Jones et al. | |
| 6,006,328 A * | 12/1999 | Drake | 726/23 |
| 6,057,598 A | 5/2000 | Payne et al. | |
| 6,154,741 A | 11/2000 | Feldman | |
| 6,654,745 B2 | 11/2003 | Feldman | |
| 6,996,547 B1 | 2/2006 | Tugenberg et al. | |

(Continued)

FOREIGN PATENT DOCUMENTS

WO     WO 01/99075 A2    12/2001

OTHER PUBLICATIONS

Adya et al. (FARSITE: Federated, Available, and Reliable Storage for an Incompletely Trusted Environment, Dec. 2002).*

(Continued)

*Primary Examiner* — Saleh Najjar
*Assistant Examiner* — Oleg Korsak

(57) ABSTRACT

A data processing system, a server such as a federated server, a computer system, and like devices, and associated operating methods can be configured to support fine-grained security including resource allocation and resource scheduling. A data processing system can comprise a federated server operable to access data distributed among a plurality of remote data sources upon request from a plurality of client users and applications; and logic executable on the federated server. The logic can be operable to enforce fine-grained security operations on a plurality of federated shared data sets distributed among the plurality of remote data sources.

50 Claims, 21 Drawing Sheets

(56) References Cited

U.S. PATENT DOCUMENTS

| | | |
|---|---|---|
| 7,054,190 B2 | 5/2006 | Hanyu et al. |
| 7,107,176 B2 * | 9/2006 | Henry et al. ............... 702/127 |
| 7,124,170 B1 * | 10/2006 | Sibert ...................... 709/216 |
| 7,165,150 B2 * | 1/2007 | Alverson et al. ............ 711/145 |
| 7,221,600 B2 | 5/2007 | Hara et al. |
| 7,379,999 B1 | 5/2008 | Zhou et al. |
| 7,395,414 B2 | 7/2008 | Le et al. |
| 7,502,946 B2 | 3/2009 | Perkins et al. |
| 7,533,273 B2 * | 5/2009 | Patariu et al. ............... 713/189 |
| 7,549,054 B2 | 6/2009 | Brodie et al. |
| 7,594,111 B2 | 9/2009 | Kiriansky et al. |
| 7,620,941 B1 | 11/2009 | Leventhal |
| 7,644,162 B1 | 1/2010 | Zhu et al. |
| 7,676,578 B1 | 3/2010 | Zhu et al. |
| 7,757,282 B2 | 7/2010 | Pandit et al. |
| 7,861,305 B2 * | 12/2010 | McIntosh et al. ............ 726/24 |
| 7,870,610 B1 | 1/2011 | Mitchell et al. |
| 7,873,998 B1 | 1/2011 | Wilkinson et al. |
| 7,877,585 B1 | 1/2011 | Coon et al. |
| 7,953,986 B2 | 5/2011 | Lee |
| 7,958,558 B1 | 6/2011 | Leake et al. |
| 8,022,724 B1 | 9/2011 | Jenkins, IV |
| 8,099,574 B2 * | 1/2012 | Savagaonkar et al. ........ 711/163 |
| 8,117,660 B2 * | 2/2012 | Pan et al. ................... 726/25 |
| 8,136,158 B1 * | 3/2012 | Sehr et al. .................. 726/22 |
| 8,146,106 B2 * | 3/2012 | Kim et al. .................. 719/318 |
| 8,281,388 B1 | 10/2012 | Sobel et al. |
| 8,286,250 B1 | 10/2012 | Le et al. |
| 8,312,509 B2 * | 11/2012 | Zimmer et al. .............. 726/2 |
| 8,381,192 B1 | 2/2013 | Drewry et al. |
| 8,397,238 B2 | 3/2013 | Venkumahanti et al. |
| 8,510,827 B1 | 8/2013 | Leake et al. |
| 8,694,947 B1 | 4/2014 | Venkataramani et al. |
| 2002/0040420 A1 | 4/2002 | Yamauchi et al. |
| 2002/0075844 A1 | 6/2002 | Hagen |
| 2002/0141577 A1 | 10/2002 | Ripley et al. |
| 2002/0142833 A1 | 10/2002 | Tsuchida et al. |
| 2002/0152212 A1 | 10/2002 | Feldman |
| 2002/0156939 A1 | 10/2002 | Armstrong et al. |
| 2002/0166058 A1 | 11/2002 | Fueki |
| 2003/0084308 A1 | 5/2003 | Van Rijnswou |
| 2003/0182436 A1 | 9/2003 | Henry |
| 2003/0187974 A1 | 10/2003 | Burbeck et al. |
| 2004/0054925 A1 | 3/2004 | Etheridge et al. |
| 2004/0116183 A1 | 6/2004 | Prindle |
| 2004/0117639 A1 | 6/2004 | Mowery |
| 2004/0117790 A1 | 6/2004 | Rhine |
| 2004/0199763 A1 | 10/2004 | Freund |
| 2005/0060710 A1 | 3/2005 | Kush |
| 2005/0138074 A1 | 6/2005 | O'Connor et al. |
| 2005/0160428 A1 | 7/2005 | Ayachitula et al. |
| 2005/0171903 A1 | 8/2005 | Yacobi et al. |
| 2005/0177596 A1 | 8/2005 | Wu et al. |
| 2005/0213751 A1 * | 9/2005 | Apostolopoulos et al. ..... 380/28 |
| 2005/0232415 A1 | 10/2005 | Little et al. |
| 2005/0268075 A1 | 12/2005 | Caprioli et al. |
| 2006/0005082 A1 | 1/2006 | Fossum et al. |
| 2006/0161715 A1 | 7/2006 | Hamaguchi |
| 2006/0161978 A1 | 7/2006 | Abadi et al. |
| 2007/0022287 A1 | 1/2007 | Beck et al. |
| 2007/0079304 A1 | 4/2007 | Zheng et al. |
| 2007/0101433 A1 | 5/2007 | Louch et al. |
| 2007/0240215 A1 | 10/2007 | Flores et al. |
| 2007/0250837 A1 | 10/2007 | Herington et al. |
| 2008/0028467 A1 | 1/2008 | Kommareddy et al. |
| 2008/0052541 A1 | 2/2008 | Ginter et al. |
| 2008/0114990 A1 | 5/2008 | Hilbert et al. |
| 2008/0168279 A1 | 7/2008 | Kanai |
| 2008/0250216 A1 | 10/2008 | Kershaw et al. |
| 2008/0256346 A1 | 10/2008 | Lee et al. |
| 2008/0263663 A1 | 10/2008 | Ide et al. |
| 2008/0276317 A1 | 11/2008 | Chandola et al. |
| 2008/0279371 A1 | 11/2008 | Lee et al. |
| 2008/0301467 A1 | 12/2008 | Saito |
| 2008/0313482 A1 | 12/2008 | Karlapalem et al. |
| 2008/0320565 A1 | 12/2008 | Buch et al. |
| 2009/0006755 A1 | 1/2009 | Illikkal et al. |
| 2009/0007125 A1 | 1/2009 | Barsness et al. |
| 2009/0028135 A1 | 1/2009 | Mantripragada et al. |
| 2009/0063824 A1 | 3/2009 | Leaback et al. |
| 2009/0106563 A1 | 4/2009 | Cherpantier |
| 2009/0144557 A1 | 6/2009 | Sutton |
| 2009/0172686 A1 | 7/2009 | Chen et al. |
| 2009/0183263 A1 | 7/2009 | McMichael et al. |
| 2009/0187771 A1 | 7/2009 | McLellan, Jr. |
| 2009/0210881 A1 | 8/2009 | Duller |
| 2009/0265712 A1 | 10/2009 | Herington |
| 2009/0282474 A1 | 11/2009 | Chen et al. |
| 2009/0320129 A1 | 12/2009 | Pan et al. |
| 2009/0320136 A1 | 12/2009 | Lambert et al. |
| 2010/0191349 A1 | 7/2010 | Munaga |
| 2010/0281273 A1 | 11/2010 | Lee et al. |
| 2010/0299305 A1 | 11/2010 | Laxman et al. |
| 2010/0318998 A1 | 12/2010 | Golla |
| 2011/0131402 A1 | 6/2011 | Mittal |
| 2011/0131550 A1 | 6/2011 | Burckhardt et al. |
| 2011/0131658 A1 | 6/2011 | Bahl |
| 2011/0138124 A1 | 6/2011 | Hill et al. |
| 2011/0138473 A1 | 6/2011 | Yee et al. |
| 2011/0179176 A1 | 7/2011 | Ravichandran et al. |
| 2011/0202927 A1 | 8/2011 | Miloushev et al. |
| 2011/0289586 A1 | 11/2011 | Kc et al. |
| 2011/0307382 A1 | 12/2011 | Siegel et al. |
| 2012/0079492 A1 | 3/2012 | Chambliss et al. |
| 2012/0102489 A1 | 4/2012 | Staiman et al. |
| 2012/0159183 A1 | 6/2012 | Adams et al. |
| 2012/0179952 A1 | 7/2012 | Tuyls et al. |
| 2012/0185863 A1 | 7/2012 | Krstic et al. |
| 2012/0210325 A1 | 8/2012 | de Lind van Wijngaarden et al. |
| 2012/0221591 A1 | 8/2012 | Yerneni et al. |
| 2012/0255018 A1 | 10/2012 | Sallam |
| 2012/0255021 A1 | 10/2012 | Sallam |
| 2012/0265975 A1 | 10/2012 | Kimelman |
| 2012/0266243 A1 | 10/2012 | Turkulainen |
| 2012/0278903 A1 | 11/2012 | Pugh |
| 2013/0305243 A1 | 11/2013 | Hiki |

OTHER PUBLICATIONS

Kolbitsch et al.( Extending Mondrian Memory Protection, Nov. 22-23, 2010 ).*

Stone (A Logic-in-Memory Computer, IEEE Transactions, Jan. 1970).*

Bird et al.; "Lighthouse: Hardware Support for Enforcing Information Flow Control on ManyCore Systems"; bearing a date of 2008 (as provided by examiner); 10 pages.

Clause et al.; "Dytan: A Generic Dynamic Taint Analysis Framework"; ISSTA '07; bearing a date of Jul. 9-12, 2007; pp. 196-206; ACM.

Ho et al.; "Practical Taint-Based Protection using Demand Emulation"; EuroSys '06; bearing a date of Apr. 18-21, 2006; 13 pages; ACM Newsome et al.; "Dynamic Taint Analysis for Automation Detection, Analysis, and Signature Generation of Exploits on Commodity Software"; Carnegie Mellon University Research Showcase; bearing a date of Jan. 1, 2005; 18 pages.

Schwartz et al.; "All You Ever Wanted to Know About Dynamic Taint Analysis and Forward Symbolic Execution (but might have been afraid to ask)" ; 2010 IEEE Symposium on Security and Privacy; bearing a date of 2010; pp. 317-331; IEEE.

Song et al.; "BitBlaze: A New Approach to Computer Security via Binary Analysis"; ICISS 2008; bearing a date of 2008; pp. 1-25; Springer-Verlag Berlin Heidelberg.

Yin et al.; "Panorama: Capturing System-wide Information Flow for Malware Detection and Analysis"; CCS '07; bearing a date of Oct. 29-Nov. 2, 2007; pp. 116-127; ACM.

(56) References Cited

OTHER PUBLICATIONS

Zeldovich et al.; "Hardware Enforcement of Application Security Policies Using Tagged Memory"; bearing a date of 2008 (as provided by examiner), printed Feb. 7, 2013; pp. 1-16; located at: http://static.usenix.org/events/osdi08/tech/full_papers/zeldovich/zeldovich_html/.

Zhang et al.; "Neon: System Support for Derived Data Management"; VEE '10; bearing a date of Mar. 17-19, 2010; 12 pages; ACM.

Abadi et al.; "Control-Flow Integrity: Principles, Implementations, and Applications"; bearing a date of Nov. 1, 2004; pp. 1-33.

Kiriansky et al.; "Secure Execution Via Program Shepherding"; Proceedings of the 11th USENIX Security Symposium; bearing a date of Aug. 2002, created on Dec. 9, 2013; pp. 1-16; San Francisco, CA.

* cited by examiner

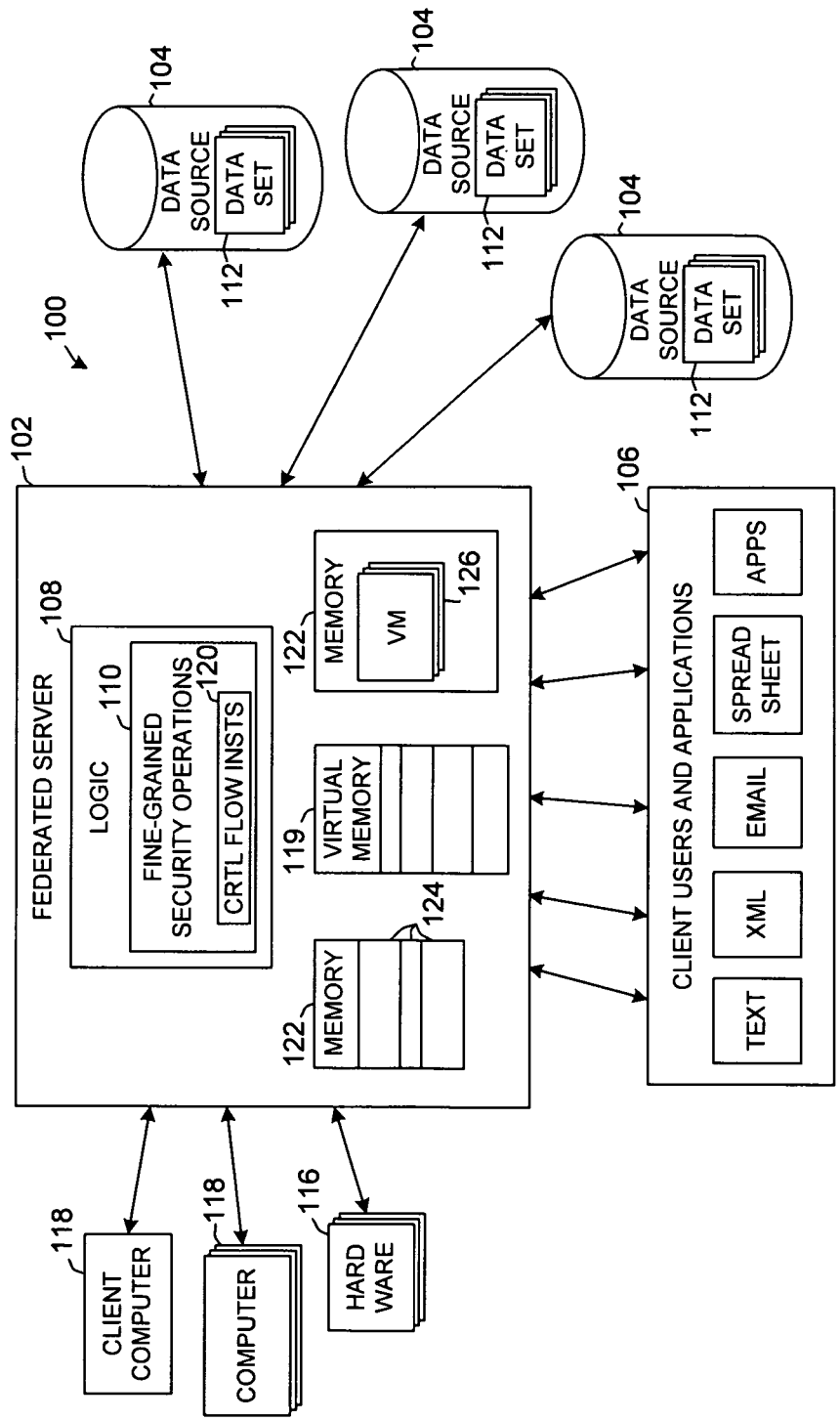

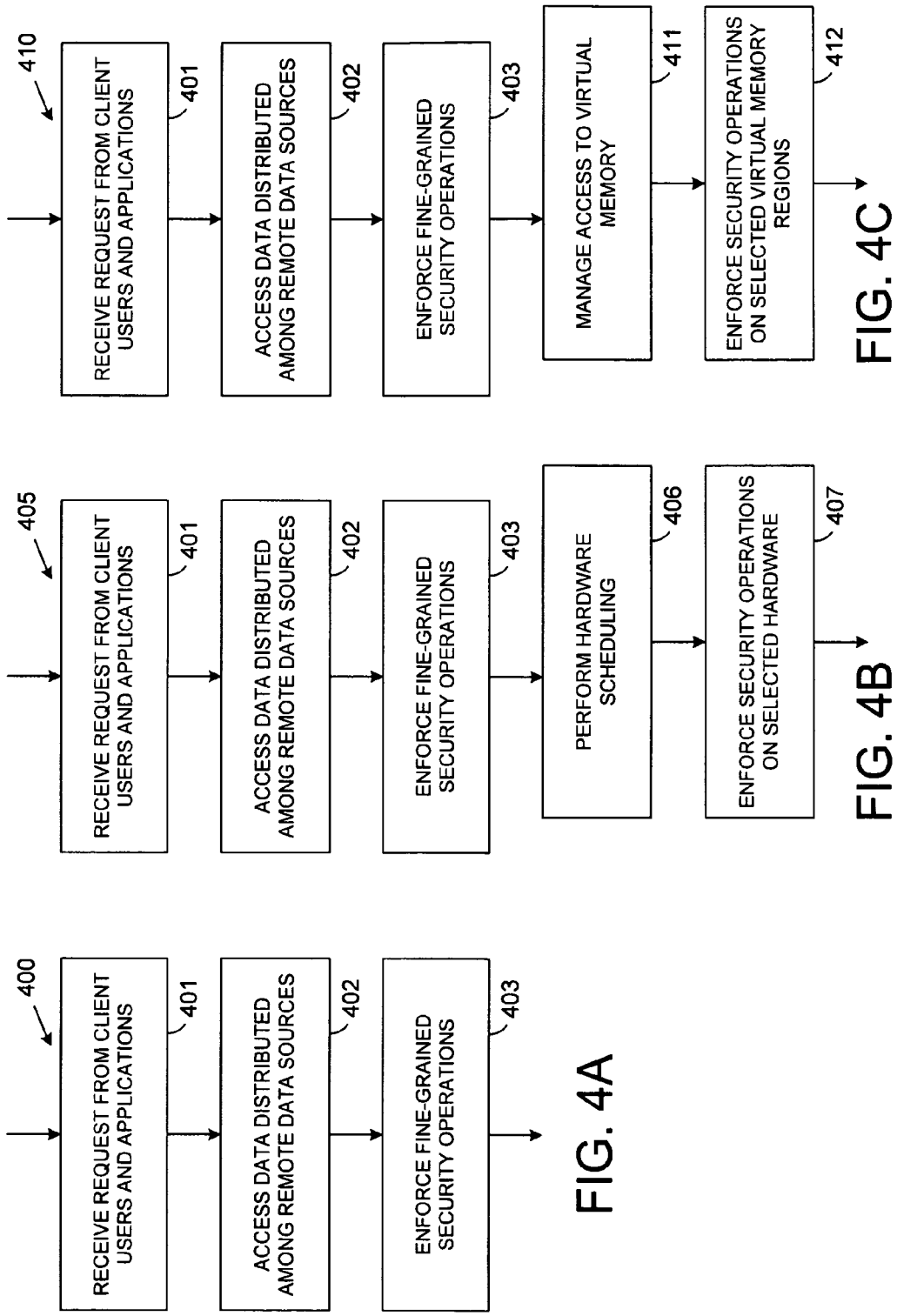

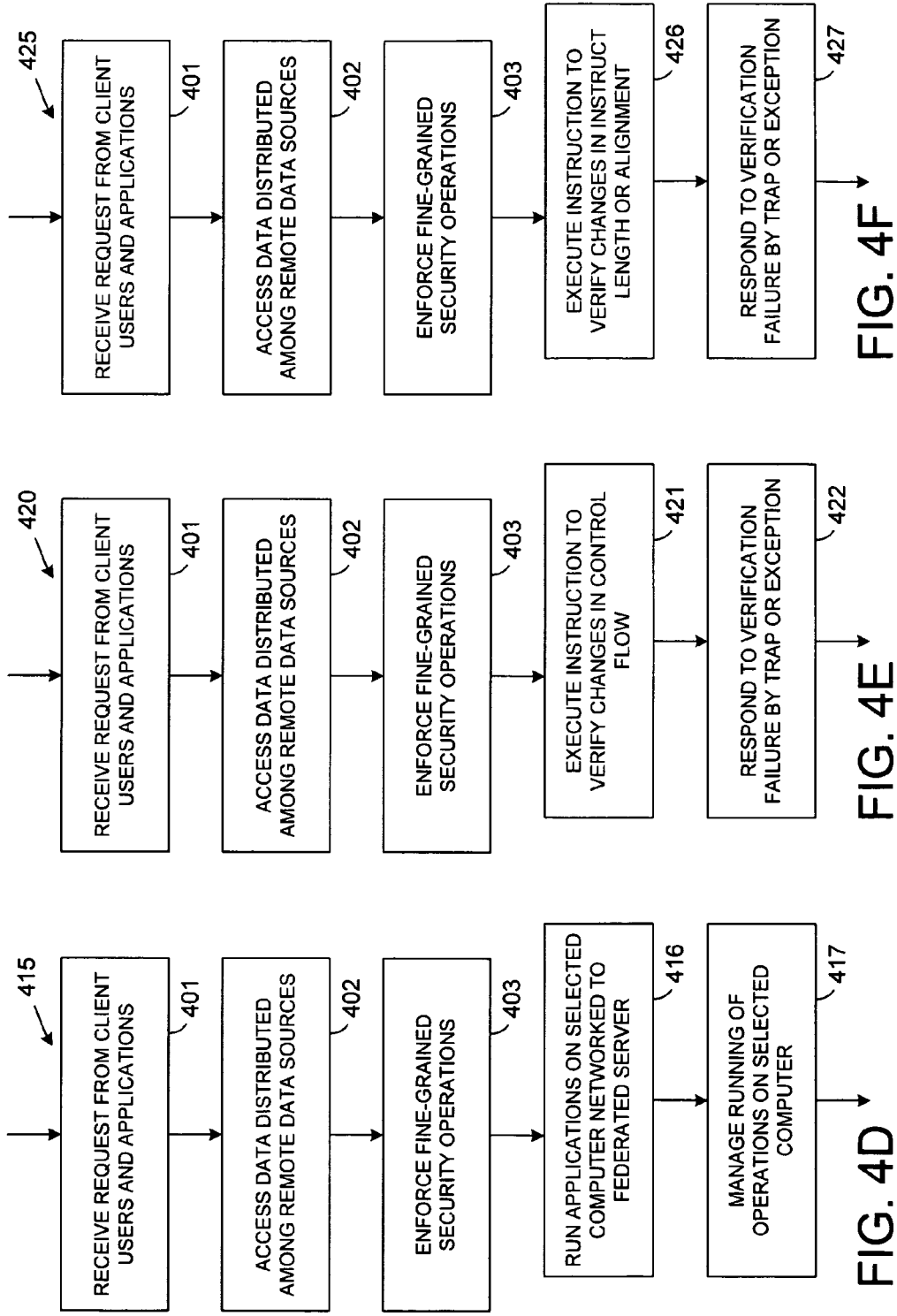

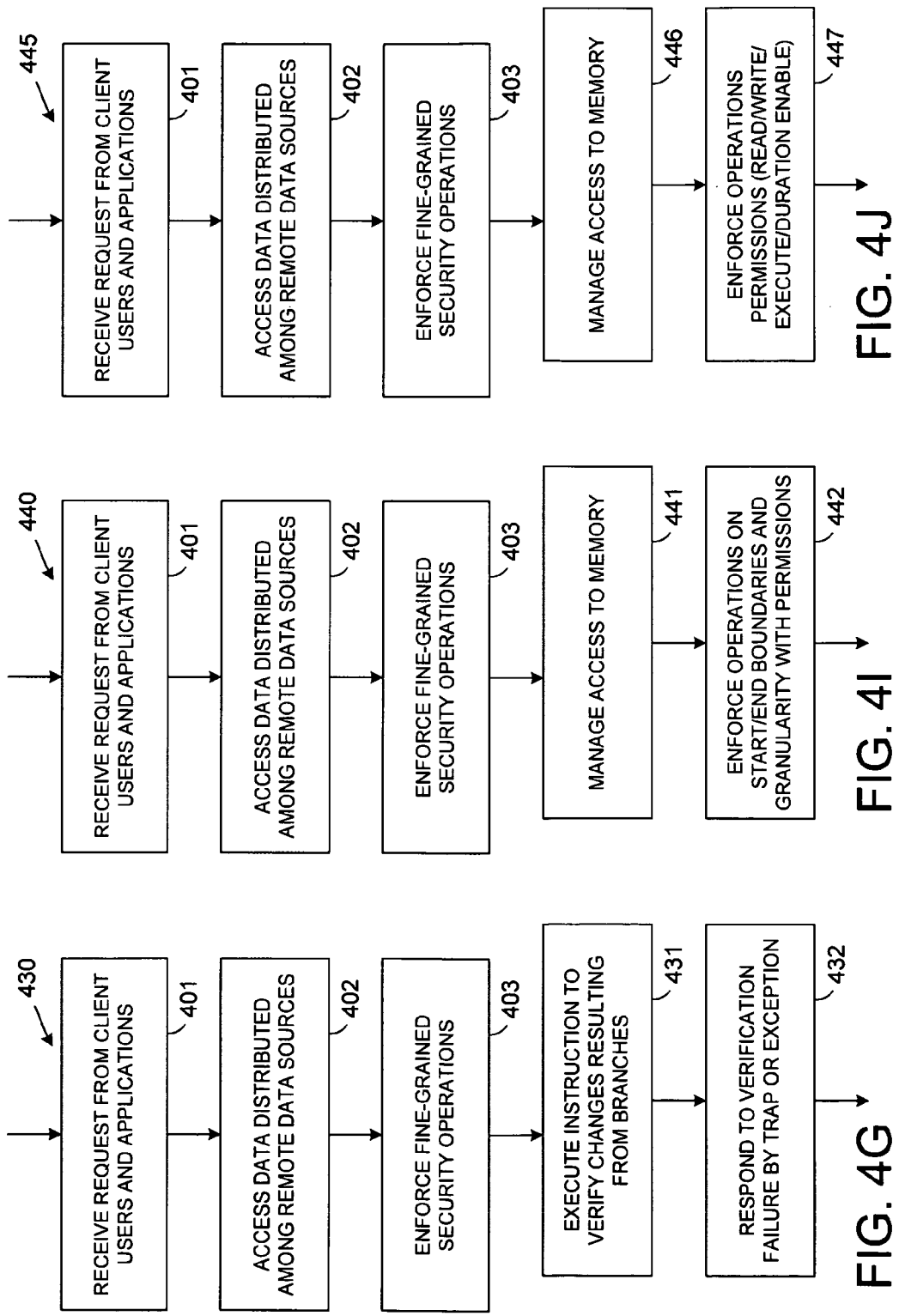

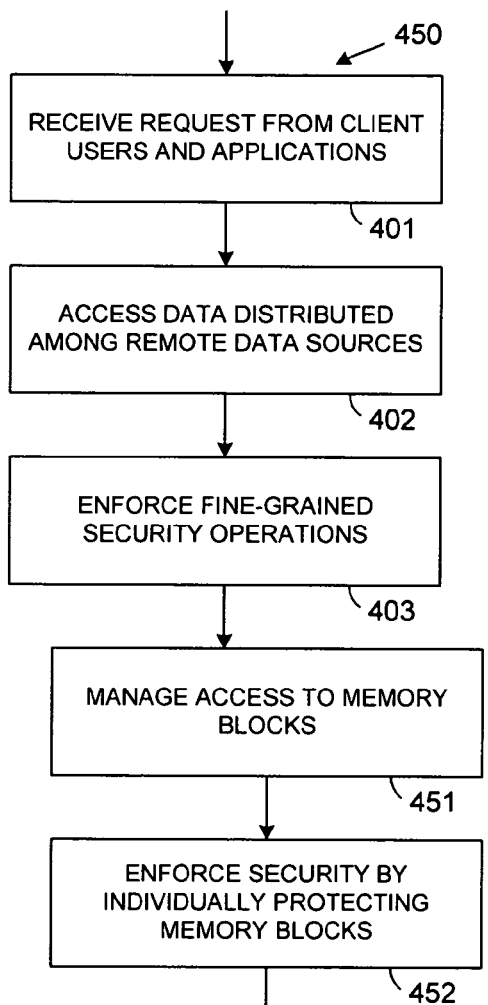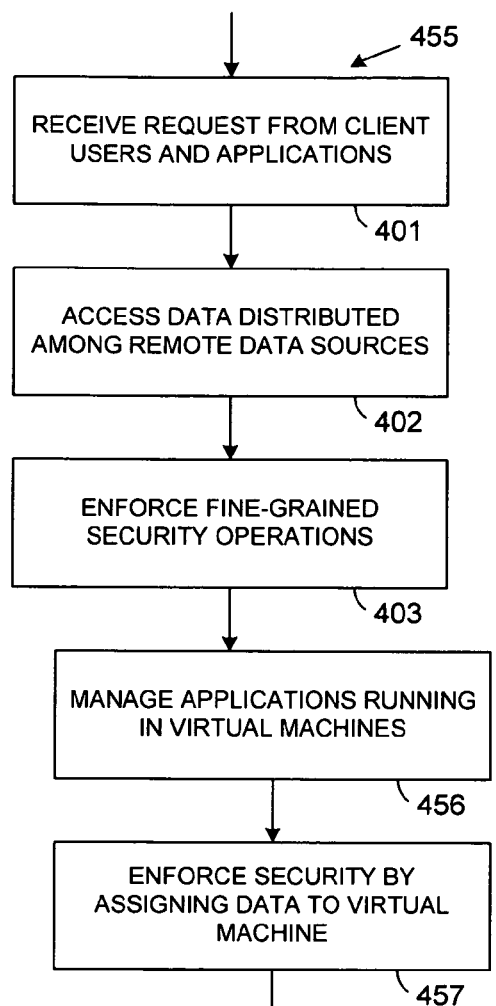

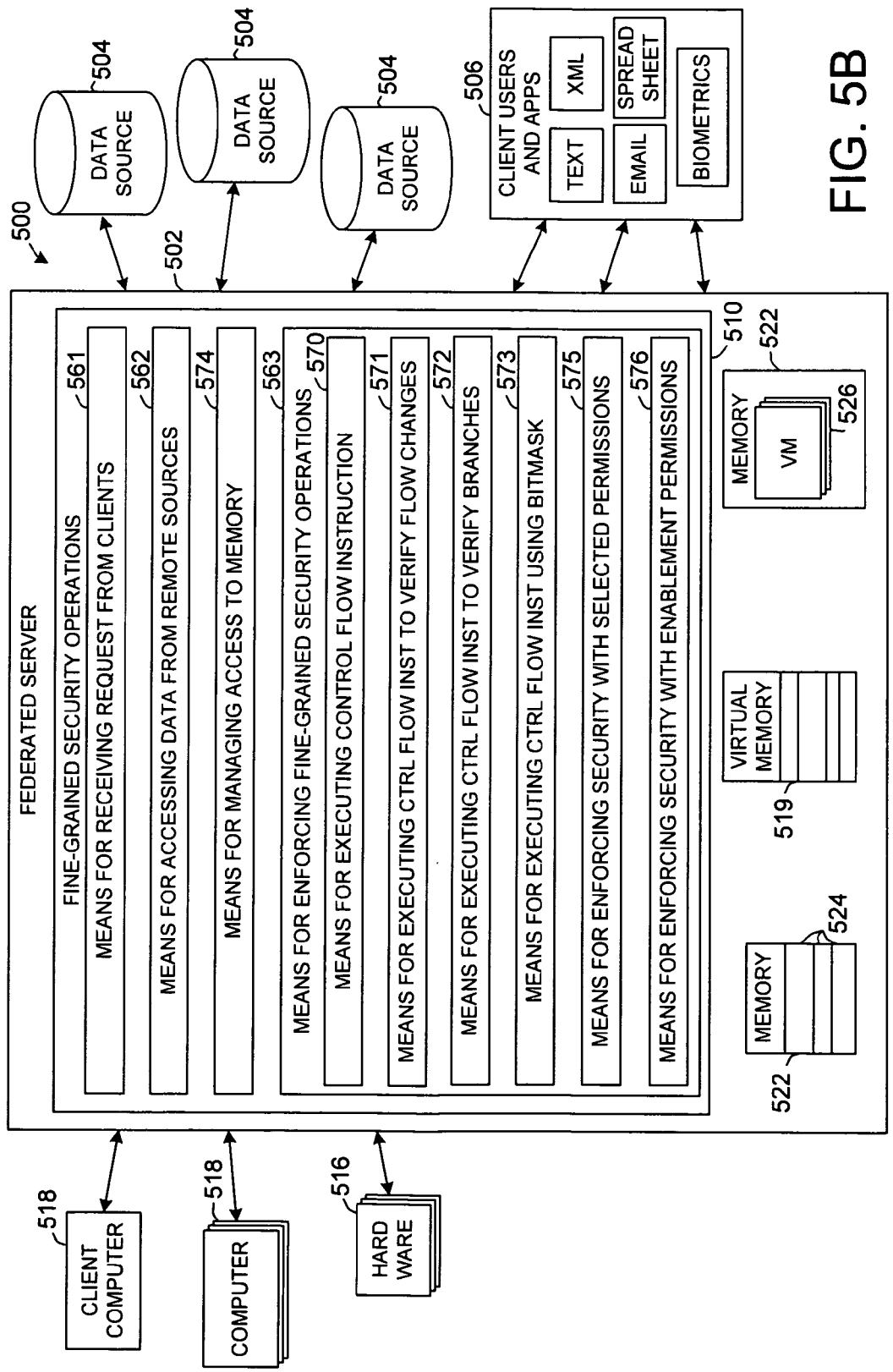

FINE-GRAINED SECURITY IN FEDERATED DATA SETS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements:
(1) the present application constitutes a continuation-in-part of U.S. patent application Ser. No. 13/136,024, entitled "CONTROL FLOW INTEGRITY", naming Andrew F. Glew, Daniel A. Gerrity, and Clarence T. Tegreene, as inventors, filed Jul. 19, 2011, which is currently co-pending, or is an application of which a currently co-pending application is entitled to the benefit of the filing date; and
(2) the present application constitutes a continuation-in-part of U.S. patent application Ser. No. 13/136,400, entitled "ENCRYPTED MEMORY" naming Andrew F. Glew, Daniel A. Gerrity, and Clarence T. Tegreene, as inventors, filed on Jul. 29, 2011, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BACKGROUND

Malicious software, also called malware, refers to programming (code, scripts, active content, and other software) designed to disrupt or deny operation, gather information to violate privacy or exploitation, gain unauthorized access to system resources, and enable other abusive behavior. The expression is a general term used by computer professionals to mean a variety of forms of hostile, intrusive, or annoying software or program code.

Malware includes various software including computer viruses, worms, Trojan horses, spyware, dishonest adware, scareware, crimeware, rootkits, and other malicious and unwanted software or program, and is considered to be malware based on the perceived intent of the creator rather than any particular features. In legal terms, malware is sometimes termed as a "computer contaminant," for example in the legal codes of U.S. states such as California.

SUMMARY

Embodiments including a data processing system, servers such as a federated server, computer systems, and similar devices, and associated operating methods can be configured to support fine-grained security including resource allocation and resource scheduling. A data processing system can comprise a federated server operable to access data distributed among a plurality of remote data sources upon request from a plurality of client users and applications; and logic executable on the federated server. The logic can be operable to enforce fine-grained security operations on a plurality of federated shared data sets distributed among the plurality of remote data sources.

BRIEF DESCRIPTION OF THE DRAWINGS

Embodiments of the invention relating to both structure and method of operation may best be understood by referring to the following description and accompanying drawings:

FIGS. 1A, 1B, 1C, and 1D are three schematic block diagrams and a data structure diagram respectively depicting embodiments of a data processing system configured to support fine-grained security including resource allocation and resource scheduling;

FIGS. 4A through 4M are schematic flow charts illustrating an embodiment or embodiments of methods for performing fine-grained security including resource allocation and resource scheduling; and FIGS. 5A, 5B, 5C, 5D, and 5E are schematic block diagrams respectively illustrate embodiments of a data processing system that enables use of fine-grained security including resource allocation and resource scheduling.

DETAILED DESCRIPTION

Figure 1B:
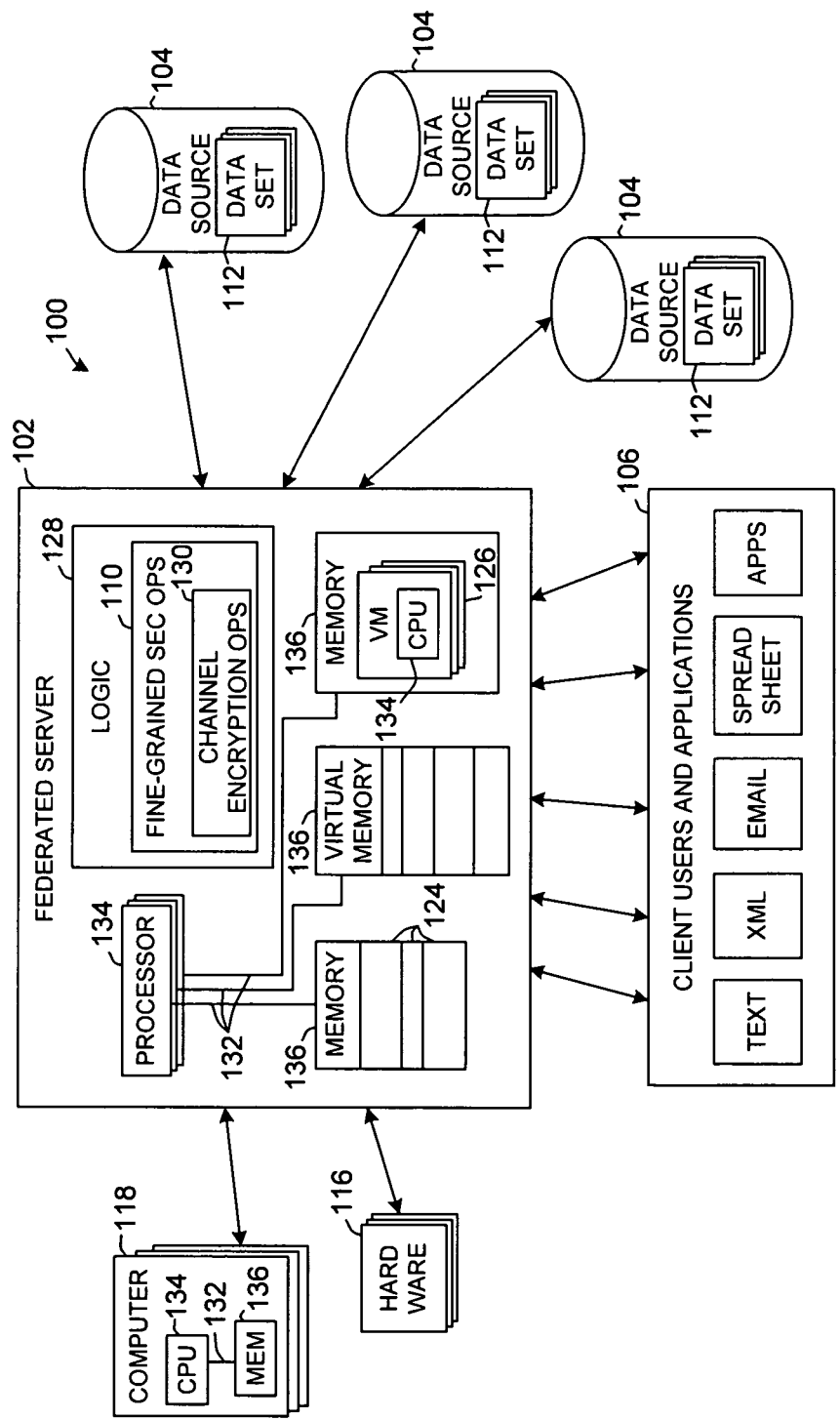

In various embodiments, computer systems can be configured to include one or more of several improvements that facilitate security. Fine-grained security can support resource allocation and resource scheduling, and can be supporting technology for hardware scheduling, virtual memory. Fine-grained security can support infrastructure in a concept of federated sharing and federated data sets. Sensor fusion involves fusing of data and data sets in numerical aspects and permissions aspects, wherein data and data sets are fused in conditions of a first entity owning or controlling a first sensor and a second entity a second sensor. Fine-grained security can be implemented in an infrastructure such as an architecture including servers and clients. In addition, intelligent or smart memory can complement security operations of a processor to substantially enhance security capabilities. One beneficial aspect of using smart memory is that an equivalent or greater strength security can be attained with a relatively lower strength encryption (and thus lower computation burden) imposed on a device sending data to the memory. Channel encryption between the processor and the smart memory module enables numerous aspects of security. Smart memory can be configured in combination with the processor to perform channel encryption. In some configurations and applications, a cryptographic and tamper-handling perimeter can be constructed for security enhancement. A cryptographic and/or tamper-handling (tamper-evident, tamper-resistant, and the like) perimeter can be formed within a smart memory module, enclosing the entire smart memory module, between dynamic random access memory (DRAM) and the smart memory module, between non-volatile random access memory (RAM) and the smart memory module, or any other suitable position. The cryptographic and/or tamper-handling perimeter can be further generalized for positioning between a smaller amount of memory and a larger amount of memory in the smart memory module. Some embodiments can include a cryptographic perimeter in the absence of a tamper-handling perimeter.

Various embodiments of computer systems can support cryptographic security with a range of distributions of channel encryption and storage encryption. In some embodiments, a security perimeter can be a cryptographic and/or tamper-handling perimeter developed around a table of keys. In some arrangements, storage encryption can take advantage of address randomization used in a memory outside a security perimeter within a smart memory module.

In various embodiments, processing functionality in general and specifically security processing can execute in association with memory. Such processing can be within or near the memory. Typically, a processor or logic can perform security functionality with a portion of computation taking place in association with the memory and another portion of computation performed external to the memory, for example in a processor that exchanges communication with the memory.

Memory with associated logic enables sending of encrypted code to the memory, further enabling security across a security perimeter enclosing the memory. A security perimeter is highly useful in various information technology fields including financial services, on-line commerce, multi-player online gaming, and many others.

In example functionality, the smart memory can hold information in memory in encrypted form and can decrypt the information during transfer to registers of a processor enabled to execute the code. In contrast, traditional shared memory holds information in unencrypted form, allowing reading by unauthorized software or users.

Accordingly, processing can be removed from a processor and transferred to logic associated with memory. One technique for shifting computation can be to send an address in the memory and running code at the address. However, when executing remote procedure calls, whether the calls are present in a library cannot be assumed so that copying of the code into memory prior to execution may be necessary. A message for such a procedure call can include a program and a pointer to data. In another model, a message can replace the concept of a pointer with that of an offset (for example to improve speed performance as in an eXtensible Markup Language (XML) application). In a further model, a message can include code, a copy of the code, and a copy of the data operated upon by the code. In an extreme example, the message can include an entire library that is transferred in one communication.

In still another model, a message can be used with a template, including part of the code but not the complete code. The message can be used to fill in part of the template. Part of the code can be previously installed in the memory and the message can include one or more instruction pointers and another portion of the code to be copied to the memory prior to execution. In some example models, the message can further include additional information such as a signature of the copied code (for instance, for information communicated back and forth to designate whether the code has loaded). Usage of a template model can enable various functionality, for example dynamic generation of code, von Neumann architecture (a single storage structure for program code and data), and the like.

In various embodiments and applications, the template can be fixed-frame or variable-frame. For example, fixed-sized frames are standard on TCP-IP networks while super-computer networks typically use variable-sized frames. Frames for a template may also be configured in a manner suitable for arranging code and data. For example, a configuration can be arranged into one page of code and one page of data to facilitate page permissions at the destination, enabling a direct memory access (DMA) type functionality that is operational across and between memory systems or subsystems, on different physical machines and different memory systems. For a system that sends a page of code and a page of data, either can be only partially full or filled to capacity, possibly generating a fault for an overflow condition. Even when the pages are only partially full, the sending of pages is highly efficient due to the ability to avoid sending of control information. The system can perform DMA into memory or into a reception area. Page granularity may be suitable for usage of virtual memory at the destination. Templates can be configured for any suitable size.

In a specific example illustrating use of a template, a program code may lack certain items, such as an EAX instruction, a register, and memory locations M0100 and M0200. The template may indicate that memory location M0100 is not available and is currently used by another process (P1). A request can be sent to the process (P1) in control of M0100 which can fill the location and send back the data or run corresponding code. Similarly, if memory location M0200 is also not available and currently controlled by still another processor (P2), the request can be sent to the processor (P2). When all the data or code is available, the code can be run.

New addressing modes can facilitate usage of templates. For example, a "message-relevant addressing mode" can enable sending some of the data (such as a binary tree). A pointer may be unsuitable for identifying the address for receiving the data because the address may not be known. Thus, a relative pointer or offset can designate the destination address. Multiple addressing modes can be implemented for usage in various conditions and situations. For example, in shared memory, the message can include an instruction pointer to data and the memory can have associated logic to execute the code. In unshared memory, the instructions can be copied and then executed. Security can be enforced, for example, for a process that attempts to branch to an instruction (or instructions) which are not copied to memory by the process, a fault can be generated and the proper instruction(s)

made available. A similar concept can be implemented for data where a subset of the data and a subset of the instructions can be sent for execution.

Fine-Grained Security

Security in existing networks, systems, and computers is coarse-grained due to large granularity of native code, for example imposed by the 4 kilobyte (kb) size of a virtual memory page. Security is sought in an environment characterized by running of applications that share data with other entities. Security is coarse-grained in that memory blocks can be individually protected. For binary code or machine code, the 4 kb granularity encompasses a large amount of data in comparison to the typical 10 or 12-bit size of machine code words for which individual protection may be sought.

Another security technique can be to assign data to a particular virtual machine, which is even more coarse-grained. For example, if security is sought in the context of a browser not known to be secure, the browser can be assigned a virtual machine that runs only the browser. A virtual machine can encompass more than a CPU alone and include other components and devices such as motherboard I/O devices. The virtual machine thus can be much larger than the 4 kb granularity of memory blocks.

Security can also be sought in software or interpretive environments, for example using Java byte code or C-sharp byte code, which can be more fine-grained but at the cost of much slower performance. An interpreter can support any protection desired, even down to individual bits but is much slower than the machine code level. Performance can be accelerated only by more coarse-grained checking.

What is desired is fine-grained security with suitable speed performance. Fine-grained security is directed toward protecting memory in fine-grained pieces.

Fine-grained security can support resource allocation and resource scheduling, and can be supporting technology for hardware scheduling, virtual memory. Fine-grained security facilitates, for example, for running applications on a computer controlled and owned by another entity.

Various techniques can be used to identify the memory items to be protected including pointers such as a pointer to an object or metadata associated with a pointer, offsets, addresses, and the like.

An example fine-grained security paradigm can use metadata associated with a pointer that identifies a lower bound, and upper bound, and permissions. The pointer can be enabled to point to particular objects or even to any position within an object. Metadata can specify permissions including memory locations to which data can be written, when program code is allowed to execute, how long writing is allowed, and the like. Permissions can be associated with data objects, for example assigning a pointer to an object and, using permissions, allowing only methods belonging to that object to access the object. Another example of permissions can enable access to data, but only for specified purposes, for instance to enable a first running of an object and access allowed to only part of a routine, while preventing access by others. In another example, a particular method can be permitted to run a limited number of times or just one time, and can prevent subsequent access to data when the data has been previously exposed to an authorized reader.

Permissions can implement a concept of poisoning. For example, a user can enter a name into a text field and mark a poisoned bit that prevents subsequent branching or subroutine return. The poisoned bit can function as a dirty bit which indicates whether an item such as an object, memory, or other resource is dirty, which prevents predetermined purposes or actions to the item, for example preventing actions applied to a data block or object, such as not allowing return.

An illustrative computer system can be configured for fine-grained security as supporting infrastructure in a concept of federated sharing and federated data sets. Sensor fusion involves fusing of data and data sets in numerical aspects and permissions aspects, wherein data and data sets are fused in conditions of a first entity owning or controlling a first sensor and a second entity a second sensor.

Fine-grained security can be implemented in an infrastructure such as an architecture including servers and clients. For example, gaming code servers and gaming console clients can interact by running program code that executes in part on machines controlled by the server and in part on machines controlled by the client. Fine-grained security enables the interaction to be mutually trusted by both sides.

Fine-grained security can be configured to exploit existing infrastructure aspects such as the Trusted Platform Module (TPM) which is installed in computer systems somewhat universally but little used in practice. TPM generally includes secure storage for keys little or no security logic.

In some embodiments, a servers and clients architecture can implement fine-grained security using one or more server downloaded modules. For example, a gaming code server can transfer a server downloaded module that executes on a client wherein the client's user software and operating system is not able to read associated TPM keys. Fine-grained security can be configured to prevent the client or user operating system from reading the TPM keys, for example to ensure isolation in software, and further configured to prevent physical attacks for example via a device such as a logic analyzer on the bus reading sensitive information.

Some system embodiments which support fine-grained security can be activated at boot-strap loading of a computer, for example via microcode executing in the processor. A further aspect of fine-grained security can include physical security of the TPM, for example through use of tamper-evident/resistant packaging. At boot-strap loading, TPM can perform various security operations such as inspecting software version and possibly microcode, ensuring viability of software, for example by creating and applying a hash to each level of code (microcode, firmware, software, and the like), checking against previously run code, signing-off on viability if warranted, and printing a signature of executing code to enable determination of trust.

Fine-grained security operations can further include building or creating a chain of trust, checking each part of operation beginning with TPM, then checking security during operating system functions, downloading of modules, and execution of procedures. In an example configuration, fine-grained security can perform checks of operation system functions which, to the first order, control all operations.

An example of chain of trust can begin with trust of an operating system (for example by an association such as Motion Picture Association of America (MPAA), International Game Developers Association (IGDA), and the like). If the operating system is certified and fine-grained security operable under the certified operating system ensures that the system is not hacked, the chain of trust is established since the operating system prevents user code from accessing downloadable code.

Weaknesses of the chain of trust can be that the process is too linear and easy to break since a single-point of failure breaks trust. Chain of trust also has problems ensuring privacy.

An extension that can improve chain of trust is a late-secure boot which is run later than a typical bootstrap load and can involve security checking in an operating system that is not yet trusted. At running of the late-secure boot, a security initialization is run which starts security process booting in a system that is already running.

A more secure concept of security can be a web of trust. The web of trust can have multiple trust levels which hand trust to the operating system. At each trust level, software can validate code in a stack of code to establish trust. In the web of trust, a failure at some point can be rechecked according to a byzantine path which forms a set of protocols to establish trust. The operating system can use pathfinding or agglomerated trust protocols to analyze trust at each level to enable multiple levels or types of trust validation.

Smart Memory

A smart memory module comprised of memory and associated logic, when combined with security functionality enables creation of program code that is execute-only and cannot be read. The logic associated with the memory can make the memory unreadable by software. The smart memory can be used in combination with a tamper-handling device or component to prevent or avoid physical intrusion, thus protecting against an intruder reading the code via a logic analyzer or similar device.

The smart memory module can be an interconnect network for a multiprocessor system. Traditionally, a processor can interact with dumb memory (such as DRAM) and interact with an interconnect network such as Hypertransport (Advanced Micro Devices (AMD), QuickPath Interconnect (QPI from Intel), and the like. Using such dumb memory, remote requests for memory have to go through the processor to the memory. By introducing smart memory modules, much functionality can be implemented on the smart memory module. Systems can be created that are not processor-heavy, where the processor communicates with the smart memory module and the smart memory module can be the connection to the interconnect fabric of the system. The smart memory module enables a high degree of security functionality, every channel, interconnection channel, Hypertransport, QPI, or whatever is the current interface can be encrypted, fundamentally facilitating channel encryption. The smart memory module thus facilitates increased integration and enables new aspects of system repartitioning. For example, Hypertransport and QPI interface functionality can be removed from the processor and repartitioned to the smart memory module. An example system embodiment can include Hypertransport and QPI interconnect both on the processor and the smart memory module. Two additional types of interconnect can be supported: 1) the Hypertransport or QPI interface on the processor, and 2) an interface between a smart memory module or modules.

In other example embodiments, the interprocessor interconnect can be cache-coherent, with an inter-memory module interconnect that is not cache-coherent. The smart memory module thus can enable differentiation between processors. Furthermore, the smart memory module can enable significant flexibility in allocating and distributing cache coherence and cache non-coherence, for example among processors and input/output (I/O) devices, and among various types of I/O. In a specific illustration, performance-sensitive I/O can be done without cache-coherence since cache-coherence costs both in power and performance.

The smart memory modules can be configured to facilitate systems with a mixture of cache-coherence and non-cache-coherence. For example, an existing super-computer uses a Partition-Globalized Address Space (GPAS), physically-realized with nodes of 4, 8, or 16 cache-coherent shared memory systems, and additional non-cache-coherent shared memory. A program executing on one processor is allowed access to information on another processor with some limitation to cross-processor snooping. The program executing on a first processor and performing a remote access to a second processor may be required to manage coherence. Logic in the smart memory module can be configured to enable various possible operations. The processor-side interconnect and the smart memory module interconnect can be different in various aspects and one possible difference is cache coherence. In various systems and/or conditions, the smart memory module can be optimized for larger interconnections, for various sizes of transfers such as large or small transfers, cache coherence, and the like. One aspect of optimizing for transfer size can be that large transfers may be more efficient in transfers directly to memory, but often small transfers can be efficient since: (a) small transfers may already be used for synchronization of very big programs, (b) transfer of a 64-byte cache line is not needed and efficient transfers are possible, for example, by incrementing a counter indicating all of a large number of processors completed and the counter can be just 32-bits wide, (c) data may be narrow and a poor arrangement for caching, and the like.

In cloud computing configurations, security may be sought simply by distributing program code into the cloud servers and executing the code remotely so that intruders don't have a centralized area from which to read the program code. Security based on decentralization in this manner may be insufficient since the code is unprotected in the cloud. Smart memory improves security by encrypting in memory so that every line that goes out of the cache is encrypted. Smart memory can also be configured to implement one or more of a variety of security schemes including channel encryption, storage encryption, RSA (Rivest, Shamir, Adleman) cryptography and key distribution, Public Key Infrastructure (PKI).

In a Public Key Infrastructure (PKI) implementation, smart memory can be used, for example, to distribute keys for a simple-stream cipher in which a state register such as a shift register emits a bit stream with feedback following a distributed initial state. A processor is used with memory, possibly of various forms such as dynamic random access memory (DRAM), random access memory (RAM), in combination with a logic chip interface. If, the processor interacts with the DRAM directly, the processor can provide encryption for data which is stored. When the data is read back from the DRAM, the read value should be the same as the written value. Encryption should be sufficient to handle multiple attacks. Channel encryption is a highly suitable technique for encrypting the interaction between the processor and memory because, in channel encryption, both the interacting processor and memory begin in a hard-wired initial state with a shared key, which is the state used for an eXclusive-OR (XOR) vector. The processor and memory begin with the shared key and periodically can change the shared key using PKI. Very strong encryption can be used to handle persistent storage. For communication across the channel encryption can easily and inexpensively be performed simply by XORing against the bit stream. Some embodiments can use other or additional security measures, for example using Advanced Encryption Standard (AES) cryptography, elliptical code cryptography, PKI, or other encryption techniques on every data packet.

In various embodiments, a smart module can include security features, for example for digital rights management (DRM) and other applications. Conventional computer systems combine processors and memory, for example a processor connected with at least two Dual Inline Memory Modules (DIMMs), each having at least nine or eighteen memory chips. Conventional computer systems can be enhanced by upgrading with one or more smart memory modules to improve security capabilities. The smart memory module can be a fully integrated module with a processor, a partially integrated module with an interface chip, or other arrangements. Thus, a processor and smart memory in a computer system can be configured over a range of integration from processor and memory integrated on the same chip, separate integrated chips in a common package and with close coupling, separate memory and processor chips that are coupled or built tightly together, stacker processor and memory chips (for example, DRAM stacked over processor or processor over DRAM) or others. One of the challenges in integrating the processor and the memory on a single chip is the fundamental difference in silicon process technology for the two types of circuits. In DRAM processes, transistors are relatively slow but are stable and hold charge for relatively long time duration. In contrast, processor process technology is generally very different from a memory process and involves many layers of metal and includes faster and leakier transistors. The fundamental difference in processes increases the cost in integrating processor and memory on the same chip at least 20% and often significantly more.

In an example embodiment, a processor can be separate from a smart memory module. In a particular example arrangement, the smart memory module can be composed of two to four DRAM chips, and possibly additional memory, interface logic, and/or a package. The interface logic may be constructed on a separate logic interface chip, for example a chip built in a process sufficiently fast to enable communication with the processor.

In another example system, a processor and a smart memory module can be combined with one or more DRAM chips. The DRAM can operate with increased efficiency by eliminating the logic interface or by integrating the processor with the logic interface so that the processor is positioned as close to the DRAM as possible.

A system with the processor manufactured separately from the smart memory module (DRAM) enables cost and performance advantages, and enables evolutionary changes in the DRAM interface. The interface between the logic device, the interface chip, and a memory chip may change over time. An advantage of a smart memory module configured as a hybrid logic/memory module is increased flexibility with regard to standardization since the interface is internal to the integrated circuit chip and can be evolved in concert with upgrades to the logic and memory, fostering innovation by reducing hindrance via aspects of organizational or political resistance. In contrast, for memory and logic that are integrated and manufactured separately, modifying the interface between the circuits can cause difficulty.

In various embodiments, the smart memory module can be implemented in different ways, for example logic-in-memory (logic integrated into a memory chip, logic partially integrated into the memory chip), logic in an interface chip closely associated with memory, logic located near the memory or in close association with the memory, processor-in-memory, and the like. From a different perspective, logic can be integrated into a memory chip, an interface chip, a DIMM, or the like, or the logic can be installed on a memory board. Logic can be placed at some location in a memory system, for example outside the processor and close to the memory.

The smart memory module can be configured to have a more direct interconnection to the various systems, devices, and I/O channels than simply connected to the nearest processor.

The smart memory module can be configured with logic operable to perform various aspects of encryption. Memory encryption can enable security operations for various reasons. For example, memory encryption can be implemented to protect against attempts by malware or viruses to break into a system. Memory encryption can also be used to prevent or make more difficult unauthorized copying of a program executing on a machine, an aspect of Digital Rights Management (DRM) since a user typically has a contractual right to run a program but not the right to make a copy. Similarly, a user of a program active in an operation such as an online game running on the Internet can have the contractual right to play the game but not to access the program code for the game and to make a modification. Another application for memory encryption can be protection of highly sensitive information on a server, for example banking operations run on the server in combination with a client machine over a user interface. Some banking calculations such as actual trusted financing logic can be run on the client machine. Encryption can be used to prevent unauthorized user access to sensitive code and data.

Memory encryption can be desirable for several reasons. Memory encryption can be used in smart cards with a processor that encrypts all information transferred to main memory. Some smart cards can perform operations such as randomization of addresses, for example writing to address 100 and 101, but the smart card processor might randomize the address or encrypt the address with a key so that the correct address 101 goes to address 63. The logic pattern can be changed and some of the operations performed by processor modified such as inserting random traps. The smart memory module can be used for encrypting memory avoiding problems with encryption that is otherwise slow and costly.

System embodiments can realize cryptographic security using storage encryption, channel encryption, or a combination of storage and channel encryption. Storage encryption is generally more computationally expensive in comparison to relatively less expensive channel encryption.

Storage Encryption

Storage encryption is the use of encryption/decryption of backed-up and archived data both in transit and on storage media. The encrypted data is typically stored on a storage device such as DRAM or a persistent storage device (a disk). The encrypted data can remain available for access indefinitely and a relentless attacker can perform extensive analysis of bit patterns to defeat security. Thus, strong encryption is desired to maintain security. A minimum storage encryption used at the present time is Advanced Encryption Standard (AES) or triple-AES.

In storage encryption, data is encrypted. Some systems or devices can increase security of storage encryption by performing address randomization in which encrypted data is stored in a cryptographically hidden address. Address randomization is useful since the addresses accessed supply ample clues as to what data is stored. Furthermore, techniques are known for breaking into systems simply by monitoring addresses, even while disregarding the data that is stored. Encrypting the address substantially increases the complexity of storage encryption since more devices than a central processing unit (CPU) can supply data to the memory, for example direct memory address (DMA) devices, disk devices, and others.

Channel Encryption

Channel encryption can improve performance and economy in various applications and conditions in comparison to expensive storage encryption. Smart memory module integrated circuits can facilitate good memory encryption, for example between a processor and memory stack. An illustrative configuration can include a CPU that interacts with a memory stack comprising multiple DRAM chips and a logic chip operable to perform strong channel encryption between the CPU and the memory stack. Information can be stored in the memory stack unencrypted or the logic can encrypt the data for storage. Thus, channel encryption can be performed between the CPU and a logic chip, enabling cryptographic security without requiring storage encryption of data stored in the logic chip.

Channel encryption, as distinguished from storage encryption, involves communication between devices, each of which includes cryptographic logic and performs cryptographic operations. In contrast, storage encryption is characterized by a first device with logic, for example a processor, exchanging information with a second device without logic, such as a disk or DRAM.

An illustrative example can be used to distinguish between storage encryption and channel encryption. The logical operations of storage encryption can be performed by a processor (conventionally for storing data to dumb memory). In storage encryption, the processor can write data D to an address A by encrypting the data D into encrypted value E(D), and writing the encrypted value E(D) to the address A. When retrieving from the address A, the encrypted value E(D) is read from the address A so that the value the processor sends out and reads back is the same. In contrast, in an illustration of channel encryption both address A and data D can be encrypted into encrypted value $E_1(A,D)$. A different encrypted value $E_2(A,D)$ can be read back because the encryption state has advanced to a different position according to a key schedule or a long-term pad that is used. Thus in channel encryption, a different encryption value can be returned in comparison to that written out. A fundamentally static character is a substantial security limitation of storage encryption. In storage encryption, the same value is written and read back. The interaction is not time-varying. Channel encryption enables improved security due to a lack of predictability from the perspective of a snooper or attacker. Channel encryption further enables dynamic security with multiple intermediate points. A storage device can be created that includes a random number generator or can contain an internal key. Channel encryption via usage of a smart memory enables randomization of encrypted information wherein encrypted data is read back and encryption can be stripped off by the receiving processor. A memory device with logic or other smart component enables time-varying encryption. Data is written to an address which, when read back, is different, but no information is lost since the reading processor or other reading device at the opposite side of the channel from the smart memory has sufficient intelligence capability to strip off the encryption.

A further security feature of channel encryption can be attained by creating a smart memory module configured to change addresses over time. The smart memory module can change the address mapping to DRAM or other memory in any suitable manner so long as the processor communicating with the smart memory module can reprogram the address mapping in a corresponding manner. The two sides of the channel—the processor and the smart memory module—can be configured so that data D1 at address A1 and at time T1 is known at time T2 to read address A2 to retrieve the correct data.

Channel encryption can improve security performance by exploiting the consideration that encryption is not expected to be for long term. An objective of channel encryption can be to encrypt data that is passing from one party to another using a cryptographic engine such as a one-time pad. Both sides have the same cryptographic model which corresponds to the key exchange and are suitably operational by maintaining synchrony between the two sides.

The interaction can be illustrated by considering single-ended channel encryption. Data can be sent from side A to side B of the channel. The interchange can be bidirectional in which side A sends to side B and side B sends to side A. The greatest possibilities for improving channel encryption are available for bidirectional interchange, for example by continually generating new random numbers and changing encryption parameters dynamically.

Channel encryption can be performed using two intercommunicating smart devices, one of which is typically a processor and the other can be a variety of storage devices configured as logic, for example included in interface logic, in a smart memory module. For channel encryption, a sending device such as a processor need not specify a storage address for storing transmitted data to the receiving storage device. Instead, a stream of commands can be transmitted which contain a mixture of address and data information.

A very simple example of a channel encryption technique is a one-time pad, a cryptography technique in which each bit or character of plaintext is encrypted by a modulation addition with a bit or character from a secret random pad or key of the same length as the plaintext, resulting in a ciphertext. A one-time pad is a random bit stream. Both ends of the channel have a one-time pad and, when sending, EXOR the data to be sent with a one-time pad, then send the encrypted data. Pad-encrypted data is sent back and forth. An attacker can only break the channel by knowing and using the one-time pad.

Another example of a channel encryption technique can use a starting random number and communicating the random number between two ends of the channel, typically a processor and a smart memory module. The random number can drive a pseudo-random number generator which is generally a short-term, finite-length one-time pad. Periodically, the processor, the smart memory module, or both create new random numbers, possibly by including internal integrated random number generators. Thus, some embodiments of a smart memory module can further comprise an integrated random number generator.

An example channel encryption technique can operate wherein both sides of the channel have a key and use stream encryption, using any desired form of stream encryption ranging from full public key encryption to pseudo-random generator techniques, to more simple streaming ciphers. Full public key encryption may be prohibitively expensive computationally and used for only some especially secure transactions. Pseudo-random generator techniques have medium complexity and used with various stream ciphers such as AES or blowfish (a keyed, symmetric block cipher). AES is relatively strong encryption and can typically be used for storing in memory, although with a relatively large computational expense. Relatively simple streaming ciphers can be used when writing to a memory location and reading back from the same location to retrieve the same data, giving ample opportunity for attack.

Channel encryption can guarantee that for every time read data is EXORed with another random number or otherwise combined with another random number so that the same pattern will not be seen multiple times.

Channel encryption techniques can use a key exchange or an exchange of random numbers which can be used as keys. Channel encryption facilitates protection of the exchange of keys from an observer. Various protocols can be used for original key distribution.

For channel encryption between a processor and smart memory module, both sides of the channel use keys available at power-up. For example, the processor and the smart memory module can each have their own keys. In one example of initialization, keys can be specific to each individual processor chip and each individual smart memory module. In other examples, one key can be assigned for each processor type from a particular manufacturer and/or one key assigned for all smart memory modules from a particular memory supplier. Sharing a key among multiple devices can severely weaken security due to the risk of a break-once, run-everywhere (BORE) attack. In various implementations, the key can be a public key, private key, symmetric key, or other key. A public key, private key infrastructure can be used to include a private key and a public key for both devices in many protocols. The computational burden of a public key, private key infrastructure is likely immaterial in an initial boot condition because initialization is infrequently performed.

At power-up, the private key is set (and secret) and the public key is broadcast to the world. The smart memory module has to determine what public key corresponds to the processor. The processor has to determine what public key corresponds to the smart memory module. In an example implementation, the key identification can be hard-wired, for example for about a dozen different processor manufacturers, twelve keys can be supplied in the system. In another arrangement, the key can be accessed via the Internet so that, for example, the system can bootstrap load and the processor requests the smart memory module from identification (and possibly version). The smart memory module can return a public key, an unforgeable hash, a challenge response such as that used in Diffie-Hellman processing, or the like. Then the processor can go to the Internet to verify the hash is proper and have the device authenticated.

For authentication of keys without using Internet connectively, a device can use storage such as cache and some initial set of trusted devices.

The processor can authenticate the smart memory module to protect against a man-in-the-middle attack in which an attacker has a logic analyzer connected between the processor and smart memory module to access, modify, and send data transmitted between the processor and the smart memory module.

Channel encryption can be facilitated by integrating a random number generator in the smart memory module since random number generation is highly useful on both the processor and memory sides of the channel. However, channel encryption can be performed in the absence of a random number generator on the smart memory module.

Systems can implement channel encryption in numerous variations. For example, channel encryption can be performed between the processor and smart memory module without using any form of storage encryption in the smart memory module, simply relying on the security of the smart memory module to protect for many purposes and attacks. Another implementation can create a tamper-proof perimeter, tamper-evident, or tamper-resistant perimeter around the smart memory module, such as the circuitry to detect liquid nitrogen. An entire range of security capabilities can be enabled, depending on how much security is needed, the type of attacks to be prevented, and characteristics of the application within which security is applied. For example, an on-line game might not call for storage encryption inside the smart memory module and can be disabled to increase operating speed while giving a desired amount of protection.

Security Perimeter

A system can include the concept of a security perimeter which combines cryptographic and physical security. A basic aspect of the security perimeter can be a perimeter beyond which all information is encrypted. For example, hardware security can be formed by a hardware perimeter. One or more security perimeters can be positioned in a predetermined manner, for example enclosing selected computers (even an entire personal computer), devices or systems, and can be nested.

In some embodiments, cryptographic security can be enforced through operations of a smart memory module. Information, including program code and/or data, inside a security perimeter can be decrypted in plain text and unprotected. Information outside the security perimeter can be protected, encrypted to make unauthorized access more difficult. Information is encrypted while passing across the security perimeter.

Various configurations of security perimeters can be formed within and/or external to the smart memory module.

In some configurations, a system can include multiple security perimeters. If desired, security perimeters can be nested, for example to include an innermost perimeter defining an area that is totally unencrypted, an area around the innermost area that is fairly weakly encrypted, and an enclosing area around the inner perimeters with a fairly strong encryption.

A security perimeter may be useful for implementing a digital rights management (DRM) security application. In a data center or in an application where the quality of security is important, various circumstances may be pertinent to determining what level of security to apply. For example, various degrees of trust may apply to the network, service providers, servers, client computers, and the like. A rented or borrowed user computer may have a very low level of trust with a user having little protection from access of user information by the owner or controller of the computer. Similarly, a user accessing servers of a client may voluntarily expose information to a service provider. For example, a user preparing taxes using a tax preparation service in a cloud can assume the provider has access to social security and tax numbers, and must determine whether the provider can be trusted. A user of a data center must also determine whether to trust the managers and system administrators who may be low-paid students or workers who may be very technically competent for accessing information. In such conditions, a user may desire to protect the data such as by encrypting data that is running in a public application or public system.

Another application can be protection of data on handheld wireless devices or cell phones. A password can be stored on a cell phone and can be stolen to enable access to confidential information.

The security perimeter can also include protection against physical access or attack, for example a tamper perimeter or physical security perimeter. Both physical security and electrical (or cryptographic) security can be associated with the security perimeters. In practice, a system can be configured with multiple perimeters of various cryptographic and physical security characteristics. A tamper-handling technique can be tamper-proof, tamper-resistant, tamper-evident methods. Tamper-proofing relates to a technique that absolutely prevents tampering, generally an impossible goal in view of the possibility of unlimited access, time, and expense which can be applied by a dedicated attacker. A tamper-evident technique relates to the ability to detect an attack. Tamper-resistance means tampering is made more difficult—how long an attack can be resisted attack from a suitably motivated attacker.

Physical security in forming a physical perimeter can be organized in various selected manners according to expected attack mode. A threat model can be derived according to what is to be protected against. A server farm can be owned controlled by various entities, each of which can have varying degrees of trust. Data centers may have a range of inherent control of resources, from a highly secure environment of military, government, and Fortune-100 corporations, to relatively medium or low levels of security in colleges and schools, to very relaxed environments. Various data centers can have varying degrees of camera and electronic surveillance.

A threat model for a home personal computer can presume that memory is not included in the perimeter since memory is classically upgraded. To a first order, the perimeter can contain the processor and in some systems can also include a network interface. Thus, a suitable security perimeter can comprise the processor which can be made physically secure and tamper-evident. Data (all information passing the security boundary) leaving the processor can be encrypted. Network traffic can be encrypted since only a moderate bandwidth is consumed and performance is not impacted. However, cache-memory traffic is substantial and memory is highly latency-sensitive so adding cycles reduces performance. Encrypting memory is somewhat burdensome but becomes very substantial when cache is encrypted. Accordingly, performance can be greatly improved by encrypting internally to memory subsystem hierarchy, for example through usage of a smart memory module. In an illustrative embodiment, faster main memory RAM can be placed within a security perimeter and slower non-volatile memory positioned outside the perimeter with memory data transfers between RAM and non-volatile (NV) memory (or NV memory cache) encrypted. Another example embodiment can include memory and Phase Change Memory (PCM) interfaces wherein a security perimeter can enclose the memory and only traffic that flows between the memory and the PCM cache can be encrypted. Accordingly, data is encrypted between the memory and PCM (non-volatile RAM).

In current systems, processor logic is generally not integrated with memory. In future systems, such integration is possible with some accommodation between distinctions between processor and memory silicon processing technology, circuit speed, and circuit optimization. Positioning of the security perimeter can take into consideration such processor/memory integration, for example by forming a perimeter enclosing the processor/memory integrated circuit and encrypting data passing between the integrated circuit and outside memory and other components and devices.

One example of a tamper-resistant apparatus can be a Faraday cage that allows no radio frequency signal to pass and which can have sensor connections indicative of electrical characteristics internal to the cage. A short circuit can perform intrusion detection, indicating an attack and that trust is broken. Some embodiments of a tamper-resistant apparatus can include control logic operable to erase stored information before unauthorized reading is possible.

Another example tamper-handling method and apparatus can address attacks based on remanence or remanent magnetization, a phenomenon wherein magnetization is left behind in a permanent magnet after an external magnetic field is removed. Thus, the magnetic field of memory chips can be detected and analyzed by spraying the memory chips with liquid nitrogen and moving the chips to another computer to enable reading of the remanent information. Encrypted information in the memory can be accessed along with cryptographic keys to enable access. Accordingly, information on a lost laptop or cell phone can be accessed despite cryptographic security. A tamper-handling device can be included in a security perimeter to give some protection against physical intrusion.

In some configurations, the security perimeter can be implemented purely using logic, such as operating fully in software. In other configurations, the security perimeter can take other forms such as partly using logic and partly using other techniques for devices. Sometimes the security perimeter can be associated with tamper-evident mechanisms. For example, one technique for implementing tamper-handling can be a device that analyzes integrated circuit chip temperature to determine whether a liquid nitrogen freeze has been applied to the chip. The technique enables detection of an attack but does not prevent the attack. An illustrative tamper resistant mechanism can monitor temperature and, upon detecting a notable reduction in temperature, erase the data before unauthorized reading or other manipulation. Other tamper resistant or tamper evident mechanisms can be used.

A hardware perimeter can be configured around memory, which can be a very large perimeter, for example in the case of a data center which includes a vast amount of memory and other storage.

An example embodiment of a security perimeter can be implemented in a data center. Computer system elements can include blades—modules plugged into a server. A typical blade has a central processing unit (CPU) or processor, disks, memory, and the like. The blade forms a convenient package which can be enclosed in metal with a tamper-resistant mechanism attached to enable, in response to a security break, self-destruction of the blade, for example by exposing to acid, to erase any readable data. The tamper-resistant mechanism can be combined with cryptographic security in which data flowing across a blade boundary can be encrypted, thus forming a security perimeter for a whole blade.

Some data centers are composed of computers which include memory but do not include disk storage. The disks are housed elsewhere. A security perimeter can be retracted to enclose processors and memory systems with storage on a disk external to the security perimeter so that data flowing to and from the disk is encrypted. The security perimeter can be further retracted to enclose processors and processor caches but not around dynamic RAM (DRAM) of the memory systems and not around the disks so that information flowing from cache to memory is encrypted and decrypted, but data flowing between the processor and cache is not cryptographically processed to avoid computation penalty for a cache miss.

An embodiment of a system can support a security perimeter using a smart memory module. An example configuration can include a processor and a smart memory module—a hybrid memory cube which includes logic and multiple DRAM devices, and typical devices and components that make up the computer system. The smart memory module can be used to enable a security perimeter enclosing the processor wherein the memory is outside the perimeter and information passing from the processor in memory, for example DRAM, is encrypted.

The smart memory module enables receipt of encrypted information from a processor and decryption local to the memory module. The communication channel between the processor and the memory module can be encrypted using channel encryption. Channel encryption between the processor and the smart memory module enables stronger and more efficient encryption than is possible with storage encryption.

In contrast, in a system using a convention memory module with no or limited processing logic all encryption and decryption can only be executed by the processor, which is inefficient and costly, using relatively expensive storage code.

In other configurations, the smart perimeter can be positioned within the smart memory module. For example, a memory subsystem can be formed to include DRAM and a large amount of nonvolatile memory such as flash or phase change memory (PCM). The DRAM can function as a cache for the PCM or nonvolatile memory. Accordingly, channel encryption can be used between the processor and logic interface device in the smart memory module. The logic interface device can decrypt the information encrypted by the processor and sent over the channel and store the decrypted information in the DRAM, then can use storage encryption when passing the information from the DRAM to the PCM or nonvolatile memory. A corresponding tamper-handling perimeter can be combined with such a cryptographic perimeter. Thus, for example, a small tamper-evident module such as a single-chip can be positioned in the location of the cryptographic perimeter. Furthermore, the tamper-evident and security perimeter can be retracted just to the logic interface device where channel encryption can be used between the processor and the logic interface device inside the smart memory module. The smart memory module can be used to decrypt some of the data or store the data in a partially-encrypted form. For example, some but not all of the channel encryption can be stripped, and then selected memory randomization techniques and obfuscation or crypto-obfuscation techniques applied. Thus, a medium level of encryption can be applied to information in the logic interface device in comparison to the stronger encryption to the data stored in the DRAM which is outside the logic interface device and outside the cryptographic perimeter of the logic interface device. The logic interface device can store a selected amount of key information that can be decrypted and map requests from devices such as disks, disk drives, and the like. The logic interface device can randomize the addresses involved in storage encryption, which is difficult to achieve with a memory without logic support. In contrast, a smart memory module including the logic interface device can randomize addresses so that even with relatively weak storage encryption can attain sufficient security to store even the most sensitive information within the cryptographic and tamper-proof perimeter of the logic interface device.

In an example system with non-volatile RAM, putting fast memory inside the perimeter and non-volatile RAM outside the perimeter is a compromise to hybrid memory. Design considerations that may be taken into account include: 1) constructing the perimeter around the memory is costly and difficult, and 2) placing sufficient memory in the processor chip stack can result in fewer memory constraints in the chip stack with non-volatile RAM positioned outside the perimeter. In one suitable hybrid configuration, volatile memory can be positioned inside the perimeter with non-volatile memory outside.

In the present document, the term "code integrity" refers to techniques that seek to ensure that code is only used for its designed purpose, and is not exploited by malware.

For example, malware which controls the stack can use return-oriented programming, a technique used to execute code without injecting binary executable code. Code integrity techniques can be implemented to prevent some such ad-hoc and unjustified returns.

Malware can occasionally exploit instruction misalignment to synthesize instruction streams other than those planned by the user. Techniques can be used to prevent instruction misalignment. However, exploits such as return oriented programming are possible even on machines with strict instruction alignment and fixed length instructions.

Exploits can also take advantage of indirect branches in a manner similar to a return (returns are simply indirect branches to a caller IP on the stack), although returns are much more common than indirect branches. Indirect branches are more difficult to exploit since to do so requires, for instance, the ability to violate a stack location which will be loaded into a register used to make an indirect jump.

Attacks on code integrity can take other forms. Terms such as hijacking or code hijacking reflect how attacks on code integrity do not involve code injection, but rather take control of code that is already present.

Disclosed herein are several devices and techniques for preserving code integrity.

Most instructions in program code are not legitimate branch targets, at least not for ordinary control flow such as goto instructions or jumps, indirect jumps, calls, and returns. Although many, if not most or all instructions, may be legitimate targets for returns from interrupts or exceptions, but this special case is usually associated with returning from operating system code in an interrupt handler.

Techniques are disclosed herein for tagging legitimate branch targets. One basic technique for ensuring code integrity involves tagging legitimate branch targets; or, similarly, to distinguish legitimate branch targets from non-legitimate branch targets. Distinction between legitimate branch targets and non-legitimate targets can be made, for example: (a) via a bit in each instruction, and (b) by only allowing the instruction at the branch target to be a special instruction or class of instructions, which may be called a legitimate branch target instruction.

This sort of legitimate branch target instruction is similar to (but not quite) the infamous "come-from" instruction.

Because branch targets are relatively common, using the legitimate branch target instruction on an instruction set with 32-bit fixed-length instructions may be inefficient, but may be acceptable if the instruction set allows 8-bit no-operations (NOPs).

Note that using a NOP from an existing instruction set as a legitimate branch target instruction has the advantage of backward compatibility. For instance, new code annotated in this manner would run on old machines (x86 has a plethora of 8-bit instructions, such as XCHG EBX, EBX).

Distinction between legitimate branch targets and non-legitimate targets can further be made, for example: (c) by using non-adjacent metadata, for example, by creating a data structure indexed by Instruction Pointer (IP) address, associating metadata with the IP.

Such legitimate branch target metadata can be only a single bit used to indicate that the instruction is permitted to be a branch target (possibly small dense metadata, in the form of a bit per IP). In other configurations, the legitimate branch target metadata can be a longer list, indicating the only IPs that are allowed to branch to the specified location. An example can be sparse or relatively sparse but large metadata, such as a list of branch-from IPs, or classes of IPs.

Any of the existing, well-known forms of memory metadata can be used for the instruction annotations of legitimate branch targets including in-band or out-of-band instruction tags. Additional techniques such as in-band can be enabled because of special circumstances of instruction set design.

In-band tags can include, for example, a bit in each instruction opcode on an instruction set originally designed to include the tags, or specific legitimate branch target instructions. Out-of-band instruction tags can include larger metadata such as a list of branch forms.

Techniques are also disclosed herein for enforcing legitimate branch targets. Enforcement of legitimate branch targets can be performed inline or offline and/or out-of-line.

Inline enforcement can be implemented. For example using a new instruction set can be defined in which a trap occurs if a branch is made to an instruction that is not a legitimate branch target.

Enforcement of legitimate branch targets can also be implemented via an enabling operating mode. For example, an existing instruction set can be modified by creating a mode for legitimate branch target enforcement. By default the mode can be disabled. When enabled, checking can be performed inline, for example by using tags.

An instruction set and associated system that implement a legitimate branch target enforcement mode employ some technique for enabling and disabling the mode. For example, the legitimate branch target enforcement mode can be controlled by appropriate instructions such as ENABLE_LEGITIMATE_BRANCH_TARGET_CHECKING and DISABLE_LEGITIMATE_BRANCH_TARGET_CHECKING. These instructions can be configured as generic instructions which set a bit in a control register. A desirable capability may be to enable checking inside particular functions near to the function call entry point, and to disable on return from the function. The location of checking by out-of-band metaband can be implicitly indicated, a functionality well-suited to out-of-line checking.

Offline and/or out-of-line enforcement can be implemented. For example, checking can be performed out-of-line by a thread separate from the executing thread.

In some embodiments, legitimate branch targets can be enforced through use of a log-based architecture (LBA), which can be formed by adding hardware support for logging the trace of a main program and supplying the trace to another currently-nonexecuting processor core for inspection. A program running on the second core, called a lifeguard program, executes the desired logging functionality. Log-based architecture lifeguards execute on a different core than the monitored program and increase efficiency since the concurrent programs do not compete for cycles, registers, and memory (cache). Logging by the lifeguards directly captures hardware state and enables capture of the dynamic history of the monitored program.

In an example embodiment, a lifeguard can drive the log record fetch, operating as a set of event handlers, each of which ends by issuing a specialized "next LBA record" instruction, causing dispatch hardware to retrieve the next record and execute the lifeguard handler associated with the specified type of event. Appropriate event values, such as memory addresses of loads and stores, and legitimate branch target tags, are placed in a register file for ready lifeguard handler access. Thus, a particular lifeguard can be used to implement legitimate branch target enforcement.

Any of the disclosed techniques for enforcing or checking legitimate branch target rules can be applied, to any of the forms of legitimate branch target, ranging from simple to more advanced forms. The simple forms disclosed hereinabove include a single-bit tag indicating the instruction either is or is not a legitimate branch target, and a list of legitimate branch-from addresses for a particular legitimate branch target.

Another example of a suitable type of branch target is "local branch only" wherein a target is allowed to be branched-to only by "local" code.

Identifying code as "local" enables x86 segmentation support of near/far memory wherein memory is divided into portions that may be addressed by a single index register without changing a 16-bit segment selector (near), and a real mode or x86 mode with a segment specified as always 64 kilobytes in size. "Local" may be considered to imply IP-relative branches with a limited offset, for example 16-bits.

Still another example of a suitable type of branch target is a "indirect branch target" in which the instruction is or is not allowed to be branched-to by an indirect branch. Typically, most instructions are not allowed to be branched-to. In an example embodiment, the indirect branch target may be accompanied by a list of indirect branch instructions that are allowed to branch to the target. One is often sufficient, although certain optimizations replicate the indirect branch of a CASE statement.

A further example of a suitable type of branch target is a return in which the instruction is or is not allowed to be returned-to.

Any of the techniques such as inline tag or instruction, out-of-line can be used. But the special case of CALL/RETurn permits some optimization. On a fixed length instruction set, the return IP can simply be deprecated by the instruction width, combined with checking for the presence of a CALL instruction. The technique is operable even on variable length instruction sets if the CALL instruction is fixed length. On instruction sets with more pronounced length variability, the calling convention can be redefined to record the IP of the CALL instruction, not the instruction after the CALL. A RETurn instruction can be used to ensure that a CALL instruction is at the correct place, before incrementing the IP to resume execution at the instruction after the CALL.

One disadvantage of CALL and RETurn legitimate branch target arrangements is that techniques to prevent return address stack destruction such as stack shadowing are inapplicable.

A list of places where a RETurn is allowed from can be supported. Also generic indications such as "local" versus "remote" returns can be supported.

Another example of a suitable type of branch target can be a "No-eXecute (NX) bit branch-from" instruction. The NX bit can be used by processors to segregate areas of memory for use by either storage of processor instructions or code for storage of data.

The current instruction can be a legitimate branch target of code that is (or is not) marked as read-only executable code. For example, a default condition can be imposed that branches are only allowed from read-only code. Only instructions that are expected to be branched-to from writable code pages can be marked, for example instructions that are permitted targets for code generation such as self modifying code (SMC).

In an example embodiment, traditional operation of the NX bit can be modified to attain functionality of "from pages marked with the NX bit when NX bit checking is disabled." In other embodiments, the same functionality can be attained by introducing a new mode.

Still another example of a suitable type of branch target can be a "CALL target" instruction wherein the current instruction is (or is not) allowed to be the target of a CALL.

Any of the disclosed techniques, for example tag bit, special instruction, out-of-band, and the like, can be used with the CALL target, although again, the characteristic of the CALL target as being close to a function call, may impose usage of "standard" special instructions like the x86's ENTER instruction, rather than a new ENTRY POINT instruction.

One aspect of instruction set design is instruction set length and alignment. Considerations taken into account in determining instruction length include whether the instruction set should have fixed length instructions or variable length instructions, and how long the instructions should be.

For example, GNU Compiler Collection (GCC) is a compiler system supporting various programming languages. A group developing a GCC Compiler for an IBM Research Supercomputer selected fixed-length 40-bit instructions on the basis that 32-bit instructions were insufficient for selecting from among 256 registers. Usage of fixed-length instructions enables hardware with simpler decoding circuitry. The program counter (PC) is specified to count instructions rather than bytes and the instructions are a single byte long.

Mid-Instruction Branching

Another aspect of instruction set design is to determine whether to allow branching into the middle of an instruction, a determination that may be considered an instruction alignment issue, related to the data alignment issue for date memory references.

Strict Instruction Alignment

In a system with strict instruction alignment, instruction sets can impose fixed-length instructions with a length N, requiring all instructions to be on addresses A such that A mod N=0 (on multiples of N).

Strict instruction alignment can be considered to extend to instructions with variable length instructions where all the larger instructions are multiples of all of the smaller instructions, for example an instruction set with 16-bit, 32-bit, and 64-bit instructions. In a specific example, a 16-bit instruction can begin on any even 8-bit boundary, but a 32-bit instruction must begin on a 32-bit boundary, implying that one 16-bit instruction must always be associated with a second 16-bit instruction or a 16-bit NOP to enable a 32-bit instruction to begin. A similar condition applies for 64-bit instructions.

A similar allowable strict instruction alignment instruction set can include 16-bit, 32-bit, and 96-bit instructions, but not have 64-bit instructions.

An example of a strict instruction alignment configuration is the Gould NP1 superminicomputer that imposed strict instruction alignment of 16-bit and 32-bit instructions that can allow a pair of 16-bit instructions within a 32-bit block to be executed in a superscalar manner.

Most existing instruction sets of mixed 16-bit and 32-bit instructions do not appear to require 32-bit instructions to begin on a 32-bit boundary, except for instruction sets that have 16-bit and 32-bit instruction modes rather than full interleaving of the different instruction sizes.

Strict instruction alignment is essentially a natural alignment, although the term natural alignment is more usually associated with power of two sizes of data, such as 8-bit on any byte boundary, 16-bit on any even byte boundary, 32-bit on any boundary that is a multiple of four, and the like.

Overlapping Variable Length Instructions

A system can be configured with overlapping variable length instructions. For instruction sets with variable length instructions, or even for fixed-length instructions but where strict instruction alignment is not required, branching into the middle of a valid instruction may be possible, and to find in the middle of a valid instruction a new, different, valid instruction. Thus, any particular contiguous block of instruction bytes may correspond to several possible sets of instructions, depending on where the block is entered. (Note the observation that such instruction sequences often resynchronize after a short time, which has be attributed by Jacob et al. to the Kruskal Count. Refer to Matthias Jacob, Mariusz H. Jakubowski, and Ramarathnam Venkatesan. 2007. Towards integral binary execution: implementing oblivious hashing using overlapped instruction encodings. In Proceedings of the 9th workshop on Multimedia \& security (MM\&\#38; Sec '07). ACM, New York, N.Y., USA, 129-140).

For example, the Intel x86 code sequence:
B8 01 C1 E1 02 90 41,
corresponds to the instruction:
move ax, C1E10290;
but also contains the sequence:
C1 E1 02 90 41,
which corresponds to the instruction:
shl eax, 2; nop,
if started not at the first but at the third byte.

Overlapping instructions have historically caused problems for disassemblers and decompilers, and have been used as ways of obfuscating code, for example hiding malware or copy protection code. Overlapping instructions have been used to break into code, for example by branching around checking sequences, or in creating little snippets of code to be executing by stack smashing returns.

Overlapping Non-Strict Fixed Length Instructions

A system can be configured with overlapping non-strict fixed-length instructions. Most instruction set architectures with fixed-length instructions also have strict instruction alignment.

The system disclosed herein suggests extension to instruction sets with a non-strict alignment, for example an instruction set comprising 5-byte, 40-bit instructions.

The program counter (PC) can be operable to contain instruction byte addresses, and strict enforcement is not enforced by requiring that an instruction address be equal to zero mod 5.

The problem can be avoided, for example by having the program counter (PC) contain instructions rather than instruction byte addresses, obtaining the byte addresses by multiplying by 5 (x<<2+x).

However, the problem is not solved since virtual address aliasing may also result in out of synchrony instruction boundaries. Approaches such as requiring strict instruction alignment to a non-power-of-2 may greatly reduce, but cannot eliminate, the frequency of the instruction misalignment in the presence of possible operating system virtual memory misbehavior. For instance, instruction misalignment may be ignored for performance reasons, but not correctness and security.

The problem of instruction misalignment, specifically branching into the middle of an instruction, can be addressed or ignored. Addressing instruction misalignment is desirable because binary translation tools such as Intel Pin are more easily written in the absence of instruction misalignment and such tools can be very useful in performance optimization. A further advantage of preventing instruction misalignment is that strict instruction alignment plus other constraints sometimes facilitates operation of decoded instruction caches. A reason to allow instruction misalignment is that the binary translation tools facilitate movement of binary code to other computing systems, including systems with other instruction set architectures, at the corresponding cost of reduced security.

One condition for facilitating the building of a decoded instruction cache is an instruction set with fixed length instructions and strict alignment of power of two-sized instructions: 16-bits, 32-bits, 64-bits, and so on. This condition may be insufficient in practice. A further condition is that decoding be 1:1 so that a fixed number of instruction bytes or words always produce a fixed number of instructions. The second condition is not always met. Some so-called RISC (Reduced Instruction Set Computer) instructions may naturally be desirably decoded into multiple internal instructions.

A non-1:1 mapping of instruction addresses to decoded instructions substantially increases the difficulty of configuring decoded instruction caches for several reasons including the presence of variable length instructions, instructions with a variable number of decoded microinstructions, and optimizations that remove instructions. Removing a few instructions per line may be easy to handle simply by padding but significant optimizations are more difficult to achieve.

In particular, basic block caches and trace caches present challenges because even if a 1:1 mapping of instructions to micro-operations (uops) exists, the number of instructions and/or uops in a basic block or trace may be variable. Or, if the number of instructions of uops is fixed in such a basic block cache, the number corresponds to a variable, and possibly discontiguous, range of instruction bytes. Instruction address range variability for cache blocks complicates instruction cache snooping.

Instruction misalignment poses different issues for machines with and without a coherent instruction cache. On a machine with an incoherent instruction cache, not only may the instructions being executed be inconsistent with memory, but incoherent copies may be present in the local instruction cache, possibly resulting in even more inconsistent performance than for ordinary lack of coherence. However, similar performance problems can occur with a trace cache, even with fixed-length instructions.

Accordingly, whether instruction misalignment should be addressed has advantages and disadvantages. In practice, microarchitectures that can handle instruction misalignment have been built and have been successful.

One reason to address instruction misalignment is code integrity. Instruction misalignment has often been used by malware. Preventing instruction misalignment can improve security.

Various techniques are disclosed herein for eliminating instruction misalignment. Results attained by applying these techniques can be compared in terms of cost in actual expense and performance.

Instruction encoding can be defined to prevent instruction misalignment.

Instruction Encodings for Preventing Misalignment

One technique for instruction encoding to prevent instruction misalignment is an in-line tag bit per minimum instruction chunk to indicate the start of an instruction.

In an illustrative example, for an encoding of a 16-bit instruction which appears as:

1xxx_xxxx_xxxx_xxxx.

The encoding of a 32-bit instruction can be:

1yyy_yyyy_yyyy_yyyy 0yyy_yyyy_yyyy_yyyy.

The encoding of a 64-bit instruction can be:

1zzz_zzzz_zzzz_zzzz 0zzz_zzzz_zzzz_zzzz

0zzz_zzzz_zzzz_zzzz 0zzz_zzzz_zzzz_zzzz.

In the illustrative example, in general all instructions are multiples of the minimum instruction chunk size, in the above sample, 16-bits.

Each instruction chunk has a bit that indicates whether the bit is the start of an instruction, in more generality, a multi-bit field or possibly even the entire chunk.

The fields of xs, ys, and zs may disambiguate and thus fully decode to indicate the proper length. Another possibility is that the fields xs, ys, and zs may not disambiguate completely so that one instruction chunk past the end of the current instruction may have to be examined for decoding to find another instruction chunk that is marked as the beginning of an instruction. For the second possibility, requiring a padding instruction indicating the end of the previous instruction may be desired for placement at the end of a code segment, separating code and data.

Usage of instruction encodings to prevent instruction misalignment is advantageous because the techniques are simple.

A disadvantage with usage of instruction encodings to prevent instruction misalignment is that discontiguous instruction fields can result. For example, a 16-bit constant literal inside the instruction would be split into 15-bits and than a single bit.

This disadvantage can be handled by in-instruction size encoding.

For an illustrative example of in-instruction size encoding. An encoding of a 16-bit instruction can appears as:

For an illustrative example of in-instruction size encoding. An encoding of a 16-bit instruction can appears as:

1xxx_xxxx_xxxx_xxxx.

The encoding of a 32-bit instruction can be:

1yyy_yyyy_yyyy_yyyy 0yyy_yyyy_yyyy_yyyy.

The encoding of a 96-bit instruction can be:

1zzz_zzzz_zzzz_zzzz 0zzz_zzzz_zzzz_zzzz

0zzz_zzzz_zzzz_zzzz 0zzz_zzzz_zzzz_zzzz.

Instruction alignment bits can be collected at the start of the instruction. Let the encoding of a 16-bit instruction appear as:

1xxx_xxxx_xxxx_xxxx.

The encoding of a 32-bit instruction can be:

01yy_yyyy_yyyy_yyyy yyyy_yyyy_yyyy_yyyy

The encoding of a 64-bit instruction can be:

001z_zzzz_zzzz_zzzz zzzz_zzzz_zzzz_zzzz zzzz_zzzz_zzzz_zzzz zzzz_zzzz_zzzz_zzzz

The illustrative encoding use an encoding trick of finding the first set bit to indicate size, permitting extensibility, for example, to 128-bit instructions. The depicted encoding is optional and can be replaced with a more-packed, less-extensible encoding. For example, the encoding of a 16-bit instruction can appear as:

1xxx_xxxx_xxxx_xxxx.

The encoding of a 32-bit instruction can be:

00yy_yyyy_yyyy_yyyy yyyy_yyyy_yyyy_yyyy.

The encoding of a 64-bit instruction can be:

01zz_zzzz_zzzz_zzzz zzzz_zzzz_zzzz_zzzz zzzz_zzzz_zzzz_zzzz zzzz_zzzz_zzzz_zzzz

The illustrative encoding has less extensibility. Another example can use a three-bit field for the 32-bit and 64-bit instructions.

However, because the bits that indicate instruction alignment are at the front of an instruction, for branching into an instruction at an address that is something like 2 modulo 4, whether the position corresponds to a 16-bit instruction the middle of a 32-bit or 64-bit instruction is unclear. To resolve the condition may require looking back in the instruction stream.

A technique for looking back in a strictly-aligned instruction stream may be used.

In a strictly aligned instruction stream, 32-bit instructions are positioned on a 32-bit boundary, and 64-bit instructions are positioned on a 64-bit boundary, and so on. The positioning is most easily attained if instructions are powers of two in size such as 16-bit, 32-bit, 64-bit, or at least are all multiples of all smaller instructions.

Instruction boundaries for each of the instruction sizes can be observed, up to the largest naturally-aligned instruction size. For example, if positioned at a 16-bit boundary, look to the earlier 32-bit and 64-bit boundaries. If positioned at a 32-bit instruction, look to the earlier 64-bit boundary. If positioned at a 64-bit instruction, look no further, since no larger instruction size exists in the example.

For positioning at a 16-bit instruction boundary, and if the 32-bit and 64-bit boundaries observed by looking-back do not indicate existence of a larger overlapping instruction, then the looking-back operation is complete.

A generalized example of the looking-back technique can be described in pseudocode as follows:

Given an instruction pointer IP
If the bit stream at this position decodes to an illegal instruction, stop
If the bit stream at this location decodes to a legal instruction whose size satisfies the alignment, continue else stop
For all larger instruction sizes Sz
   look at the earlier Sz-yh boundary ("round down" to a Sz-th boundary)
   If the bit stream at this location decodes to a legal instruction whose size satisfies the alignment of the boundary and whose size would overlap the current instruction
Then flag an error for the current instruction.
end loop
if arrived here then no instruction alignment error was detected The illustrative approach does not require explicit fields for instruction size in the instruction, although such fields are convenient.

The technique is suitable so long as the encodings disambiguate, such that:

xxxx_xxxx_xxxx_xxxx,
yyyy_yyyy_yyyy_yyyy yyyy_yyyy_yyyy_yyyy, and
zzzz_zzzz_zzzz_zzzz zzzz_zzzz_zzzz_zzzz
zzzz_zzzz_zzzz_zzzz zzzz_zzzz_zzzz_zzzz The encodings disambiguate so long as some bit differences exist between the first 16-bits of the xs and ys and zs, and some bit differences exist between the first 32-bits of the ys and zs, and the like. The encodings disambiguate so long as bit differences exist between any two instructions, within the length of the smallest instruction.

The size fields, such as 1/01/001 or 1/00/01 indicate that fewer bits are observed. The entire instruction need not be decoded.

A technique can be used for looking back in a non-strictly aligned instruction system. For example, assume a mix of 16-bit and 32-bit instructions that are not strictly aligned. A 32-bit instruction can begin on any 16-bit boundary, although 16-bit instructions must begin on 16-bit boundaries.

Encoding of a 16-bit instruction can appear as:
1xxx_xxxx_xxxx_xxxx.
Encoding of a 32-bit instruction can be:
01yy_yyyy_yyyy_yyyy yyyy_yyyy_yyyy_yyyy.

A technique for detecting branching into the middle of the 32-bit instruction depicts actions taken for a branch to an arbitrary location, looking back.

First, determine whether the position is at a legitimate instruction boundary. For an example instruction:
iiii_iiii_iiii_iiii.

The instruction may look like a legitimate instruction, but may turn out to be bits from the middle of a larger, overlapping instruction.

In a simple case, if the instruction looks illegal, stop.
Looking back −16-bits may be seen as:
1hhh_hhhh_hhhh_hhhh,
which is possibly a 16-bit non-overlapping instruction.

Looking at instruction:
iiii_iiii_iiii_iiii.

The instruction at −16-bit could be a 16-bit instruction indicating a legitimate instruction boundary. Or the instruction could be part of a 32 bit instruction. In the latter case, since no instruction sizes are larger than 32b, then the instruction boundary is legitimate. Thus, if the instruction at −16-bit is a small instruction that does not overlap, the instruction boundary is legitimate.

Looking back −16-bits may be seen as:
01 hh_hhhh_hhhh_hhhh,
which is possibly a 32-bit overlapping instruction.
Looking at instruction:
iiii_iiii_iiii_iiii.

The instruction at −16-bit could be a 32-bit instruction indicating positioning at an instruction boundary that is not legitimate. Or the instruction could be part of a 32 bit instruction. In the latter case, since no instruction sizes are larger than 32-bit, then the instruction boundary is legitimate.

Looking back −16-bits may be seen as:
1ggg_gggg_gggg_gggg
01hh_hhhh_hhhh_hhhh
Looking at instruction:
iiii_iiii_iiii_iiii.

If all instruction chunk boundaries look like a possible sequence of possibly overlapping instructions, then no basis to "synchronize" is available. Determining whether the instruction boundary is legitimate is not possible. The problem is lack of ability to determine how far back to look.

Various special techniques can be used to determine legitimacy of instruction boundaries, for example by requiring the compiler to insert a synchronization instruction every N instructions. But in general looking back an arbitrary amount is undesirable. One special technique may be to always ifetch (instruction fetch) the naturally-aligned 128 bits surrounding a 16-bit chunk. But looking backwards across pages or other boundaries is undesirable.

Still another technique for encoding instructions to prevent instruction misalignment is the usage of in-line multiple-instruction templates.

Techniques disclosed hereinabove indicate the operation of in-line tag bits at fine granularity. Other of the disclosed techniques teach how the additional information of strict instruction alignment enables instruction misalignment to be detected, both with and without fields that specify instruction size. But in-line instruction granularity tag bits don't work if an infinite sequence of possibly overlapping instructions precedes the observation position.

To avoid the undesirable action of looking back an arbitrary amount, instruction fetch can be divided into fixed size blocks, for example 128 bits. All instruction fetch can be configured to fetch this large a block, even though branching to an instruction inside the block, and not at the beginning of the block, is possible. Or, at least, the location inside the block being branched-to is fetched, plus a few more bits possibly elsewhere in the block.

The block can be operable as a template, with a few bits at a well known place in the large block (for example 128 bits), indicating instruction boundaries.

An example can be used to explain operation of the in-line multiple-instruction templates. The example template is specified in the form of 128-bit blocks. Instructions that are a multiple of 16-bits, such as 16-bits and 32-bits, are allowable although the example can also handle 48-bit, 64-bit, 96-bit, 128-bit, and the like instructions. The 0th 16-bit chunk of the block can be reserved for block template bits. Other aligned 16-bit chunks of the block can contain instruction data. Eight 16-bit chunks can be in the block—actually seven, since the least significant chunk is occupied by the template. A bitmask can be specified as follows: bits 1 to 7, indicating an instruction boundary. For example, bit i being set can mean branching to chunk I is permitted, or to start decoding at chunk i. The illustrative configuration is more than sufficient to accomplish the purpose of detecting misalignment since only 7 bits of the 16 available by reserving the entire 0th chunk are used.

Other examples can specify more information in the template. For example, a bit can be used to specify whether "falling through" from a previous instruction block into the current block is permitted. If assumed that such "falling through" is not permitted—if assumed that the first 16-bit chunk in a block is always a new instruction—then only six bits are needed in the mask, rather than seven.

The large number of free bits enables use for other purposes such as code integrity, to indicate legitimate branch targets as well as legitimate instruction boundaries.

For example, a simple encoding can be supported. In chunks 2-6, two bits per chunk can be used for encoding including one bit to indicate a legitimate instruction boundary, and +1 bit to indicate a legitimate branch target. This specification indicates some redundancy since the instruction cannot be a branch target if not an instruction boundary. Another possible tighter encoding example can be: 00 for no instruction boundary, 01 for instruction boundary but not a branch target, 11 for an instruction boundary and branch target, and 10 undefined or reserved for other uses.

In chunk 1, four states can be represented including: 00 for not an instruction boundary which may be part of the instruction in the previous block, 01 for an instruction boundary and not a branch target with fall-through from the previous block allowed, 10 for an instruction boundary and branch target with no fall-through from the previous block allowed, and 11 for an instruction boundary and branch target with fall-through from the previous block allowed.

In chunk 7, the two bits for chunks 2-6 are supplemented by an additional bit to indicate that chunk 7 is the end of an instruction.

In the example, 15 of the 16 available bits are used. Other examples can consolidate the bits more, such as to 13 bits, if found to be useful.

One useful example application that fits in a single block is an i-block (instruction block) legitimate CALL target, with the not unreasonable requirement that functions begin on a i-block boundary. Since CALLs are seldom spoofed, an indirect jump target, with the same alignment requirement, an indirect jump or call, and an indirect call can be implemented using in-line multiple-instruction templates. But a RETurn target, can probably not be implemented since requiring function CALLs have a minimum alignment is likely to onerous, although the CALL might be allowed to be at a non-i-block alignment, but just requiring the RETurn to be aligned to the next i-block boundary.

In the example application, seven 16-bit instruction chunks can be included in a 128-bit instruction block with one chunk per block reserved for a template that describes where instructions begin and end, as well as possible branch targets.

The example application can be generalized, even to non-power-of-two sized instructions. For example, 128-bit instruction blocks can contain either five 24-bit instructions or three 40-bit instructions. One byte per i-block is thus left to use as a template. One-bit or two-bit encodings can be used to distinguish 24-bit from 40-bit instruction sizes. One bit per chunk can be used to indicate a branch target with another bit allocated for fall-through.

A general form can be described as: (a) an instruction stream with instructions that are all a multiple of a given i-chunk size, (b) an i-block with a size equal to several such i-chunks plus extra bits to be used as a template, and (c) the template of the i-chunk describing one, some or all of several characteristics. The template can describe which i-chunks within the i-block are legitimate instruction beginning points, in particular whether the first i-chunk is part of an instruction from the previous i-block in the static code layout, and possibly also whether the last i-chunk terminates or overflows into the next i-chunk. The template can further describe which i-chunks are legitimate instruction branch targets, in particular whether the first chunk can fall through with non-branch execution from the previous i-chunk.

An even more general form can be described as: (a) an instruction stream with instructions of predetermined sizes, but not necessarily multiples of an i-chunk size larger than a single bit, (b) an i-block with a size sufficiently large to contain several such instructions plus extra bits to be used as a template, and (c) the template indicating the sizes and/or boundaries of instructions within the i-block.

The concept of a template reflects some aspects of VLIW instruction sets and is extended for use for sequential, non-VLIW, instruction encoding. In the illustrative example, templates can be used for instruction encoding of sequential instructions without the explicitly parallel bits used to control VLIW.

The template approach adds several aspects to the instruction set including: (a) branching is made to i-block number or the instruction number in the i-block, rather than an address, and (b) for branching to an address, the chunk that holds the template is jumped-over.

One approach allows any multiple of 16-bit instructions to be used, rather than restriction to an i-block of all the same instruction size.

Out-of-Line Metadata

Out-of-line metadata can be used to detect legitimate instruction boundaries and legitimate branch targets. As in the case of code integrity, checking can be performed in-line or out-of-line, orthogonal to the issue of how legitimate instruction boundaries are indicated.

Page code integrity techniques can be used to check only legitimate branch targets rather than all legitimate instruction boundaries.

Usage of out-of-line metadata to detect legitimate instruction boundaries and legitimate branch targets of different types can be done in support of code integrity, and also possibly other applications such as decoded instruction caches and binary translation.

Unmarked Legacy Instructions

Unmarked legacy instructions plus unmarked new instructions can be used to support code integrity.

Hereinbefore are discussed legitimate instruction boundaries and legitimate branch targets of different types in support of code integrity for new instruction sets, designed from the outset to support objectives. However, code integrity is also sought for extending existing instruction sets since long-used, well-developed instruction set architectures are unlikely to be scrapped in deference to new entries.

Considering an example of an existing 32-bit RISC instruction set architecture, the instruction size may be set at 32-bits and strict instruction alignment imposed. An improved instruction set may be sought, for example to introduce support for both smaller (for example, 16-bit) and larger (such as 64-bit or 128-bit) instructions. The improved instruction set can be further extended to include the various types of code integrity techniques disclosed herein.

The improved instruction set may support a variable length instruction mode or may be modeless.

In the case of a new configuration that supports variable length instruction mode and if the existing-set 32-bit instructions cannot be distinguished from the instructions of different length without knowing the mode (decoding requires the mode to be known), out-of-line metadata can be used to indicate the mode to be associated with a group of instructions. Any suitable metadata technique can be used. A particularly useful metadata technique can have the outlying metadata in page tables. For example, a page table encoding can be included indicating that the page contains existing instruction set instructions rather than new instructions.

The new instruction sizes can be indicated in the page table or, since the page table bits are usually scarce, can be enabled using other techniques, as disclosed hereinbefore, possibly in addition to other properties such as legitimate instruction boundaries of the new instructions. Suitable techniques can include non-page table outlying metadata, or any of the instruction encoding techniques described hereinbefore.

In a modeless configuration, instructions of different lengths are to be distinguished simply by accessing common bits. Then, the strict instruction alignment techniques disclosed hereinbefore can be used to check for gradually larger possible overlying instruction boundaries to determine whether a larger overlaying instruction is present. The illustrative procedure has advantages and disadvantages (including possible fragmentation to pad small instructions to a next larger size).

The illustrative example enables a 32-bit RISC instruction set to be extended down to 16-bit instructions and up to 64-bit or 128=bit instructions with full support for preventing instruction misalignment. The technique works best with nesting instructions and strict instruction alignment, such as power of two sizes. Handling of odd-sized instructions, such as 24-bit and 40-bit instructions, is more difficult.

Strawman Control Flow Integrity Instruction Set

Embodiments of systems and methods can use strawman techniques to enable code integrity and control flow integrity, in addition to instruction length and alignment.

Strawman techniques can be used to enforce legitimate instruction boundaries. Definition of a new instruction set can use any of the techniques for preventing instruction misalignment or overlapping instructions described hereinabove. These techniques indicate legitimate instruction boundaries on all or most instructions, and prevent branching into the middle of an instruction. Because the techniques affect so many instructions, overhead can be minimized by having only one or a few bits per instruction.

Examples of suitable techniques can include a bit per 16-bit ifetch chunk indicating location of legitimate instruction boundaries, templates in a larger ifetch chunk indicating legitimate instruction boundary location, strict instruction alignment, and others.

The strict instruction alignment technique is operable, for example, for an instruction set with nestable 16/32/64 bit instructions that can be distinguished by decoding. The strict instruction alignment technique is highly suitable for usage with legacy instruction sets.

A control register can be used to enable checking for legitimate instruction boundaries. Other suitable techniques can be used for enablement.

Strawman techniques can also be used for control flow target checking. Various changes of control flow include direct branches, indirect branches, direct or indirect calls, returns, exceptions, special case control flow changes, and the like. The changes in control flow may be subject to fairly narrow imposed restrictions.

Embodiments of the disclosed systems and methods use a highly suitable technique for control flow target checking, a CONTROL_FLOW_ASSERTION instruction.

The CONTROL_FLOW_ASSERTION instruction may have several versions, mainly to distinguish versions that have operands (such as the address that may have branched to the current instruction, or even an address range) from those that do not have such operands.

One example CONTROL_FLOW_ASSERTION instruction can have the form "CONTROL_FLOW_ASSERT bitmask," including the instruction and a bitmask. The instruction has an Immediate constant bitmask that defines checks to be made. Several checks can be made in one instruction. Bits for the multiple checks are logically-ORed. If none of the conditions match, a trap or exception is thrown.

An example of a strawman set of bitmask bits can include: (a) a bit indicating that the instruction may or may not be reached by "falling through" from sequential execution from the previous instruction.

Some of the bitmask bits can use relative branches as a convenient form for defining "locality" so that: (b) the instruction may be the target of an unconditional direct branch (a relative code transfer), or (c) the instruction may be the target of a conditional direct branch (a relative code transfer).

Some of the bitmask bits can be used to support non-relative branches which tend to be "external" or non-local. Accordingly, a bitmask bit can indicate: (d) the instruction may be the target of a non-relative direct branch.

One or more of the bitmask bits can be used to support indirect branches which tend to be local and can be used in stylized manners. Accordingly, a bitmask bit can indicate: (e) the instruction may be the target of an indirect branch.

Bitmask bits can also be used in the case of function entry points so that: (f) the instruction may be the target of a relative function call, (g) the instruction may be the target of a non-relative or absolute function call, or (h) the instruction may be the target of an indirect function call.

In some embodiments, the bitmask bits can be used to distinguish branches used for tail recursion.

Bitmask bits can further be used in the case of return points so that: (i) the instruction may be the target of a function return instruction.

A CONTROL_FLOW_ASSERT bitmask that includes the functionality of all points (a) to (i) would have nine bits which may be reasonable, although reduction to eight bits may be desirable.

Another example CONTROL_FLOW_ASSERTION instruction can have the form "CONTROL_FLOW_ASSERT bitmask bitmaskNW," including the instruction and two bitmasks. The instruction has a first Immediate constant bitmask that defines checks to be made, for example with the same functionality as disclosed hereinabove for the instruction with a single bitmask. The instruction also can have a second bitmask with almost exactly the same bits describing exactly the same checks, but with an additional test that the instruction branching here must be from a page marked non-writeable (NW).

A further example CONTROL_FLOW_ASSERTION instruction can have the form "CONTROL_FLOW_ASSERT bitmask bitmaskXO," including the instruction and two bitmasks. In addition to the first immediate constant bitmask which defines the checks in the manner of the two instructions discussed hereinbefore, the instruction includes a second bitmask with almost exactly the same bits describing exactly the same checks, but includes an additional test that the instruction branching here must be from a page marked as execute only—not just non-writeable, but also not-readable. In this manner, control flow from pages that an intruder may be able to affect can be restricted.

Still another example CONTROL_FLOW_ASSERTION instruction can have the form "CONTROL_FLOW_ASSERT bitmask bitmaskF fromIP," which includes the instruction and two bitmasks. In addition to the first immediate constant bitmask which defines the checks in the manner of the two instructions discussed hereinbefore, the instruction includes a second bitmask with almost exactly the same bits describing exactly the same checks, but includes an additional test that the "From Instruction Pointer" (fromIP) of the instruction branching to the CONTROL_FLOW_ASSERTION instruction location matches. The instruction enables restriction of certain types of control flow to only a single fromIP, but generically allows other fromIPs. The CONTROL_FLOW_ASSERTION instruction may be the target of the indirect branch at fromIP.

The usefulness of restricting CALL targets to only a single fromIP (or return) appears to be limited. In fact, indirect branch is the only instruction likely to admit such a single fromIP restriction. Therefore, the bitmaskF may not be necessary, but instead simply encoding may be suitable. Accordingly, a CONTROL_FLOW_ASSERTION instruction can have the form "CONTROL_FLOW_ASSERT_INDIRECT_TARGET fromIP," in which the instruction may be the target of the indirect branch at fromIP. If the instruction is not the target, a trap can be generated.

Another example CONTROL_FLOW_ASSERTION instruction can have the form "CONTROL_FLOW_ASSERT bitmask bitmaskL," which includes the instruction and two bitmasks. In addition to the first immediate constant bitmask which defines the checks in the manner of the two instructions discussed hereinbefore, the instruction includes a second bitmask with almost exactly the same bits describing exactly the same checks, but includes an additional test that the instruction branching to the target CONTROL_FLOW_ASSERTION instruction must be "local".

The definition of local is problematic. Some example instructions are proposed that address possibly useful definitions of "locality". For example, a CONTROL_FLOW_ASSERTION instruction of the form "CONTROL_FLOW_ASSERT bitmask bitmaskL Zbit," in addition to the disclosed bitmask defining checks, the instruction has a second bitmask with almost exactly the same bits describing exactly the same checks, but includes an additional test that the instruction branching be "local" with locality defined to be that only the least significant bits of the from and to (current) address may differ. Zbit is the number of the most significant bit that may differ, and can be, for example, a 6-bit constant in the instruction for a 64-bit machine. Thus, for example, locality can be defined in the manner of "only allow jumps from within the same 16K region."

Another example of a CONTROL_FLOW_ASSERTION instruction which allows only local branching can have the form "CONTROL_FLOW_ASSERT bitmask bitmaskL lo, hi." In addition to the disclosed bitmask defining checks, the instruction has a second bitmask with almost exactly the same bits describing exactly the same checks, but includes an additional test that the instruction branching be "local" with locality defined to be in the interval (lo, hi). Accordingly, the fromIP must be within the specified range. The "lo, hi" designation may be absolute, or may be relative addresses. The interval may be relatively difficult to encode as compared to other techniques for defining locality.

A further example of a CONTROL_FLOW_ASSERTION instruction which allows only local branching can have the form "CONTROL_FLOW_ASSERT bitmask bitmaskL rel." In addition to the disclosed bitmask defining checks, the instruction has a second bitmask with almost exactly the same bits describing exactly the same checks, but includes an additional test that the instruction branching be "local" with locality defined to be in the interval (ip−rel, ip+rel). Accordingly, the fromIP must be within the specified range. The "rel" designation is similar to the "lo, hi" designation, except the encoding is simplified to only one limit. The encoding may be a value or may be the log 2 of the limit.

An additional example of a CONTROL_FLOW_ASSERTION instruction which allows only local branching can have the form "CONTROL_FLOW_ASSERT bitmask bitmaskL lo0, hi0, lo1, hi1." In addition to the disclosed bitmask defining checks, the instruction has a second bitmask with almost exactly the same bits describing exactly the same checks, but includes an additional test that the instruction branching be "local" with locality defined to be the union of the possible disjoint intervals [lo0, hi0] and [lo1,hi1]. Accordingly, the fromIP must be within the specified range. This form allows functions to be optimized into cold and hot regions, at the cost of encoding challenges.

The instruction definitions disclosed hereinabove have several varieties, typically described as instructions with a base bitmask, an additional bitmask, and tests. Any combination can be supported, generally subject to encoding limitations. For example, if deemed to be sufficiently important, all varieties could be supported on a variable length instruction set, or an instruction set with very long fixed length instructions. On a small instruction set, the varieties may be abbreviated, as found appropriate.

A combination instruction can have the form:
CONTROL_FLOW_ASSERT [bitmask] [bitmaskNW] [bitmaskXO] [bitmaskF fromiP] [bitmaskL . . . ].

A control register can be used for holding enable bits for each of the checks.

A generic CONTROL_FLOW_ASSERT instruction can be defined.

The control flow integrity checks are operations that look at the instruction that branched to the current instruction. The information is of the type that is contained, for example, in the Intel x86 processor's Last Branch Records, which were added to the Intel P6 (sixth generation x86 microprocessor microarchitecture) RTL.

The CONTROL_FLOW_ASSERT instructions are shorthand for operations involving the "last Branch Information".

More general operations, such as "Instruction A can be reached from B and C but not D' are too idiosyncratic to put in hardware, but can be expressed by general purpose code, if the last branch records are easily accessible.

Unfortunately, the last branch records are not easily accessible in current machines, but rather require a system call to access, since the records are located in privileged machine state registers (MSRs). Therefore, an additional enhancement is proposed, to make the last branch records more easily accessible to ordinary user code intended to perform control flow integrity checks beyond those directly supported.

One example enhancement is to place the LBRs (library file formats) in registers that can be read by user instructions, such as UNPRIVILEGED_READF_STATUS_REGISTER.

Another example enhancement is to create an instruction MOVE_LBR_TO_GPR, an approach similar to the instructions RDTSC (return time stamp counter) and RDPMC (read performance-monitoring counter) which also create special purpose instructions to read otherwise privileged registers from use code.

Referring to FIGS. 1A, 1B, 1C, and 1D, three schematic block diagrams and a data structure diagram respectively depict embodiments of a data processing system 100 configured to support fine-grained security including resource allocation and resource scheduling. Fine-grained security facilitates, for example, for running applications on a computer controlled and owned by another entity. In an illustrative embodiment, the data processing system 100 can comprise a federated server 102 operable to access data distributed among a plurality of remote data sources 104 upon request from a plurality of client users and applications 106; and logic 108 executable on the federated server 102. The logic 108 can be operable to enforce fine-grained security operations 110 on a plurality of federated shared data sets 112 distributed among the plurality of remote data sources 104.

Fine-grained security is directed toward protecting memory in fine-grained pieces. The fine-grained security operations 110 can be defined as operations on data elements more fine than a memory page or virtual page size, typically 4 kilobyte data blocks.

In some embodiments of the data processing system 100, the logic 108 operable to enforce fine-grained security operations 110 can include logic operable to perform hardware scheduling and enforce fine-grained security operations 110 on selected hardware devices and components 116.

Embodiments of the data processing system 100 can be constituted to enable fine-grained security for support of resource allocation and resource scheduling, specifically for handling virtual memory, thereby enhancing fine-grained security for running applications on a computer controlled and owned by another entity. Accordingly, the logic 108 can be operable to enforce fine-grained security operations 110 can also includes logic operable to manage access of virtual memory 119 and enforce fine-grained security operations 110 on selected memory regions in the virtual memory 119.

Fine-grained security can be implemented in the data processing system 100 which includes both servers and clients. For example, gaming code servers and gaming console clients can interact by running program code that executes in part on machines controlled by the server and in part on machines controlled by the client. Fine-grained security enables the interaction to be mutually trusted by both sides. Accordingly, the logic 108 operable to enforce fine-grained security operations 110 can include logic operable to manage running of applications on a computer selected from among a plurality of computers 118 networked to the federated server 102 and enforce fine-grained security operations 110 on the selected computer.

Embodiments of systems and methods can enforce fine-grained security operations 110 using instructions to ensure code integrity and control flow integrity. In some embodiments, the data processing system 100 can be configured wherein the logic 108 operable to enforce fine-grained security operations 110 includes logic operable to execute a control flow integrity instruction 120, for example as depicted in FIG. 1D, specified to verify changes in control flow and respond to verification failure by trap or exception.

In a similar manner, the logic 108 operable to enforce fine-grained security operations 110 can include logic operable to execute a control flow integrity instruction 120 specified to verify changes in control flow comprising conditions of instruction length or instruction alignment.

Another instruction can be supported wherein the logic 108 operable to enforce fine-grained security operations 110 can include logic operable to execute a control flow integrity instruction 120 specified to verify changes in control flow comprising changes resulting from direct branches, indirect branches, direct calls, indirect calls, returns, and exceptions.

A control flow integrity instruction 120 with an immediate constant bitmask enables a technique for supporting fine-grained security operations 110. Accordingly, the data processing system 100 can be constituted wherein the logic 108 operable to enforce fine-grained security operations 110 can include logic operable to execute a control flow integrity instruction 120 comprising an immediate constant bitmask that defines at least one check to be made of at least one condition. The one or more checks can be logically-ORed and a trap or exception is generated if none of the at least one condition matches. The immediate constant bitmask can comprise bitmask bits operable to identify one or more selected conditions of conditions such as whether the control flow integrity instruction 120 is reachable through sequential execution from a previous instruction. Other conditions can be related to branches including, for example, whether the control flow integrity instruction 120 is target of an unconditional direct branch, whether the control flow integrity instruction 120 is target of a conditional direct branch, whether the control flow integrity instruction 120 is target of a non-relative direct branch, whether the control flow integrity instruction whether the control flow integrity instruction 120 is reachable through sequential execution from a previous instruction is target of an indirect branch, and the like. Some conditions can relate to function calls such as, for example, whether the control flow integrity instruction 120 is target of a relative function call, whether the control flow integrity instruction 120 is target of a non-relative or absolute function call, whether the control flow integrity instruction 120 is target of an indirect function call, whether the control flow integrity instruction 120 is target of a function return instruction, or similar conditions.

An example fine-grained security paradigm can use an instruction associated with a pointer that identifies a lower bound, and upper bound, and permissions. The pointer can be enabled to point to particular objects or even to any position within an object. The instruction can specify permissions including memory locations to which data can be written, when program code is allowed to execute, how long writing is allowed, and the like. Permissions can be associated with data objects, for example assigning a pointer to an object and, using permissions, allowing only methods belonging to that object to access the object. Another example of permissions can enable access to data, but only for specified purposes, for instance to enable a first running of an object and access allowed to only part of a routine, while preventing access by others. In another example, a particular method can be permitted to run a limited number of times or just one time, and can prevent subsequent access to data when the data has been previously exposed to an authorized reader. Thus, the data processing system 100 can be constituted wherein the logic 108 operable to enforce fine-grained security operations 110 can include logic operable to manage access to memory 122 and enforce fine-grained security operations 110 on selected start and end boundaries and selected granularity in the memory 122 with selected permissions.

Similarly, the data processing system 100 can be constituted wherein the logic 108 operable to enforce fine-grained security operations 110 can include logic operable to manage access to memory 122 and enforce fine-grained security operations 110 in the memory 122 with permissions selected from a group consisting of write enablement, read enablement, execution enablement, and duration of enablement.

Fine-grained security is highly useful for protecting memory in fine-grained pieces, for example in support of resource allocation, resource scheduling, hardware scheduling, virtual memory, and other functionality. A drawback of fine-grained security in some applications is a cost in performance. The drawback can be balanced and overcome in some applications and conditions by supporting more coarse-grained checking while retaining fine-grained checking capabilities. Accordingly, the data processing system 100 can be constituted wherein the logic 108 operable to enforce fine-grained security operations 110 can include logic operable to manage access to memory 122 in memory blocks 124 and enforce fine-grained security operations 110 by individually protecting selected memory blocks 124.

The data processing system 100 can support a combination of fine-grained and coarse-grained security in a security technique that assigns data to a particular virtual machine, which is even more coarse-grained than memory page granularity. For example, if security is sought in the context of a browser not known to be secure, the browser can be assigned a virtual machine that runs only the browser. Thus, the data processing system 100 can be arranged wherein the logic 108 operable to enforce fine-grained security operations 110 can include logic operable to manage running of applications in a plurality of virtual machines 126 and enforce fine-grained security operations 110 including assigning data to a selected virtual machine.

Referring to FIG. 1B, the data processing system 100 can be constituted to perform fine-grained security operations 110 including a channel encryption functionality wherein channel encryption between the processor and a smart memory can enable numerous aspects of security. The smart memory can be configured in combination with the processor to perform channel encryption. Consequently, the data processing system 100 can be arranged wherein the logic 108 operable to enforce fine-grained security operations 110 can include logic 128 operable to perform channel encryption operations 130 on a communication channel 132 that communicates information between a selected processor 134 and a selected memory 136. The logic 128 operable to perform channel encryption operations 130 is further operable to perform one or more of several operations including, for example, decrypting information encrypted by the selected processor 134, decrypting address and data information encrypted by the selected processor 134 and store data at the address, partially decrypting information encrypted by the selected processor 134, performing time-varying encryption, and the like. Other operations can include performing stream encryption of information communicated on the communication channel 132 wherein processor and memory sides of the communication channel 132 are assigned a key, and performing channel encryption operations 130 on the communication channel 132 for information that is storage encrypted wherein the storage-encrypted information is encrypted by the selected processor 134, stored in the selected memory 136, accessed from the selected memory 136, and decrypted by the selected processor 134.

Figure 1C:
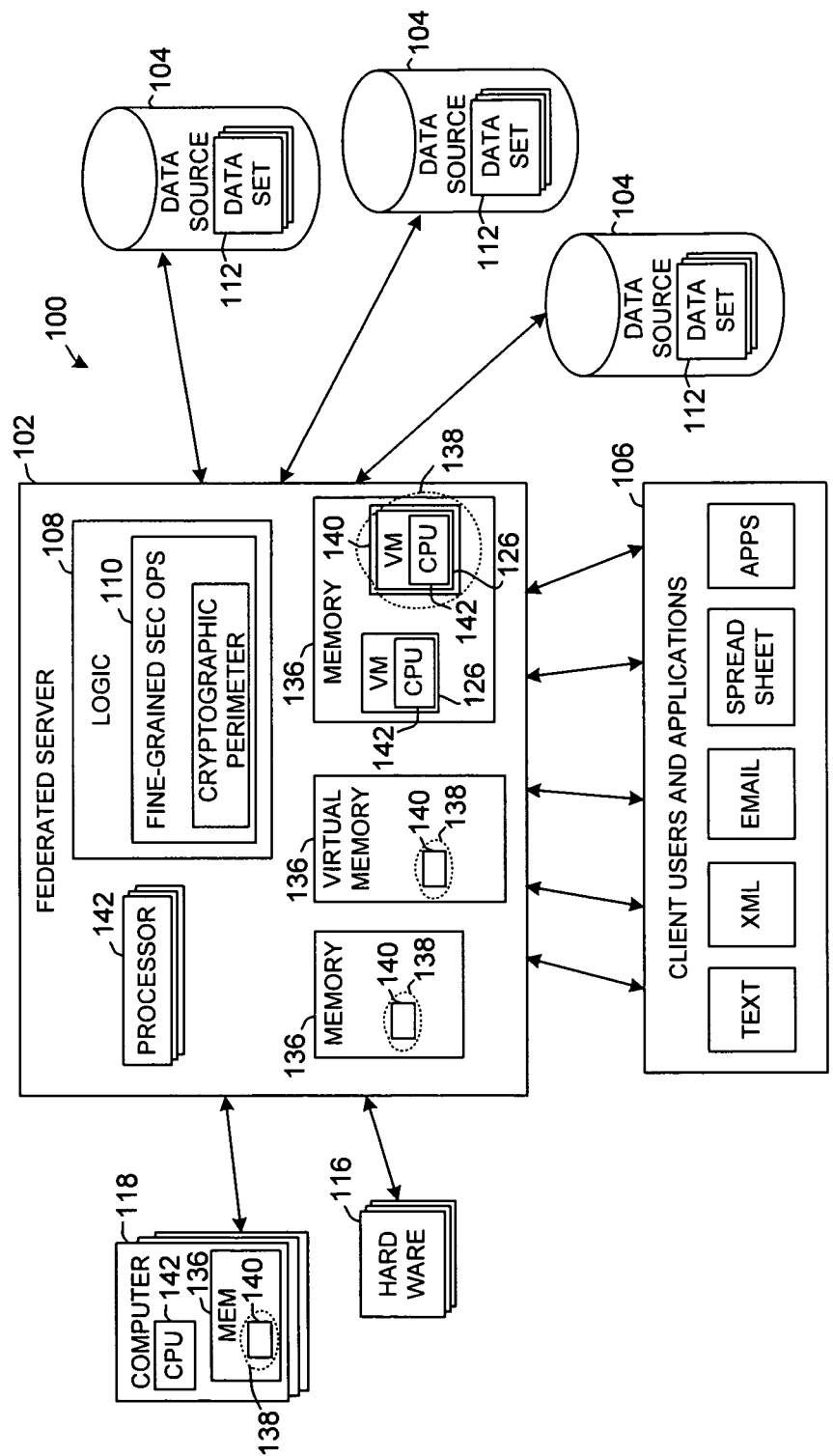
Figure 1D:
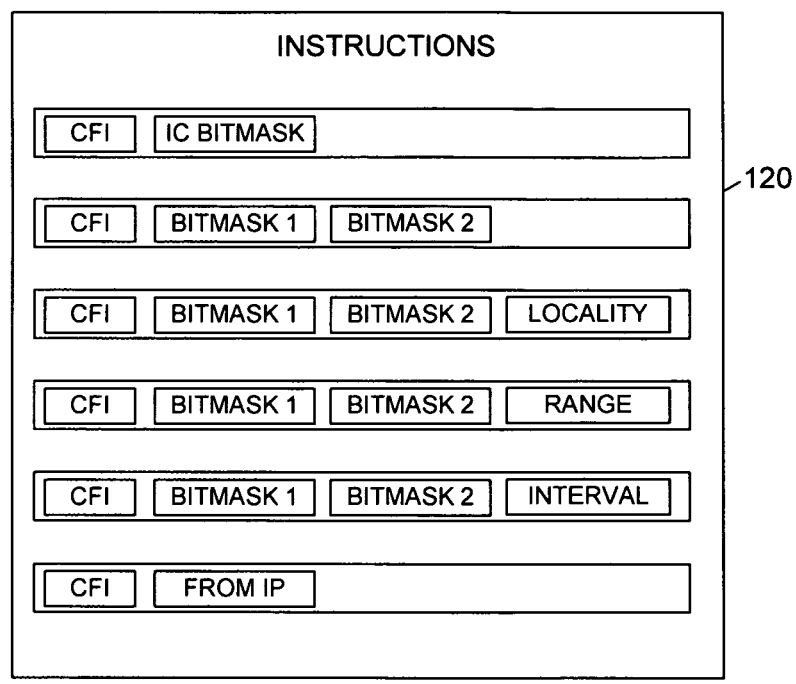

In various embodiments, for example as shown in FIG. 1C, the data processing system 100 can be formed to perform fine-grained security operations 110 as part of a security perimeter 138 which combines cryptographic and physical security. A basic aspect of the security perimeter can be a perimeter beyond which all information is encrypted. For example, hardware security can be formed by a hardware perimeter. One or more security perimeters can be positioned in a predetermined manner, for example enclosing selected computers (even an entire personal computer), devices or systems, and can be nested. Accordingly, the data processing system 100 can be constituted wherein the logic 108 operable to enforce fine-grained security operations 110 can include logic operable to create at least one cryptographic security perimeter 138 enclosing at least one selected region of memory 140 and manage information communication between a processor 142 and the at least one selected region of memory 140.

Figure 2A:
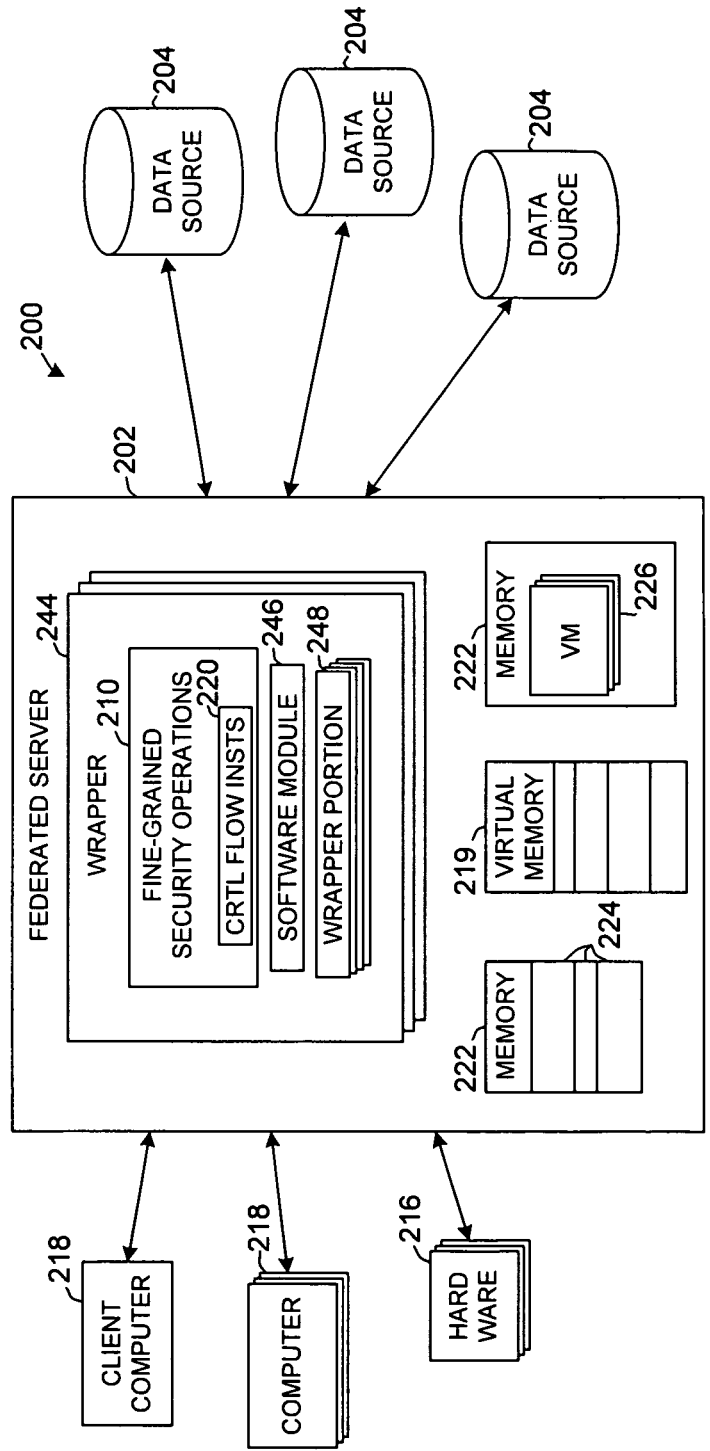
FIGS. 2A, 2B, and 2C are schematic block diagrams showing embodiments of a federated system with security features enabled by fine-grained security operations.

Fine-grained security can be configured to support federated sharing, federated data sets, and sensor fusion which fuses data and data sets in numerical aspects and permissions aspects. Data and data sets can be fused in conditions of a first entity owning or controlling a first sensor and a second entity a second sensor. A federated database system is a type of database management system which transparently integrates multiple autonomous databases, interconnected by a network, into a single federated database. Accordingly, referring to FIGS. 2A, 2B, and 2C, schematic block diagrams show embodiments of a federated system 200 with security features enabled by fine-grained security operations 210. An illustrative federated system 200 can comprise a federated server 202 operable to access data via distributed queries over data stored in a plurality of remote data sources 204 and at least one wrapper 244 operable for communicating among the plurality of remote data sources 204. The wrapper or wrappers 244 can contain characteristics and determine fine-grained security operations 210 for selected ones of the remote data sources 204.

The federated system 200 can communicate with the various remote data sources 204 via software modules called wrappers 244. A wrapper 244 contains characteristics about a specific data source. The wrappers 244 are useful for dealing with the possible different query languages of various database management systems. The federated system 200 can apply the wrappers 244 to subqueries for translation into appropriate query languages. Thus, the federated system 200 can be configured wherein the wrapper 244 includes a software module 246 containing characteristics about the plurality of remote data sources 204.

In various embodiments, the federated system 200 can be constituted with a wrapper or wrappers 244 including a wrapper portion 248 operable to determine applications running on a computer selected from among a plurality of computers 218 networked to the federated server 202 and fine-grained security operations 210 on the selected computer.

The fine-grained security operations 210 can be defined as operations on data elements more fine-grained than a memory page or virtual page size.

In various embodiments, the federated system 200 can be constituted with a wrapper or wrappers 244 including wrapper portions 248 with various selected functionality. For example, a wrapper 244 can include a wrapper portion 248 operable to set permissions defining fine-grained security operations 210 for selectively accessing data on the plurality of remote data sources 204. In another example, a wrapper 244 can include a wrapper portion 248 operable to set hardware scheduling and fine-grained security operations 210 on selected hardware devices and components 216.

Embodiments of the federated system 200 can support fine-grained security for handling virtual memory 219. The federated system 200 can be constituted with a wrapper or wrappers 244 including a wrapper portion 248 operable to set access to virtual memory 219 and fine-grained security operations 210 on selected memory regions in the virtual memory 219.

Embodiments of systems and methods of the federated system 200 can execute fine-grained security operations 210 using instructions to ensure code integrity and control flow integrity. In some embodiments, the federated system 200 can be configured wherein the wrapper 244 includes a wrapper portion 248 operable to specify a control flow integrity instruction 220 to verify changes in control flow and respond to verification failure by trap or exception. The wrapper 244 can include a wrapper portion 248 operable to specify a control flow integrity instruction 220 to verify changes in control flow comprising conditions of instruction length or instruction alignment. Similarly, in some embodiments the federated system 200 can include a wrapper portion 248 operable to perform a control flow integrity instruction 220 to verify changes in control flow comprising changes resulting from direct branches, indirect branches, direct calls, indirect calls, returns, and exceptions.

In some embodiments and applications, the federated system 200 can be configured to execute a control flow integrity instruction 220 with an immediate constant bitmask which enables a technique for supporting fine-grained security operations 210. Accordingly, the federated system 200 can be formed wherein the wrapper 244 includes a wrapper portion 248 operable to specify a control flow integrity instruction 220 comprising an immediate constant bitmask that defines at least one check to be made of at least one condition. The defined check(s) can be logically-ORed and a trap or exception generated if none of the condition(s) matches. The immediate constant bitmask can comprise bitmask bits operable to identify one or more conditions selected from conditions including whether the control flow integrity instruction 220 is reachable through sequential execution from a previous instruction, and conditions relating to branching including whether the control flow integrity instruction 220 is target of an unconditional direct branch, whether the control flow integrity instruction 220 is target of a conditional direct branch, whether the control flow integrity instruction 220 is target of a non-relative direct branch, and whether the control flow integrity instruction 220 is target of an indirect branch. The immediate constant bitmask can comprise bitmask bits operable to identify one or more conditions relating to calls and returns including whether the control flow integrity instruction 220 is target of a relative function call, whether the control flow integrity instruction 220 is target of a non-relative or absolute function call, whether the control flow integrity instruction 220 is target of an indirect function call, and whether the control flow integrity instruction 220 is target of a function return instruction.

In some embodiments, the federated system 200 can support methods of administering permissions or access rights to predetermined users and groups of users. Permissions control the ability of the users to view or modify contents of the federated system 200. Consequently, the federated system 200 can be formed wherein the wrapper 244 includes a wrapper portion 248 operable to specify access to memory 222 and fine-grained security operations 210 on selected start and end boundaries and selected granularity in the memory 222 with selected permissions. In a similar manner, the federated system 200 can be configured wherein the wrapper 244 includes a wrapper portion 248 operable to specify access to memory 222 and fine-grained security operations 210 in the memory 222 with permissions selected from a group consisting of write enablement, read enablement, execution enablement, and duration of enablement.

In some embodiments, the federated system 200 can be constructed to support coarse-grained security in addition to fine-grained security to offer a balance of control and performance, enabling relatively coarse-grained checking while retaining fine-grained checking capabilities. Accordingly, the federated system 200 can be configured wherein the wrapper 244 includes a wrapper portion 248 operable to specify access to memory 222 in memory blocks 224 and fine-grained security operations 210 by individually protecting selected memory blocks 224.

The federated system 200 can also be configured to support security in virtual machines, also enabling a combination of fine-grained and coarse-grained security for a virtual machine which is generally more coarse-grained than memory page granularity. Accordingly, the federated system 200 can be constituted wherein the wrapper 244 includes a wrapper portion 248 operable to specify applications to run in a plurality of virtual machines 226 and fine-grained security operations 210 including assigning data to a selected virtual machine.

Figure 2B:
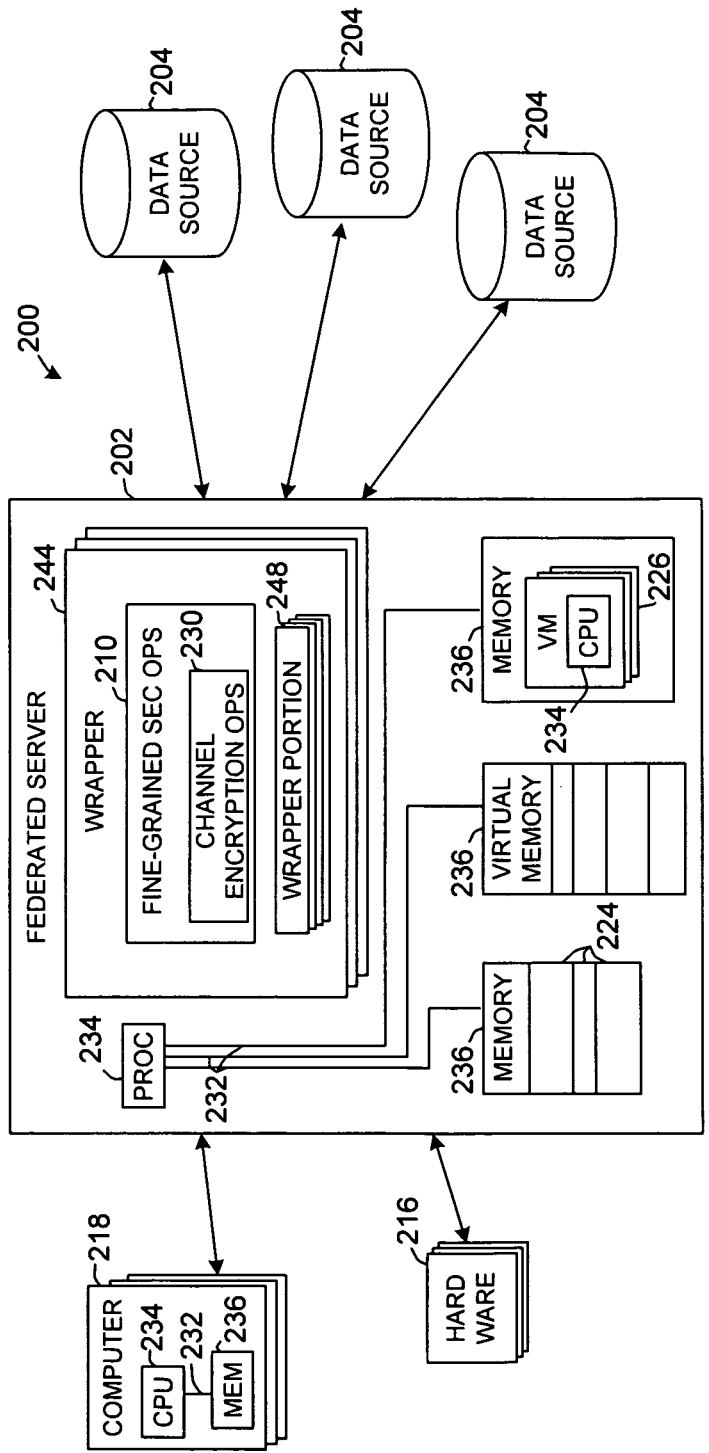

In some embodiments, as shown in FIG. 2B, the federated system 200 can include a channel encryption functionality wherein channel encryption between the processor and a smart memory can enable several security aspects. Thus, the federated system 200 can be formed wherein the wrapper 244 includes a wrapper portion 248 operable to execute channel encryption operations 230 on a communication channel 232 that communicates information between a selected processor 234 and a selected memory 236. The wrapper portion 248 operable to perform channel encryption operations 230 is further operable to perform one or more of several operations including, for example, decrypting information encrypted by the selected processor 234, decrypting address and data information encrypted by the selected processor 234 and store data at the address, partially decrypting information encrypted by the selected processor 234, performing time-varying encryption, and the like. Other operations can include performing stream encryption of information communicated on the communication channel 232 wherein processor and memory sides of the communication channel 232 are assigned a key, and performing channel encryption operations on the communication channel 232 for information that is storage encrypted wherein the storage-encrypted information is encrypted by the selected processor 234, stored in the selected memory 236, accessed from the selected memory 236, and decrypted by the selected processor 234.

Figure 2C:
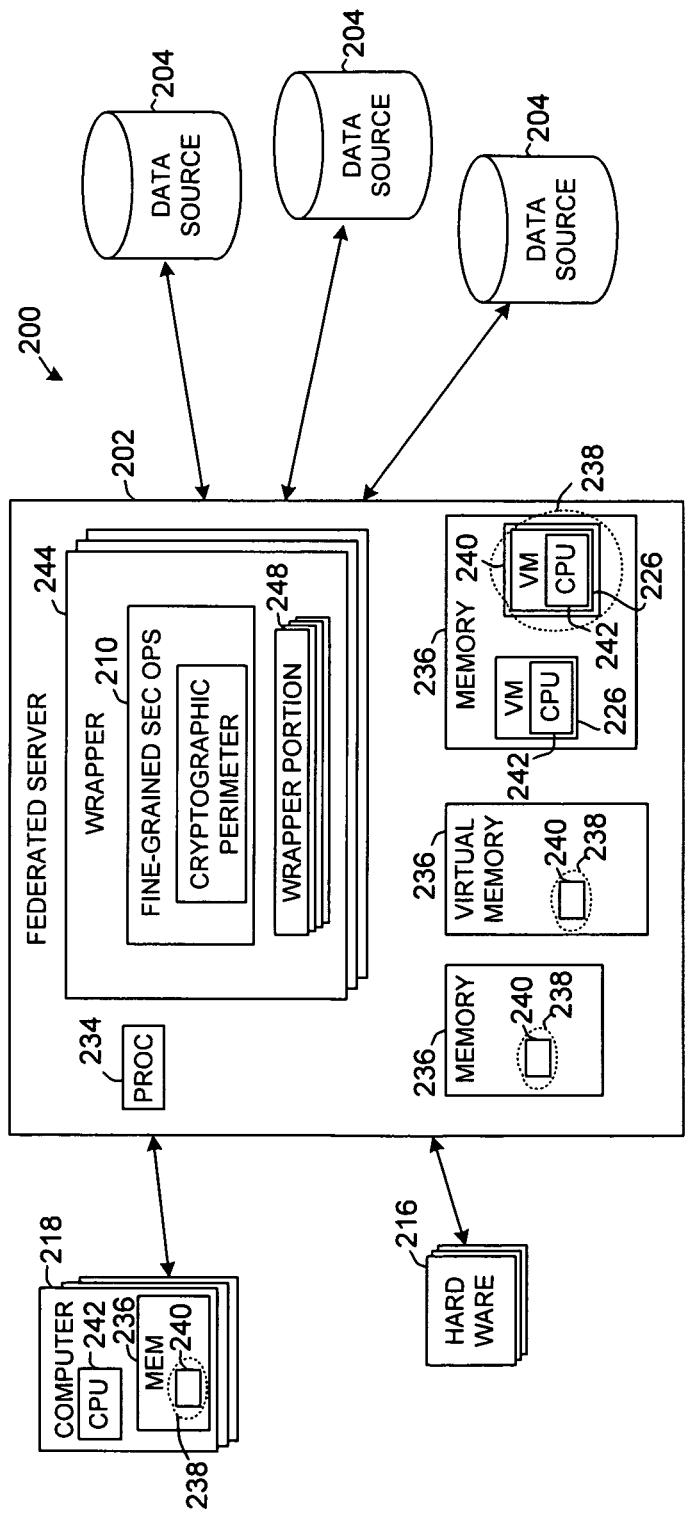

In some embodiments and applications, for example as depicted in FIG. 2C, the federated system 200 can support formation of a security perimeter 238 which combines cryptographic and physical security capabilities. One or more security perimeters can be positioned in a predetermined manner around selected resources, such as enclosing selected computers, memory, storage devices, devices or systems. Security perimeters can be nested. Accordingly, the federated system 200 can be formed wherein the wrapper 244 includes a wrapper portion 248 operable to specify at least one cryptographic security perimeter 238 enclosing at least one selected region of memory 240 and information communication between a processor 242 and the at least one selected region of memory 240.

Figure 3A:
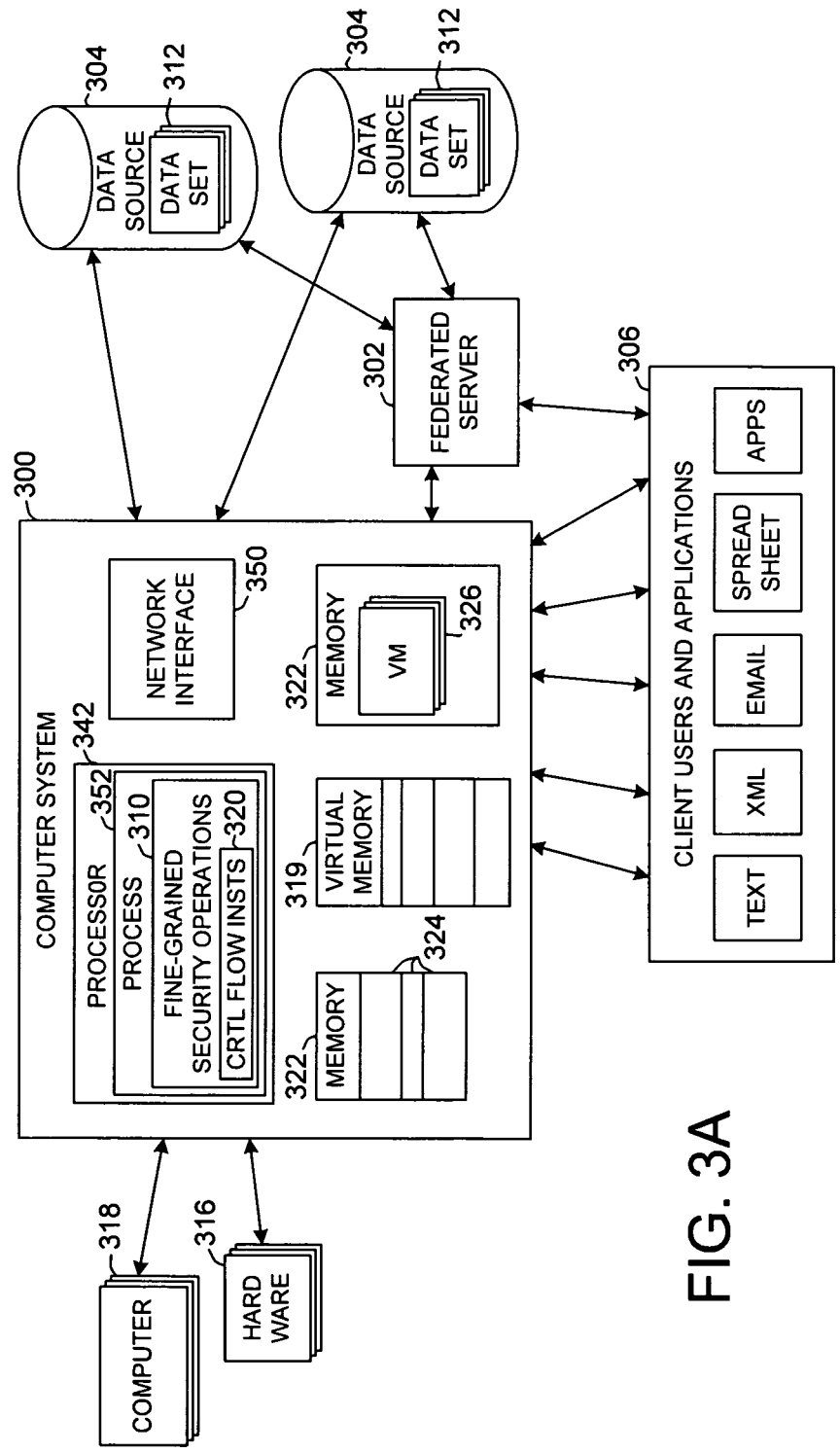
FIGS. 3A, 3B, and 3C are schematic block diagrams illustrating embodiments of a computer system adapted for usage in a servers and clients architecture that supports fine-grained security.
Figure 3B:
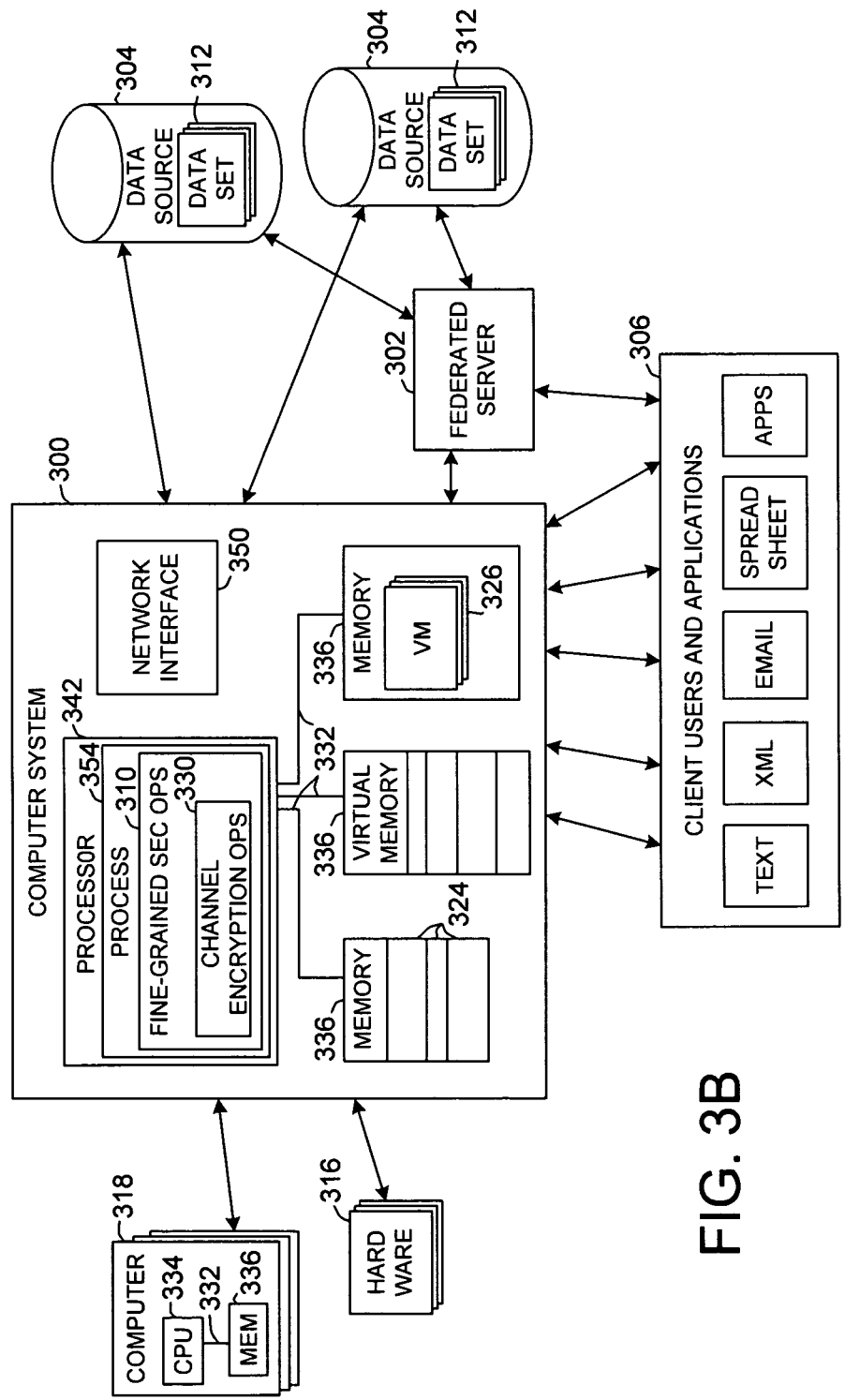
Figure 3C:
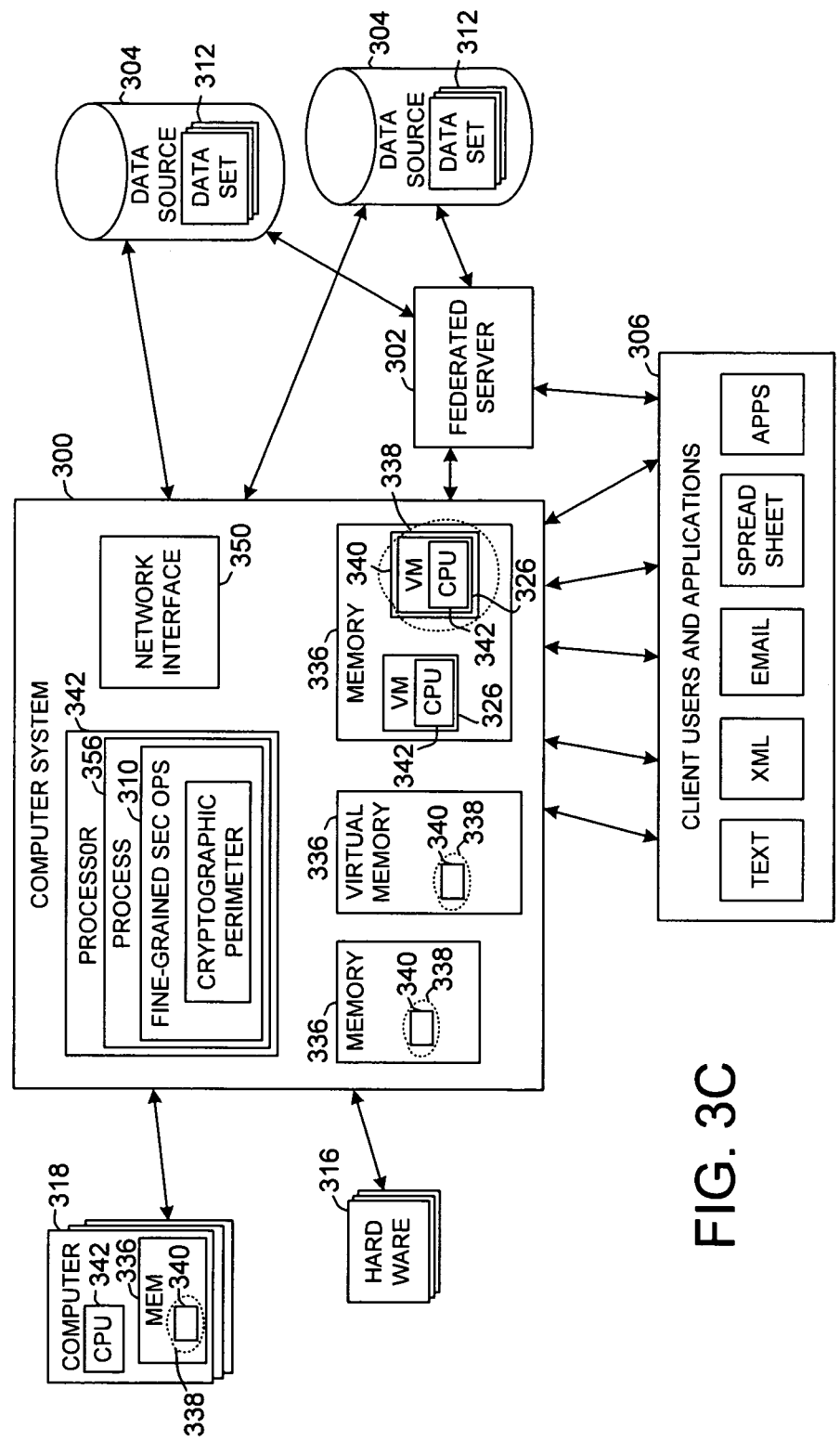

Fine-grained security can be implemented in an infrastructure such as an architecture including servers and clients. For example, gaming code servers and gaming console clients can interact by running program code that executes in part on machines controlled by the server and in part on machines controlled by the client. Fine-grained security enables the interaction to be mutually trusted by both sides. Referring to FIGS. 3A, 3B, and 3C, schematic block diagrams illustrate embodiments of a computer system 300 adapted for usage in a servers and clients architecture that supports fine-grained security. In an illustrative embodiment, a computer system 300 can comprise a network interface 350 operable to communicate data among a plurality of remote data sources 304 and a plurality of client users and applications 306. The computer system 300 can further comprise a processor 342 operatively coupled to the network interface 350 and operable to control fine-grained security operations on a plurality of federated shared data sets 312 distributed among the plurality of remote data sources 304.

The computer system 300 can comprise a processor 342 including a process 352 operable to manage running of applications on a computer selected from among a plurality of computers 318 networked to the federated server 302 and enforce fine-grained security operations 310 on the selected computer.

In various embodiments, the processor 342 can include a process 352 operable to perform fine-grained security operations 310 on data elements more fine than a memory page or virtual page size.

In some embodiments and applications, the computer system 300 can further comprise a processor 342 including a process 352 operable to access data distributed among the plurality of remote data sources 304 upon request from the plurality of client users and applications 306.

The computer system 300 can further comprise a processor 342 operable to set permissions defining fine-grained security operations 310 for selectively accessing data on the plurality of remote data sources 304. Accordingly, in some embodiments the computer system 300 can comprise a processor 342 including a process 352 operable to manage access to memory 322 and enforce fine-grained security operations 310 on selected start and end boundaries and selected granularity in the memory 322 with selected permissions. Similarly, the computer system 300 can comprise a processor 342 including a process 352 operable to manage access to memory 322 and enforce fine-grained security operations 310 in the memory 322 with permissions selected from a group consisting of write enablement, read enablement, execution enablement, and duration of enablement.

In various embodiments, the computer system 300 can be configured for one or more of numerous applications in the servers and clients architecture. For example, the computer system 300 can comprise a processor 342 including a process 352 operable to control fine-grained security operations in a video gaming server application. The computer system 300 can comprise a processor 342 including a process 352 operable to control fine-grained security operations in a video gaming client application. The computer system 300 can comprise a processor 342 including a process 352 operable to control fine-grained security operations in a copyrighted content anti-piracy application. Furthermore, the computer system 300 can comprise a processor 342 including a process 352 operable to control fine-grained security operations in an information technology server application. The computer system 300 can comprise a processor 342 including a process 352 operable to control fine-grained security operations in an information technology client application. The computer system 300 can comprise a processor 342 including a process 352 operable to control fine-grained security operations in any suitable application or field of endeavor.

In some embodiments of the computer system 300, the processor 342 can include a process 352 operable a process operable to perform hardware scheduling and enforce fine-grained security operations 310 on selected hardware devices and components 316.

Embodiments of the computer system 300 can be formed to support of resource allocation and resource scheduling, particularly for handling virtual memory. Thus, the computer system 300 can comprise a processor 342 including a process 352 operable to manage access of virtual memory 319 and enforce fine-grained security operations 310 on selected memory regions in the virtual memory 319.

Embodiments of systems and methods of the computer system 300 can execute fine-grained security operations 310 using instructions to ensure code integrity and control flow integrity. In various embodiments, the computer system 300 can comprise a processor 342 including a process 352 operable to execute a control flow integrity instruction 320 specified to verify changes in control flow and respond to verification failure by trap or exception. The computer system 300 can comprise a processor 342 including a process 352 operable to execute a control flow integrity instruction 320 specified to verify changes in control flow comprising conditions of instruction length or instruction alignment. The computer system 300 can further comprise a processor 342 including a process 352 operable to execute a control flow integrity instruction 320 specified to verify changes in control flow comprising changes resulting from direct branches, indirect branches, direct calls, indirect calls, returns, and exceptions.

In some embodiments, the computer system 300 can execute a control flow integrity instruction 320 with an immediate constant bitmask enables techniques for supporting fine-grained security operations 310. Accordingly, the computer system 300 can comprise a processor 342 including a process 352 operable to execute a control flow integrity instruction 320 comprising an immediate constant bitmask that defines one or more checks to be made of one or more conditions. The one or more checks can be logically-ORed and a trap or exception is generated if none of the one or more conditions matches. The immediate constant bitmask can comprise bitmask bits operable to identify one or more conditions selected several conditions such as whether the control flow integrity instruction 320 is reachable through sequential execution from a previous instruction, and whether the control flow integrity instruction 320 is a branch-related instruction such as whether the control flow integrity instruction 320 is target of an unconditional direct branch, whether the control flow integrity instruction 320 is target of a conditional direct branch, whether the control flow integrity instruction 320 is target of a non-relative direct branch, whether the control flow integrity instruction 320 is target of an indirect branch, or the like. Similarly, conditions can relate to calls and returns including, for example, whether the control flow integrity instruction 320 is target of a relative function call, whether the control flow integrity instruction 320 is target of a non-relative or absolute function call, whether the control flow integrity instruction 320 is target of an indirect function call, whether the control flow integrity instruction 320 is target of a function return instruction, or similar conditions.

In some embodiments, the computer system 300 can be constructed to support coarse-grained security in addition to fine-grained security to offer a balance of control and performance, enabling relatively coarse-grained checking while retaining fine-grained checking capabilities. For example, the computer system 300 can also be formed to support security in virtual machines 326 by combining fine-grained and coarse-grained security for a virtual machine which is generally more coarse-grained than memory page granularity. Accordingly, the computer system 300 can comprise a processor 342 including a process 352 operable to manage access to memory 322 in memory blocks 324 and enforce fine-grained security operations 310 by individually protecting selected memory blocks 324. Similarly, the computer system 300 can comprise a processor 342 including a process 352 operable to manage running of applications in a plurality of virtual machines 326 and perform fine-grained security operations 310 including assigning data to a selected virtual machine.

In some embodiments and/or applications, for example as shown in FIG. 3B, the computer system 300 can make use of channel encryption, which entails communication between devices, each of which includes cryptographic logic and performs cryptographic operations, to perform fine-grained security operations 310. The computer system 300 can comprise a processor 342 including a process 354 operable to perform channel encryption operations 330 on a communication channel 332 that communicates information between a selected processor 334 and a selected memory 336. The process 342 operable to perform channel encryption operations 330 can further be operable to perform one or more operation selected from operations such as, for example, decrypting information encrypted by the selected processor 334, decrypting address and data information encrypted by the selected processor 334 and store data at the address, partially decrypting information encrypted by the selected processor 334, performing time-varying encryption, and the like. Other operations can include performing stream encryption of information communicated on the communication channel 332 wherein processor and memory sides of the communication channel 332 are assigned a key, and performing channel encryption operations on the communication channel 332 for information that is storage encrypted wherein the storage-encrypted information is encrypted by the selected processor 334, stored in the selected memory 336, accessed from the selected memory 336, and decrypted by the selected processor 334.

In some embodiments and applications, as illustrated in FIG. 3C, the computer system 300 can support formation of a security perimeter 338 which combines cryptographic and physical security. Security perimeters can be selectively positioned around resources, such as enclosing selected computers, memory, storage devices, devices or systems. Security perimeters can be nested. Accordingly, the computer system 300 can comprise a processor 342 including a process 356 operable to operable to specify at least one cryptographic security perimeter 338 enclosing at least one selected region of memory 340 and information communication between a processor 342 and the at least one selected region of memory 340.

Referring to FIGS. 4A through 4N, schematic flow charts illustrate an embodiment or embodiments of methods for performing fine-grained security including resource allocation and resource scheduling, for example, for running applications on a computer controlled and owned by another entity.

As shown in FIG. 4A, an embodiment of a method 400 for processing data can comprise receiving 401 a request from a plurality of client users and applications and accessing 402 data distributed among a plurality of remote data sources upon the request from the plurality of client users and applications. The method 400 can further comprise enforcing 403 fine-grained security operations on a plurality of federated shared data sets distributed among the plurality of remote data sources.

The fine-grained security operations can be specified to be operations on data elements more fine-grained than a memory page or virtual page size.

Referring to FIG. 4B, embodiments of a method 405 for processing data can further comprise enforcing 403 fine-grained security operations including performing 406 hardware scheduling, and enforcing 407 the fine-grained security operations on selected hardware devices and components.

In some embodiments, as shown in FIG. 4C, a method 410 for processing data can comprise enforcing 403 fine-grained security operations including managing 411 access of virtual memory, and enforcing 412 fine-grained security operations on selected memory regions in the virtual memory.

Referring to FIG. 4D, some embodiments of a method 415 for processing data can comprise enforcing 403 fine-grained security operations including running 416 applications on a computer selected from among a plurality of computers networked to the federated server and enforce fine-grained security operations on the selected computer, and managing 417 the running of applications on the computer.

Various embodiments of data processing methods can specify and use a control flow integrity instruction to perform various aspects of executing a control flow integrity instruction specified to verify changes in control flow comprising changes resulting from direct branches, indirect branches, direct calls, indirect calls, returns, and exceptions. For example, as shown in FIG. 4E, a method 420 for processing data can comprise enforcing 403 fine-grained security operations including executing 421 a control flow integrity instruction specified to verify changes in control flow and responding 422 to verification failure by trap or exception. Similarly, as depicted in FIG. 4F, a method 425 for processing data can comprise enforcing 403 fine-grained security operations including executing 426 a control flow integrity instruction specified to verify changes in control flow comprising conditions of instruction length or instruction alignment, and responding 427 to verification failure by trap or exception. Referring to FIG. 4G, a method 430 for processing data can comprise enforcing 403 fine-grained security operations including executing 431 a control flow integrity instruction specified to verify changes in control flow comprising changes resulting from direct branches, indirect branches, direct calls, indirect calls, returns, and exceptions, and responding 432 to verification failure by trap or exception.

Figure 4H:
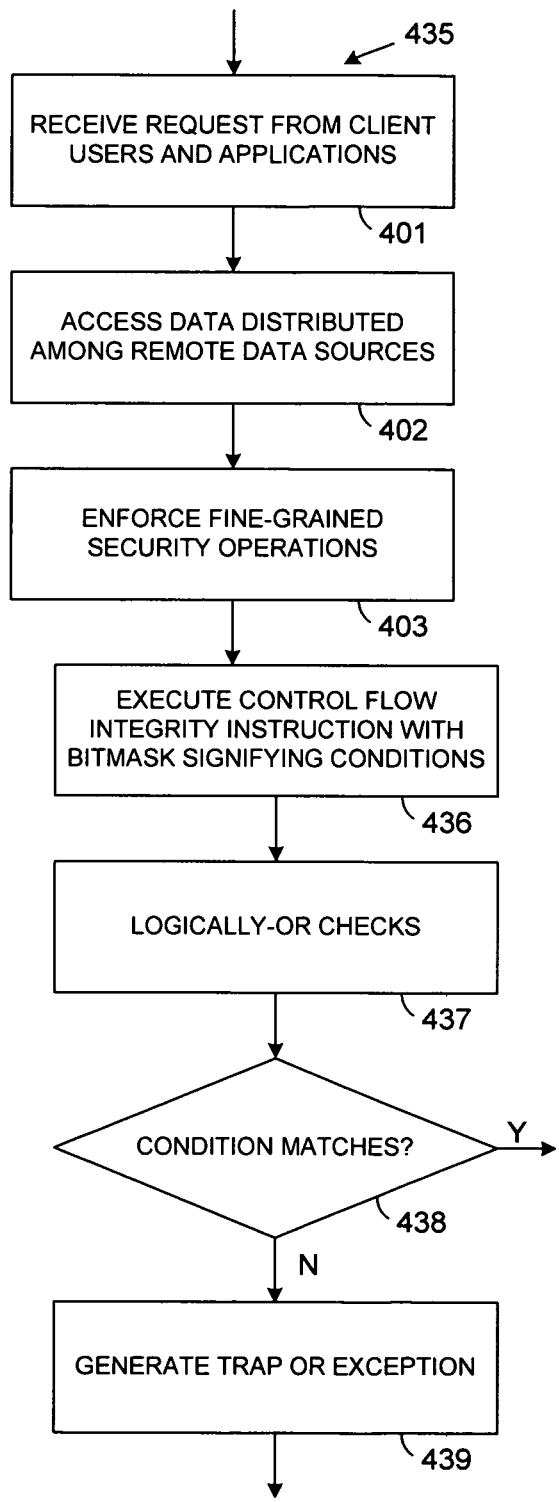

In some embodiments, a data processing method, can enable execution of a control flow integrity instruction with an immediate constant bitmask enables techniques for supporting fine-grained security operations. Accordingly, as shown in FIG. 4H, a method 435 for processing data can comprise enforcing 403 fine-grained security operations including executing 436 a control flow integrity instruction comprising an immediate constant bitmask that defines one or more checks to be made of one or more conditions. The one or more checks can be logically-ORed 437 and a trap or exception is generated 439 if none of the at least one condition matches 438. The immediate constant bitmask can have bitmask bits operable to identify one or more condition that can be selected from conditions including whether the control flow integrity instruction is reachable through sequential execution from a previous instruction, whether the control flow integrity instruction is target of an unconditional direct branch, whether the control flow integrity instruction is target of a conditional direct branch, whether the control flow integrity instruction is target of a non-relative direct branch, whether the control flow integrity instruction is target of an indirect branch, whether the control flow integrity instruction is target of a relative function call, whether the control flow integrity instruction is target of a non-relative or absolute function call, whether the control flow integrity instruction is target of an indirect function call, whether the control flow integrity instruction is target of a function return instruction, and similar conditions.

Various embodiments and applications of a data processing method can support instructions that can specify permissions including memory locations to which data can be written, when program code is allowed to execute, how long writing is allowed, and the like. The instructions can use permissions associated with data objects, such as assigning a pointer to an object and, using permissions, allowing only methods belonging to that object to access the object. Other permissions can enable access to data for specified purposes, enable a first running of an object and access allowed to only part of a routine, while preventing access by others. In another instance, a particular method can be permitted to run a limited number of times or just one time, and can prevent subsequent access to data when the data has been previously exposed to an authorized reader. For example, as shown in FIG. 4I, a method 440 for processing data can comprise enforcing 403 fine-grained security operations including managing 441 access to memory, and enforcing 442 fine-grained security operations on selected start and end boundaries and selected granularity in the memory with selected permissions. Another example, depicted in FIG. 4J, a method 445 for processing data can comprise enforcing 403 fine-grained security operations including managing 446 access to memory, and enforcing 447 fine-grained security operations in the memory with permissions selected from a group consisting of write enablement, read enablement, execution enablement, and duration of enablement.

Fine-grained security is highly useful for protecting memory in fine-grained pieces to support resource allocation, resource scheduling, hardware scheduling, virtual memory, and other functionality. Performance can be balanced with granularity of control by supporting both coarse-grained checking and fine-grained checking capabilities. Accordingly, as shown in FIG. 4K, a method 450 for processing data can comprise enforcing 403 fine-grained security operations including managing 451 access to memory in memory blocks, and enforcing 452 fine-grained security operations by individually protecting selected memory blocks. Likewise, as shown in FIG. 4L, a method 455 for processing data can comprise enforcing 403 fine-grained security operations including managing 456 running of applications in a plurality of virtual machines, and enforcing 457 fine-grained security operations including assigning data to a selected virtual machine.

Figure 4M:
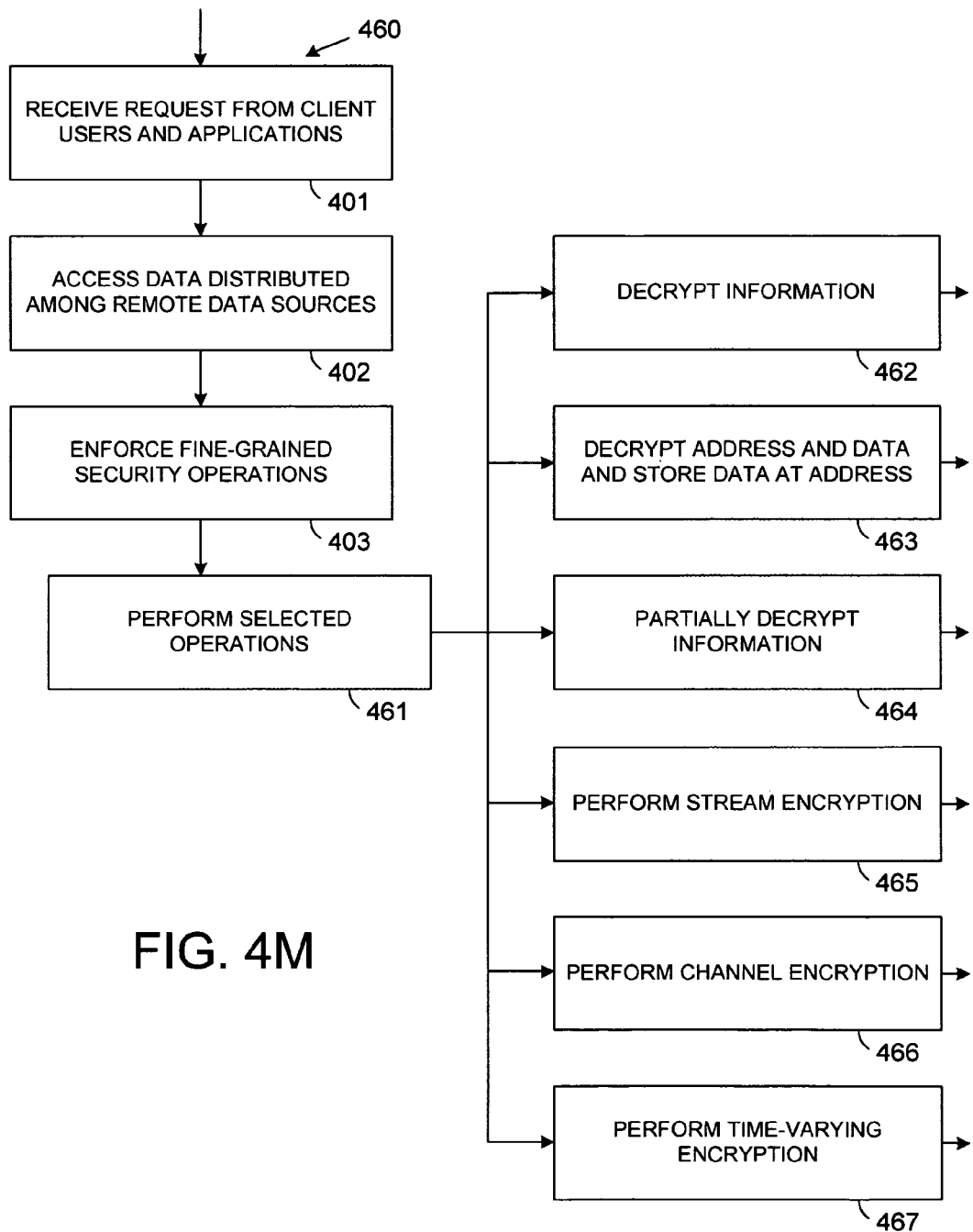

In some embodiments and/or applications, the data processing method can make use of channel encryption, comprising communication between devices, each of which includes cryptographic logic and performs cryptographic operations, to perform fine-grained security operations. Accordingly, as shown in FIG. 4M, a method 460 for processing data can comprise enforcing 403 fine-grained security operations including performing 461 channel encryption operations on a communication channel that communicates information between a selected processor and a selected memory. One or more selected operations can be performed 461 of operations including decrypting 462 information encrypted by the selected processor, decrypting 463 address and data information encrypted by the selected processor and store data at the address, partially decrypting 464 information encrypted by the selected processor, performing 465 stream encryption of information communicated on the communication channel wherein processor and memory sides of the communication channel are assigned a key, performing 466 channel encryption operations on the communication channel for information that is storage encrypted wherein the storage-encrypted information is encrypted by the selected processor, stored in the selected memory, accessed from the selected memory, and decrypted by the selected processor, performing 467 time-varying encryption, and the like.

In some embodiments and applications, a data processing method can support formation of a security perimeter which combines cryptographic and physical security. Accordingly, as shown in FIG. 4N, a method 470 for processing data can comprise enforcing 403 fine-grained security operations including creating 471 at least one cryptographic security perimeter enclosing at least one selected region of memory, and managing 472 information communication between a processor and the at least one selected region of the memory.

Referring to FIGS. 5A, 5B, 5C, 5D, and 5E, several schematic block diagrams respectively illustrate embodiments of a data processing system 500 that enables use of fine-grained security including resource allocation and resource scheduling, for example, to enable running applications on a computer controlled and owned by another entity. In an illustrative embodiment, the data processing system 500 can comprise means 561 for receiving a request from a plurality of client users and applications 506, and means 562 for accessing data distributed among a plurality of remote data sources upon the request from the plurality of client users and applications 506. The data processing system 500 can further comprise means 563 for enforcing fine-grained security operations 510 on a plurality of federated shared data sets distributed among the plurality of remote data sources 504.

The fine-grained security operations 510 can be specified as operations on data elements more fine than a memory page or virtual page size.

In some embodiments, the data processing system 500 can comprise means 564 for performing hardware scheduling, and means 565 for enforcing the fine-grained security operations 510 on selected hardware devices and components 516.

Embodiments of the data processing system 500 can support fine-grained security for resource allocation and resource scheduling, for example for handling virtual memory. Consequently, the data processing system 500 can comprise means 566 for managing access of virtual memory, and means 567 for enforcing fine-grained security operations 510 on selected memory regions in the virtual memory 519.

Fine-grained security can be implemented in the data processing system 500 in a server and client architecture. For example, business application servers and business clients can interact with mutual trust by running program code that executes in part on machines controlled by the server and in part on machines controlled by the client. Consequently, in some embodiments, the data processing system 500 can comprise means 568 for running applications on a computer selected from among a plurality of computers 518 networked to the federated server 502 and enforce fine-grained security operations 510 on the selected computer, and means 569 for managing the running of applications on the computer.

As shown in FIG. 5B, embodiments of systems and methods of the data processing system 500 can enforce fine-grained security operations 510 using instructions to ensure code integrity and control flow integrity. In some embodiments, the data processing system 500 can comprise means 570 for executing a control flow integrity instruction specified to verify changes in control flow and respond to verification failure by trap or exception. Similarly, some embodiment of the data processing system 500 can comprise means 571 for executing a control flow integrity instruction specified to verify changes in control flow comprising conditions of instruction length or instruction alignment. Some data processing system 500 embodiments can further comprise means 572 for executing a control flow integrity instruction specified to verify changes in control flow comprising changes resulting from direct branches, indirect branches, direct calls, indirect calls, returns, and exceptions.

In some embodiments and/or applications, the data processing system 500 can enable execution of one or more control flow integrity instructions with an immediate constant bitmask that enables a technique for supporting fine-grained security operations 510. Accordingly, the data processing system 500 can comprise means 573 for executing a control flow integrity instruction comprising an immediate constant bitmask that defines one or more checks made of one or more conditions. The one or more checks can be logically-ORed and a trap or exception generated if none of the conditions matches. The immediate constant bitmask can comprise bitmask bits operable to identify one or more selected conditions of example conditions including whether the control flow integrity instruction is reachable through sequential execution from a previous instruction, whether the control flow integrity instruction is target of an unconditional direct branch, whether the control flow integrity instruction is target of a conditional direct branch, whether the control flow integrity instruction is target of a non-relative direct branch, whether the control flow integrity instruction is target of an indirect branch, whether the control flow integrity instruction is target of a relative function call, whether the control flow integrity instruction is target of a non-relative or absolute function call, whether the control flow integrity instruction is target of an indirect function call, and whether the control flow integrity instruction is target of a function return instruction.

Embodiments and applications of a data processing system 500 can support instructions that can specify permissions including memory locations to which data can be written, when program code is allowed to execute, how long writing is allowed, and the like. The instructions can use permissions associated with data objects, such as assigning a pointer to an object and, using permissions, allowing only methods belonging to that object to access the object. Other permissions can enable access to data for specified purposes, enable a first running of an object and access allowed to only part of a routine, while preventing access by others. In another instance, a particular method can be permitted to run a limited number of times or just one time, and can prevent subsequent access to data when the data has been previously exposed to an authorized reader. For example, the data processing system 500 can comprise means 574 means for managing access to memory 522, and means 575 for enforcing fine-grained security operations 510 on selected start and end boundaries and selected granularity in the memory 522 with selected permissions. In some embodiments, the data processing system 500 can comprise means 574 for managing access to memory 522, and means 576 for enforcing fine-grained security operations 510 in the memory 522 with permissions selected from a group consisting of write enablement, read enablement, execution enablement, and duration of enablement.

Figure 5A:
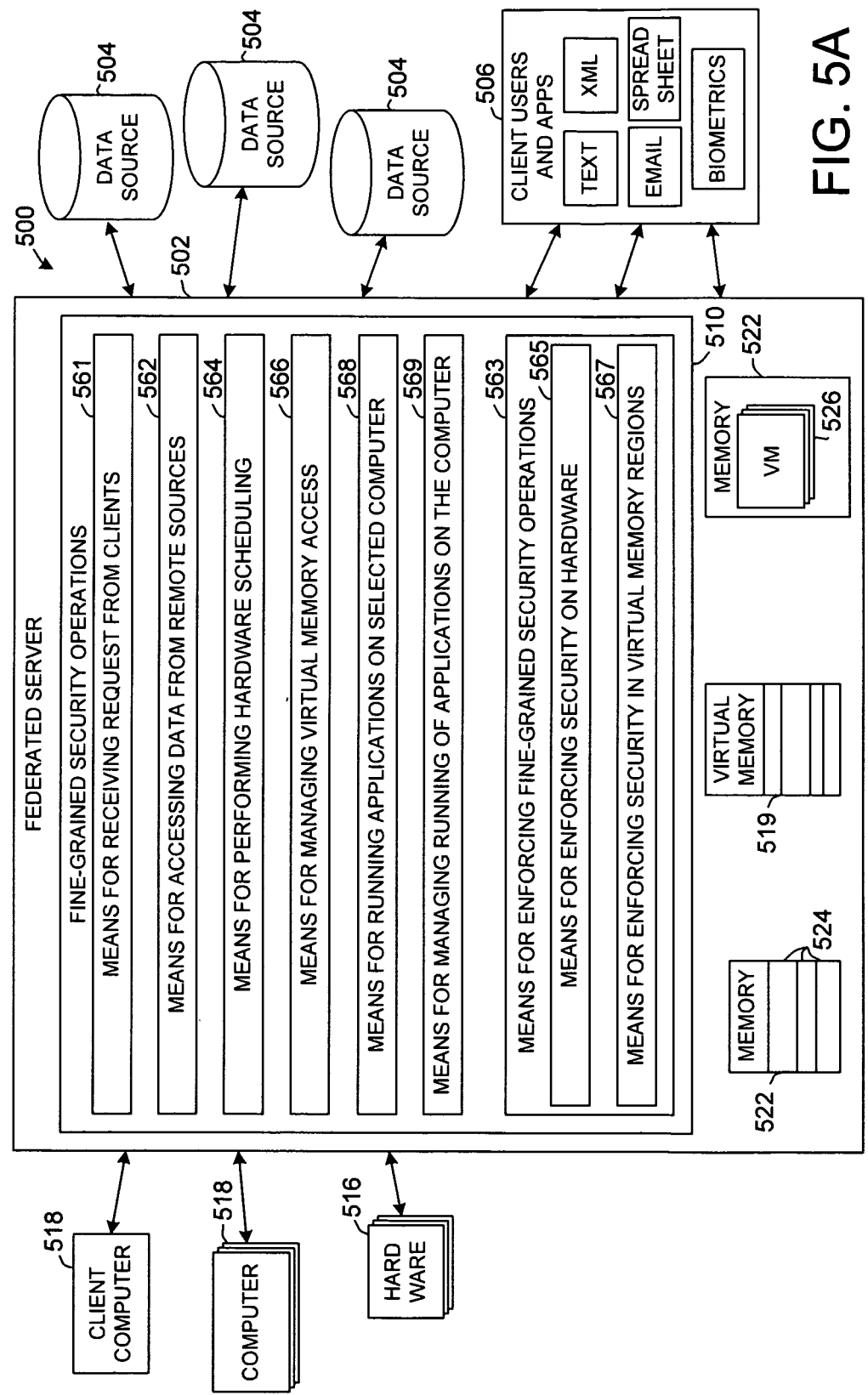
Figure 5C:
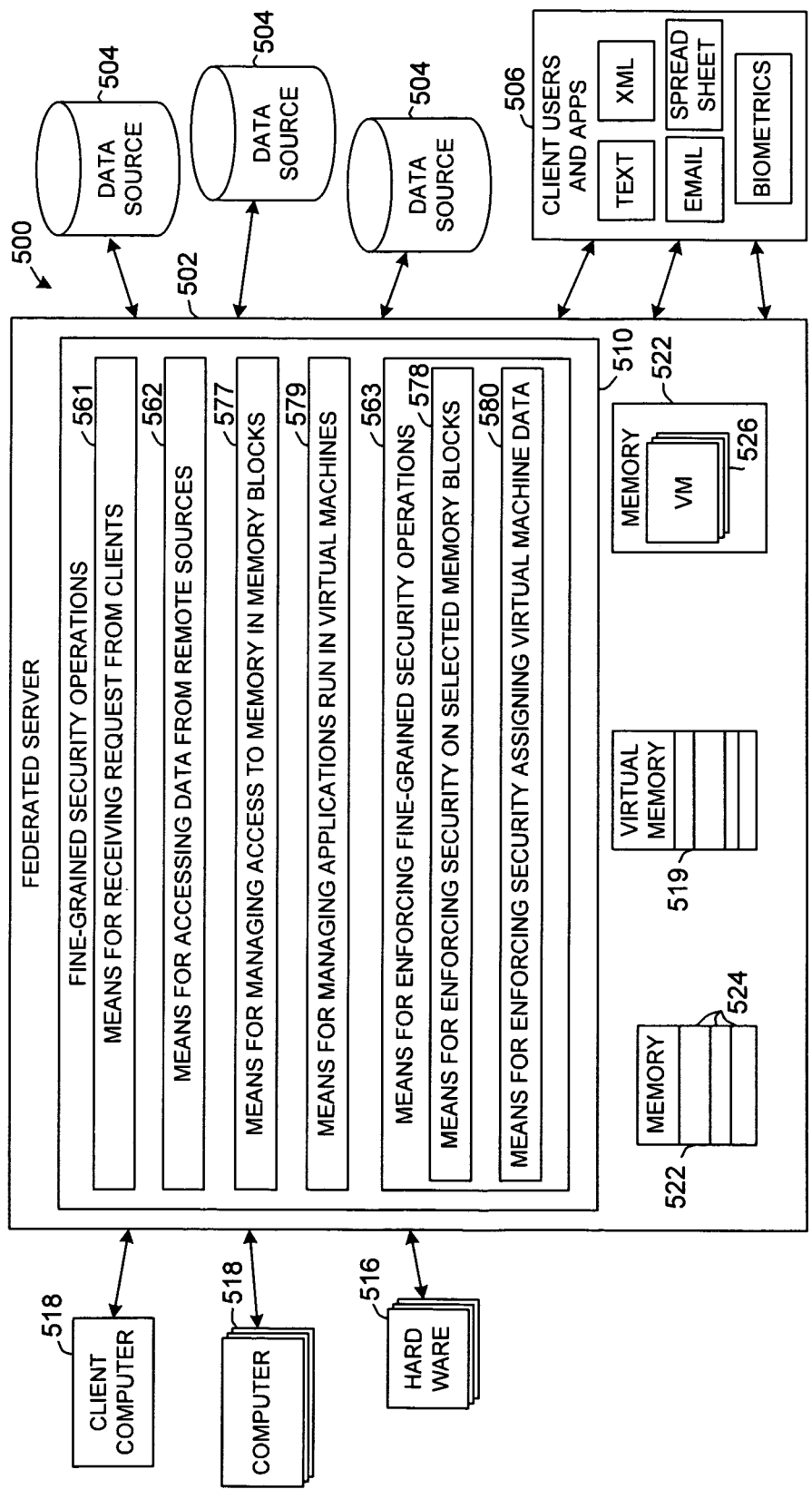

Referring to FIG. 5C, the data processing system 500 can be constituted to protect memory in fine-grained pieces to support resource allocation, resource scheduling, hardware scheduling, virtual memory, and other functionality. Performance can be balanced with granularity of control by supporting both coarse-grained checking and fine-grained checking capabilities. Accordingly, the data processing system 500 can comprise means 577 for managing access to memory 522 in memory blocks 524, and means 578 for enforcing fine-grained security operations 510 by individually protecting selected memory blocks 524. Furthermore, an embodiment of the data processing system 500 can comprise means 579 for managing running of applications in a plurality of virtual machines 526; and means 580 for enforcing fine-grained security operations 510 including assigning data to a selected virtual machine.

Figure 5D:
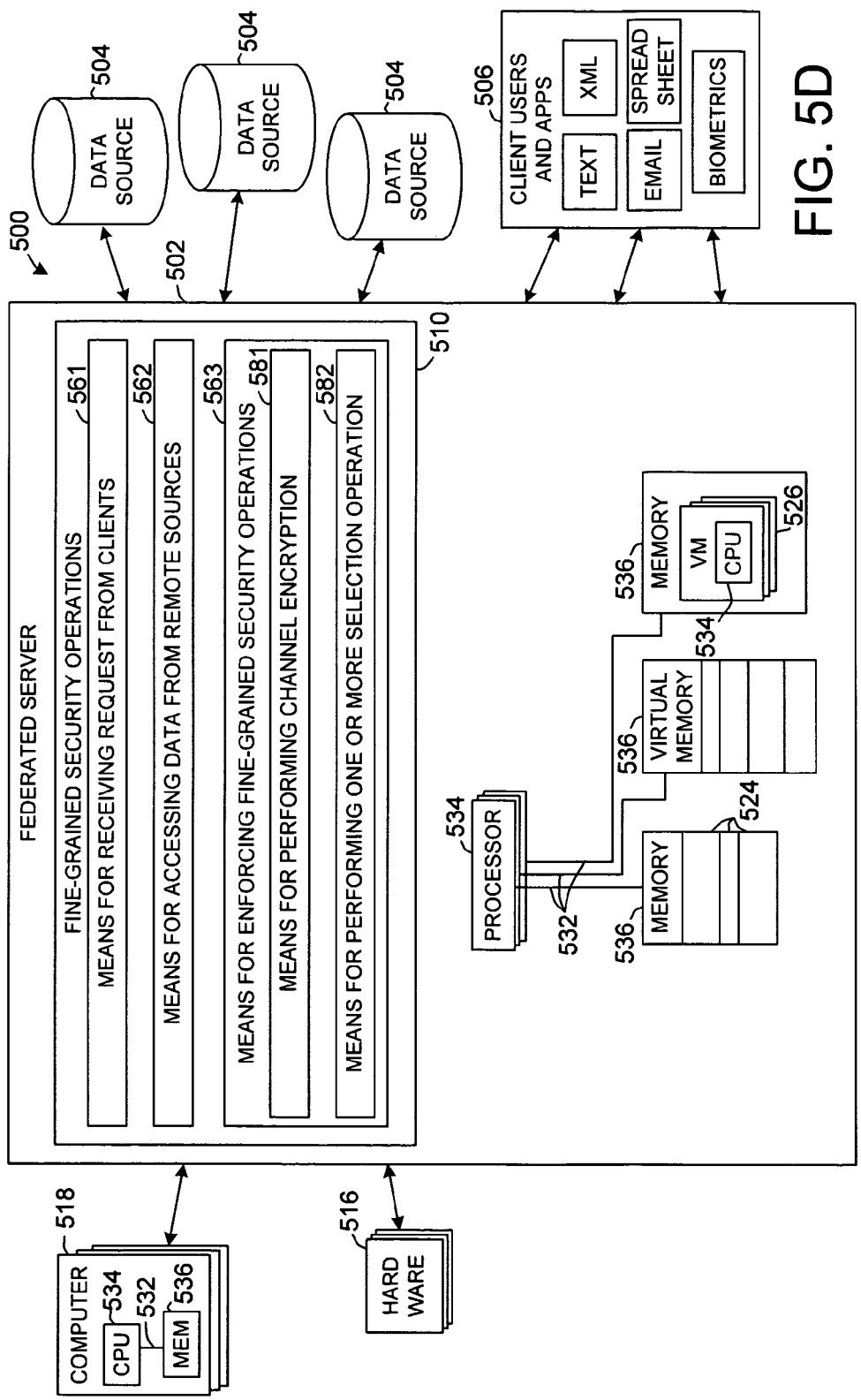

In some embodiments, for example as illustrated in FIG. 5D, a data processing system 500 can be configured to perform fine-grained security operations 510 including a channel encryption functionality wherein channel encryption between two or more communicating devices such as a processor or CPU and memory or other storage. The communicating devices can be configured in combination to perform channel encryption. Consequently, the data processing system 500 can comprise means 581 for performing channel encryption operations 530 on a communication channel 532 that communicates information between a selected processor 534 and a selected memory 536, and means 582 for performing one or more selected operation. The operations can be selected from among decrypting information encrypted by the selected processor 534, decrypting address and data information encrypted by the selected processor 534 and store data at the address, partially decrypting information encrypted by the selected processor 534, performing stream encryption of information communicated on the communication channel 532 wherein processor and memory sides of the communication channel 532 are assigned a key, performing channel encryption operations 530 on the communication channel 532 for information that is storage encrypted wherein the storage-encrypted information is encrypted by the selected processor 534, stored in the selected memory 536, accessed from the selected memory 536, and decrypted by the selected processor 534, performing time-varying encryption, and the like.

Figure 5E:
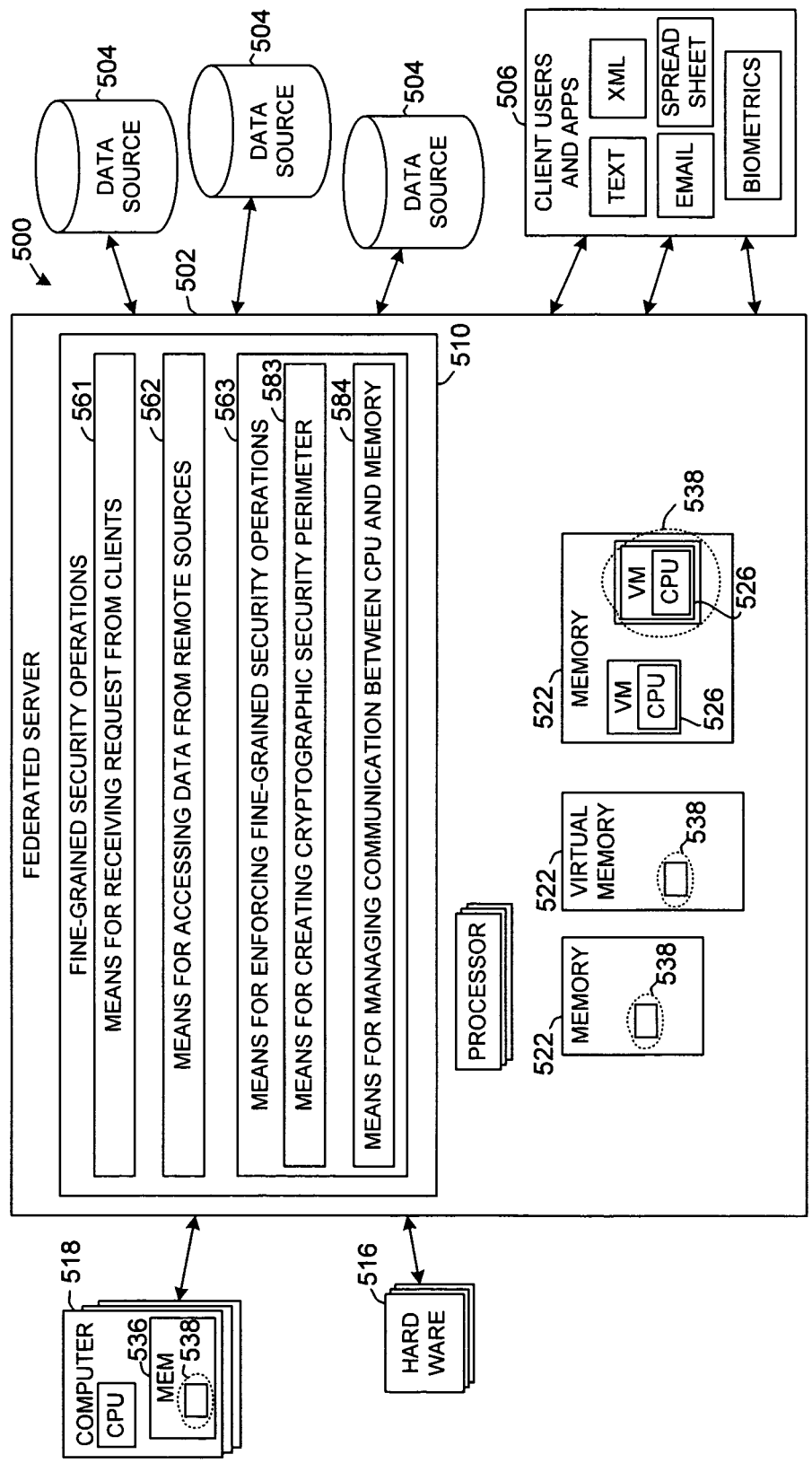

Referring to FIG. 5E, in some embodiments and applications the data processing system 500 can be configured to support formation of a security perimeter which combines cryptographic and physical security. Accordingly, the data processing system 500 can comprise means 583 for creating at least one cryptographic security perimeter 538 enclosing at least one selected region of memory 522, and means 584 for managing information communication between a processor and the at least one selected region of the memory 522.

Terms "substantially", "essentially", or "approximately", that may be used herein, relate to an industry-accepted variability to the corresponding term. Such an industry-accepted variability ranges from less than one percent to twenty percent and corresponds to, but is not limited to, materials, shapes, sizes, functionality, values, process variations, and the like. The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

The illustrative pictorial diagrams depict structures and process actions in a manufacturing process. Although the particular examples illustrate specific structures and process acts, many alternative implementations are possible and commonly made by simple design choice. Manufacturing actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A data processing system comprising:
at least one member server of a federated server configured to access data distributed among a plurality of remote data sources upon request from one or more client users or applications; and
logic-in-memory integrated into at least one memory device of the at least one member server of the federated server, the logic-in-memory configured with logic that enforces one or more fine-grained security operations on one or more federated shared data sets distributed among the plurality of remote data sources using sensor fusion that fuses at least one of data or one or more data sets for a first entity controlling a first sensor and a second entity controlling a second sensor, the logic-in-memory configured to fuse the at least one of data or one or more data sets at least partially determined by one or more permissions for the first entity or the second entity that are specified independently.

2. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:
logic-in-memory configured to fuse the at least one of data or one or more data sets at granularities for the first entity and the second entity that are specified independently including operations on data elements more fine-grained than a memory page or virtual page size.

3. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:
logic-in-memory configured to fuse the at least one of data or one or more data sets by scheduling operations for the first entity and the second entity that is specified independently including performing at least one hardware scheduling operation and enforcing fine-grained security operations in logic at least partly integrated into memory on selected hardware devices and components.

4. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:
logic-in-memory configured to fuse the at least one of data or one or more data sets managing memory access for the first entity and the second entity that is specified independently including performing at least one operation of managing access of virtual memory access management operation and performing at least one operation for enforcing enforce fine-grained security operations on selected logic at least partly integrated into memory regions in the virtual memory.

5. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:
logic-in-memory configured to fuse the at least one of data or one or more data sets by managing running applications for the first entity and the second entity that is specified independently including performing at least one operation for managing running of applications on a computer selected from among a plurality of computers networked to the federated server and performing at least one operation for enforcing fine-grained security operations on the selected computer.

6. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:
logic-in-memory configured to fuse the at least one of data or one or more data sets by controlling flow integrity for the first entity and the second entity that is specified independently including executing at least one control flow integrity instruction specified to verify changes in control flow and respond to verification failure by trap or exception.

7. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:
logic-in-memory configured to fuse the at least one of data or one or more data sets by controlling flow integrity for the first entity and the second entity that is specified independently including executing at least one control flow integrity instruction specified to verify changes in control flow comprising conditions of instruction length or instruction alignment.

8. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:

logic-in-memory configured to fuse the at least one of data or one or more data sets by controlling flow integrity for the first entity and the second entity that is specified independently including executing at least one control flow integrity instruction specified to verify changes in control flow including changes resulting from direct branches, indirect branches, direct calls, indirect calls, returns, and exceptions.

9. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:

logic-in-memory configured to fuse the at least one of data or one or more data sets by controlling flow integrity for the first entity and the second entity that is specified independently including executing at least one control flow integrity instruction including an immediate constant bitmask that defines at least one check to be made of at least one condition, the at least one check being logically-ORed and a trap or exception is generated if none of the at least one condition matches, the immediate constant bitmask comprising bitmask bits configured to identify one or more of:

whether the control flow integrity instruction is reachable through sequential execution from a previous instruction;

whether the control flow integrity instruction is target of an unconditional direct branch;

whether the control flow integrity instruction is target of a conditional direct branch;

whether the control flow integrity instruction is target of a non-relative direct branch;

whether the control flow integrity instruction is target of an indirect branch;

whether the control flow integrity instruction is target of a relative function call;

whether the control flow integrity instruction is target of a non-relative or absolute function call;

whether the control flow integrity instruction is target of an indirect function call; or whether the control flow integrity instruction is target of a function return instruction.

10. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:

logic-in-memory configured to fuse the at least one of data or one or more data sets by managing memory access for the first entity and the second entity that is specified independently including performing at least one memory access management operation and perform at least one operation for enforcing fine-grained security operations on selected start and end boundaries and selected granularity in the memory with selected permissions.

11. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:

logic-in-memory configured to fuse the at least one of data or one or more data sets by managing memory access for the first entity and the second entity that is specified independently including performing at least one memory access management operation and perform at least one operation for enforcing fine-grained security operations in the memory with permissions selected from write enablement, read enablement, execution enablement, and duration of enablement.

12. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:

logic-in-memory configured to fuse the at least one of data or one or more data sets by managing memory access for the first entity and the second entity that is specified independently including performing at least one memory access management operation in memory blocks and perform at least one operation for enforcing fine-grained security operations by individually protecting selected memory blocks.

13. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:

logic-in-memory configured to fuse the at least one of data or one or more data sets by managing running applications for the first entity and the second entity that is specified independently including performing at least one operation for managing running of applications in a plurality of virtual machines and perform at least one operation for enforcing fine-grained security operations including assigning data to a selected virtual machine.

14. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:
  logic-in-memory configured to fuse the at least one of data or one or more data sets using encryption for the first entity and the second entity that is specified independently including performing channel encryption operations on a communication channel that communicates information between a selected processor and a selected memory, wherein the logic-in-memory configured to enforce fine-grained security operations is further configured to perform at least one operation in logic at least partly integrated into memory one or more of:
    decrypting information encrypted by the selected processor;
    decrypting address and data information encrypted by the selected processor and store data at the address;
    partially decrypting information encrypted by the selected processor;
    performing stream encryption of information communicated on the communication channel wherein processor and memory sides of the communication channel are assigned a key;
    performing channel encryption operations on the communication channel for information that is storage encrypted wherein the storage-encrypted information is encrypted by the selected processor, stored in the selected memory, accessed from the selected memory, and decrypted by the selected processor; or
    performing time-varying encryption.

15. The data processing system according to claim 1 wherein the logic-in-memory integrated into at least one memory device of the at least one member server of the federated server, the logic-in-memory configured with logic that enforces the fine-grained security operations on one or more federated shared data sets distributed among the plurality of remote data sources using sensor fusion that fuses at least one of data or one or more data sets for a first entity controlling a first sensor and a second entity controlling a second sensor further includes:
  logic-in-memory configured to fuse the at least one of data or one or more data sets using encryption for the first entity and the second entity that is specified independently including forming at least one cryptographic security perimeter enclosing at least one selected region of memory and managing information communication between a processor and the at least one selected region of memory.

16. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
  logic-in-memory configured to fuse the at least one of data or one or more data sets by controlling flow integrity for the first entity and the second entity that is specified independently including executing at least one control flow integrity instruction specified to copy executable code from a received message into memory for execution.

17. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
  logic-in-memory configured to fuse the at least one of data or one or more data sets by controlling flow integrity for the first entity and the second entity that is specified independently including executing at least one control flow integrity instruction specified to copy executable code from a received message into memory for execution operating on data designated by a pointer or offset in the received message.

18. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
  logic-in-memory configured to fuse the at least one of data or one or more data sets by controlling flow integrity for the first entity and the second entity that is specified independently including executing at least one control flow integrity instruction specified to copy executable code, a copy of the executable code, and a copy of data to be operated on by the executable code from a received message into memory for execution.

19. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
  logic-in-memory configured to fuse the at least one of data or one or more data sets using encryption for the first entity and the second entity that is specified independently including decrypting encrypted information from a received message and writing the decrypted information into memory.

20. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
  logic-in-memory configured to fuse the at least one of data or one or more data sets by controlling flow integrity for the first entity and the second entity that is specified independently including executing at least one control flow integrity instruction specified to apply a template to a received message and fill the template at least in part from the received message and at least in part from information previously installed in memory for execution.

21. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
  logic-in-memory configured to fuse the at least one of data or one or more data sets by controlling flow integrity for the first entity and the second entity that is specified independently including executing at least one control flow integrity instruction specified to apply a template to a received message, fill the template at least in part from the received message and at least in part from information previously installed in memory, and execute at least one instruction specified by an instruction pointer included in the received message.

22. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
  logic-in-memory configured to fuse the at least one of data or one or more data sets by controlling flow integrity for the first entity and the second entity that is specified independently including executing at least one control flow integrity instruction specified to apply a template to a received message, fill the template at least in part from the received message and at least in part from information previously installed in memory, verify a signature specified by the received message, and execute at least one instruction specified by the received message if the signature is verified.

23. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
  logic-in-memory configured to fuse the at least one of data or one or more data sets by controlling flow integrity for the first entity and the second entity that is specified independently including executing at least one control flow integrity instruction specified to dynamically generate executable code by applying a template to a received message and filling the template at least in part from the received message and at least in part from information previously installed in memory for execution.

24. The data processing system according to claim 1 wherein logic-in-memory integrated into at least one memory device of the at least one member server of the federated server, the logic-in-memory configured with logic that enforces fine-grained security operations on one or more a plurality of federated shared data sets distributed among the plurality of remote data sources using sensor fusion that fuses at least one of data or one or more data sets for a first entity controlling a first sensor and a second entity controlling a second sensor further includes:
  logic-in-memory configured to fuse the at least one of data or one or more data sets by controlling flow integrity for the first entity and the second entity that is specified independently including executing at least one control flow integrity instruction specified to apply a template to a received message, determine whether at least one location in the template is unavailable as used by a conflicting process, and communicate with the conflicting process to resolve the conflict.

25. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
  logic-in-memory configured to fuse the at least one of data or one or more data sets by controlling flow integrity for the first entity and the second entity that is specified independently including executing at least one control flow integrity instruction specified to receive a message including a pointer to data in memory that is operated upon by executable code in the logic-in-memory for execution.

26. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
  logic-in-memory configured to fuse the at least one of data or one or more data sets by controlling flow integrity for the first entity and the second entity that is specified independently including executing at least one control flow integrity instruction specified to enforce security by generating a fault in response to a process attempting to branch to at least one instruction not copied to memory by the process.

27. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
    logic-in-memory configured to fuse the at least one of data or one or more data sets by controlling flow integrity for the first entity and the second entity that is specified independently including executing at least one control flow integrity instruction specified to logic-in-memory configured to identify memory to be protected using pointers to data and data sets specified according to the first entity controlling the first sensor and the second entity controlling the second sensor.

28. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
    logic-in-memory configured to fuse the at least one of data or one or more data sets at least partially determined by permissions for the first entity and the second entity that are specified independently including enforcing security of memory using at least one pointer that identifies a lower bound, an upper bound and permissions for data and data sets specified according to the first entity controlling the first sensor and the second entity controlling the second sensor.

29. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
    logic-in-memory configured to fuse the at least one of data or one or more data sets managing memory access for the first entity and the second entity that is specified independently including enforcing security of memory using at least one poisoned bit that prevents subsequent branching and/or returns for data and data sets specified according to the first entity controlling the first sensor and the second entity controlling the second sensor.

30. The data processing system according to claim 1 wherein logic-in-memory integrated into at least one memory device of the at least one member server of the federated server, the logic-in-memory configured with logic that enforces fine-grained security operations on one or more federated shared data sets distributed among the plurality of remote data sources using sensor fusion that fuses at least one of data or one or more data sets for a first entity controlling a first sensor and a second entity controlling a second sensor further includes:
    logic-in-memory configured to fuse the at least one of data or one or more data sets at least partially determined by permissions for the first entity and the second entity that are specified independently including enforcing security of memory using fusion of data and data sets in numerical aspects and permissions aspects specified according to the first entity controlling the first sensor and the second entity controlling the second sensor.

31. A federated system comprising:
    at least one member server of a federated server configured to access data via distributed queries over data stored in a plurality of remote data sources; and
    at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor, the at least one wrapper configured to fuse the at least one of data or one or more data sets at least partially by managing running applications for the first entity and the second entity that is specified independently.

32. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
    at least one wrapper configured to fuse the at least one of data or one or more data sets at granularities for the first entity and the second entity that are specified independently including operations on data elements more fine-grained than a memory page or virtual page size.

33. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
    a software module containing characteristics about the plurality of remote data sources.

34. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
    a wrapper portion configured to set permissions defining fine-grained security operations for selectively accessing data on the plurality of remote data sources independently for at least the first entity and the second entity.

35. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
    a wrapper portion configured to set hardware scheduling and fine-grained security operations on selected hardware devices and components independently for at least the first entity and the second entity.

36. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
  a wrapper portion configured to set access to virtual memory and fine-grained security operations on selected memory regions in the virtual memory independently for at least the first entity and the second entity.

37. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
  a wrapper portion configured to determine applications running on a computer selected from among one or more computers networked to the federated server and one or more fine-grained security operations on the selected computer independently for at least the first entity and the second entity.

38. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
  a wrapper portion configured to specify a control flow integrity instruction to verify changes in control flow and respond to verification failure by trap or exception independently for at least the first entity and the second entity.

39. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
  a wrapper portion configured to specify a control flow integrity instruction to verify changes in control flow comprising conditions of instruction length or instruction alignment independently for at least the first entity and the second entity.

40. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
  a wrapper portion configured to specify a control flow integrity instruction to verify changes in control flow including changes resulting from direct branches, indirect branches, direct calls, indirect calls, returns, and exceptions independently for at least the first entity and the second entity.

41. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
  a wrapper portion configured to specify a control flow integrity instruction independently for at least the first entity and the second entity, the control flow integrity instruction including at least an immediate constant bitmask that defines at least one check to be made of at least one condition, the at least one check being logically-ORed and a trap or exception is generated if none of the at least one condition matches, the immediate constant bitmask including one or more bitmask bits configured to identify one or more of:
    whether the control flow integrity instruction is reachable through sequential execution from a previous instruction;
    whether the control flow integrity instruction is target of an unconditional direct branch;
    whether the control flow integrity instruction is target of a conditional direct branch;
    whether the control flow integrity instruction is target of a non-relative direct branch;
    whether the control flow integrity instruction is target of an indirect branch;
    whether the control flow integrity instruction is target of a relative function call;
    whether the control flow integrity instruction is target of a non-relative or absolute function call;
    whether the control flow integrity instruction is target of an indirect function call; or
    whether the control flow integrity instruction is target of a function return instruction.

42. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
  a wrapper portion configured to specify access to memory and fine-grained security operations on selected start and end boundaries and selected granularity in the memory with selected permissions.

43. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
  a wrapper portion configured to specify access to memory and fine-grained security operations in the memory with permissions independently for at least the first entity and the second entity, the specifying access selected from a group consisting of write enablement, read enablement, execution enablement, and duration of enablement.

44. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
- a wrapper portion configured to specify access to memory in memory blocks and fine-grained security operations independently for at least the first entity and the second entity, the specifying access by individually protecting selected memory blocks.

45. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
- a wrapper portion configured to specify applications to run in a plurality of virtual machines and fine-grained security operations independently for at least the first entity and the second entity, the specifying applications to run including assigning data to a selected virtual machine.

46. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
- a wrapper portion configured to specify channel encryption operations on a communication channel that communicates information between a selected processor and a selected memory independently for at least the first entity and the second entity, wherein the wrapper portion is further configured to specify one or more of:
- decrypting information encrypted by the selected processor;
- decrypting address and data information encrypted by the selected processor and store data at the address;
- partially decrypting information encrypted by the selected processor;
- performing stream encryption of information communicated on the communication channel wherein processor and memory sides of the communication channel are assigned a key;
- performing channel encryption operations on the communication channel for information that is storage encrypted wherein the storage-encrypted information is encrypted by the selected processor, stored in the selected memory, accessed from the selected memory, and decrypted by the selected processor; or
- performing time-varying encryption.

47. The federated system according to claim 31 wherein the at least one wrapper configured for communicating among the plurality of remote data sources, the at least one wrapper containing characteristics and determining fine-grained security operations for selected ones of the remote data sources using sensor fusion that fuses at least one of data or one or more data sets for a first entity controlling a first sensor and a second entity controlling a second sensor further includes:
- a wrapper portion configured to specify at least one cryptographic security perimeter independently for at least the first entity and the second entity, the cryptographic security perimeter enclosing at least one selected region of memory and information communication between a processor and the at least one selected region of memory.

48. A computer system comprising:
- a network interface configured to communicate data among a plurality of remote data sources and one or more client users or applications; and
- a processor operatively coupled to the network interface and configured to control fine-grained security operations configured at least partly as logic-in-memory distributed on one or more federated shared data sets distributed among the plurality of remote data sources using sensor fusion that fuses at least one of data or one or more data sets for a first entity controlling a first sensor and a second entity controlling a second sensor, the logic-in-memory configured to fuse the at least one of data or one or more data sets using encryption for the first entity and the second entity that is specified independently.

49. The computer system according to claim 48 wherein the processor operatively coupled to the network interface and configured to control fine-grained security operations configured at least partly as logic-in-memory distributed on one or more federated shared data sets distributed among the plurality of remote data sources using sensor fusion that fuses at least one of data or one or more data sets for a first entity controlling a first sensor and a second entity controlling a second sensor further includes:
- at least one process configured to fuse the at least one of data or one or more data sets at granularities for the first entity and the second entity that are specified independently including fine-grained security operations on data elements more fine than a memory page or virtual page size.

50. The computer system according to claim 48 wherein the processor operatively coupled to the network interface and configured to control fine-grained security operations configured at least partly as logic-in-memory distributed on one or more federated shared data sets distributed among the plurality of remote data sources using sensor fusion that fuses at least one of data or one or more data sets for a first entity controlling a first sensor and a second entity controlling a second sensor further includes:
- a process configured to access data distributed among the plurality of remote data sources upon request from the plurality of client users and applications.

* * * * *

UNITED STATES PATENT AND TRADEMARK OFFICE
CERTIFICATE OF CORRECTION

| | | |
|---|---|---|
| PATENT NO. | : 8,943,313 B2 | Page 1 of 1 |
| APPLICATION NO. | : 13/136401 | |
| DATED | : January 27, 2015 | |
| INVENTOR(S) | : Andrew F. Glew et al. | |

It is certified that error appears in the above-identified patent and that said Letters Patent is hereby corrected as shown below:

In The Claims

At Column 48, Line 10, Claim 4 please replace "for enforcing enforce fine-grained security operations" with -- for enforcing fine-grained security operations --

At Column 54, Lines 8-9, Claim 24 please replace "more a plurality of federated shared data sets distributed among the" with -- more federated shared data sets distributed among the --

At Column 59, Lines 1-2, Claim 43 please replace "from a group consisting of write enablement, read enablement" with -- from write enablement, read enablement --

Signed and Sealed this
Sixteenth Day of August, 2016

Michelle K. Lee
*Director of the United States Patent and Trademark Office*